(12) United States Patent
Luo et al.

(10) Patent No.: US 9,299,011 B2
(45) Date of Patent: Mar. 29, 2016

(54) SIGNAL PROCESSING APPARATUS, SIGNAL PROCESSING METHOD, OUTPUT APPARATUS, OUTPUT METHOD, AND PROGRAM FOR LEARNING AND RESTORING SIGNALS WITH SPARSE COEFFICIENTS

(71) Applicant: SONY CORPORATION, Tokyo (JP)

(72) Inventors: Jun Luo, Tokyo (JP); Liqing Zhang, Shanghai (CN); Haohua Zhao, Shanghai (CN); Weizhi Xu, Shanghai (CN); Zhenbang Sun, Shanghai (CN); Wei Shi, Shanghai (CN); Takefumi Nagumo, Kanagawa (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 14/022,823

(22) Filed: Sep. 10, 2013

(65) Prior Publication Data
US 2014/0086480 A1    Mar. 27, 2014

(30) Foreign Application Priority Data

Sep. 21, 2012    (JP) ................. 2012-208321

(51) Int. Cl.
| | |
|---|---|
| G06T 5/50 | (2006.01) |
| G06K 9/66 | (2006.01) |
| G06T 5/00 | (2006.01) |
| G06K 9/62 | (2006.01) |

(52) U.S. Cl.
CPC ............... *G06K 9/66* (2013.01); *G06K 9/6256* (2013.01); *G06T 5/001* (2013.01); *G06T 2207/20076* (2013.01); *G06T 2207/20081* (2013.01)

(58) Field of Classification Search
CPC combination set(s) only.
See application file for complete search history.

(56) References Cited

PUBLICATIONS

Julien Mairal et al., Learning Multiscale Sparse Representations for Image and Video Restoration, IMA Preprint Series # 2168 ( Jul. 2007 ), Institute for Mathematics and Its Applications University of Minnesota, 2 cover pages, and pp. 1-26 of the article itself.*
Libo MA, et al., Overcomplete topographic independent component analysis, Neurocomputing, Mar. 10, 2008, pp. 2217-2223, vol. 71, Elsevier, Shanghai, China.
Michal Aharon, et al., K-SVD: An Algorithm for Designing Overcomplete Dictionaries for Sparse Representation, IEEE Transactions on Signal Processing, Nov. 2006, pp. 4311-4321, vol. 54, No. 11, IEEE, Haifa, Israel.

* cited by examiner

*Primary Examiner* — Brian P Werner
(74) *Attorney, Agent, or Firm* — Paratus Law Group, PLLC

(57) ABSTRACT

There is provided a signal processing apparatus including a learning unit that learns a plurality of base signals of which coefficients become sparse, for each of features of signals, such that the signals are represented by a linear operation of the plurality of base signals.

20 Claims, 46 Drawing Sheets

SIGNAL PROCESSING APPARATUS, SIGNAL PROCESSING METHOD, OUTPUT APPARATUS, OUTPUT METHOD, AND PROGRAM FOR LEARNING AND RESTORING SIGNALS WITH SPARSE COEFFICIENTS

BACKGROUND

The present disclosure relates to a signal processing apparatus, a signal processing method, an output apparatus, an output method, and a program and particularly, to a signal processing apparatus, a signal processing method, an output apparatus, an output method, and a program that enable an accurate base signal to be obtained.

Recently, various image restoration technologies using sparse coding have been studied. The sparse coding is a method of modeling a human visual system, decomposing a signal into base signals, and representing the signal.

Specifically, in the human visual system, an image that is captured by a retina is not transmitted to an upper recognition mechanism as it is and is decomposed into a linear sum of a plurality of base images as represented by the following expression 1 and is transmitted, at a stage of an early vision.

$$(\text{Image}) = \Sigma[(\text{Coefficient}) \times (\text{Base Image})] \quad (1)$$

In the expression 1, a large number of coefficients become 0 and only a small number of coefficients become large values. That is, the coefficients become sparse. For this reason, the method of modeling the human visual system, decomposing the signal into the base signals, and representing the signal is called the sparse coding.

In the sparse coding, first, the base signal that is modeled by the above expression 1 is learned using a cost function represented by the following expression 2. In this case, it is assumed that a signal becoming a sparse coding object is an image.

$$L = \operatorname{argmin}\{\|D\alpha - Y\|^2 + \mu\|\alpha\|_0\} \quad (2)$$

In the expression 2, L denotes a cost function and D denotes a matrix (hereinafter, referred to as a base image matrix) in which an arrangement of pixel values of individual pixels of base images in a column direction is arranged in a row direction for every base image. In addition, $\alpha$ denotes a vector (hereinafter, referred to as a base image coefficient vector) in which coefficients of the individual base images (hereinafter, referred to as base image coefficients) are arranged in the column direction and Y denotes a vector (hereinafter, referred to as a learning image vector) in which pixel values of individual pixels of learning images are arranged in the column direction. In addition, $\mu$ denotes a previously set parameter.

Next, in the expression 2, a base image coefficient when the cost function calculated using the learned base image and the sparse coding object image, instead of the learning image, becomes a predetermined value or smaller, is calculated.

Recently, a method of dividing the sparse coding object image into blocks and calculating base image coefficients in units of the blocks has been devised (for example, refer to Michal Aharon, Michael Elad, and Aired Bruckstein, "K-SVD: An Algorithm for Designing Overcomplete Dictionaries for Sparse Representation", IEEE TRANSACTION ON SIGNAL PROCESSING, VOL. 54, NO. 11, NOVEMBER 2006, P4311-4322).

As restrictions for the base image coefficient in the cost function, in addition to an L0 norm represented by the expression 2, an L1 norm or an approximate expression of the L1 norm exists (for example, refer to Libo Ma and Liqing Zhang, "Overcomplete topographic independent component analysis", Neurocomputing, 10 Mar. 2008, P2217-2223). When the base image coefficient is restricted by the L1 norm, the cost function is represented by the following expression 3 and when the base image coefficient is restricted by the approximate expression of the L1 norm, the cost function is represented by the following expression 4.

$$L = \operatorname{argmin}\{\|D\alpha - Y\|^2 + \mu\|\alpha\|_1\} \quad (3)$$

$$L = \operatorname{argmin}\{\|D\alpha - Y\|^2 + \mu F(\alpha^T\alpha)\}$$

$$F(y) = a\sqrt{y} + b \quad (4)$$

In the expressions 3 and 4, L denotes a cost function, D denotes a base image matrix, $\alpha$ denotes a base image coefficient vector, Y denotes a learning image vector, and $\mu$ denotes a previously set parameter. In the expression 4, a, y, and b denote previously set parameters.

Meanwhile, a most important element of the sparse coding is learning of the base signals. In the related art, the base signals are learned commonly to all signals.

SUMMARY

However, it is difficult to learn the base signals common to all the signals and accurate base signals may not be learned.

It is desirable to enable an accurate base signal to be obtained.

According to a first embodiment of the present technology, there is provided a signal processing apparatus including a learning unit that learns a plurality of base signals of which coefficients become sparse, for each of features of signals, such that the signals are represented by a linear operation of the plurality of base signals.

A signal processing method and a program according to the first embodiment of the present disclosure correspond to the signal processing apparatus according to the embodiment of the present disclosure.

According to the first embodiment of the present technology, there is provided a signal processing method performed by a signal processing apparatus, the signal processing method including learning a plurality of base signals of which coefficients become sparse, for each of features of signals, such that the signals are represented by a linear operation of the plurality of base signals.

According to the first embodiment of the present technology, there is provided an output apparatus including an operation unit that operates coefficients of predetermined signals, based on a plurality of base signals of which the coefficients become sparse, learned for each of features of signals such that the signals are represented by a linear operation of the plurality of base signals, and the predetermined signals.

An output method and a program according to the second embodiment of the present disclosure correspond to the output apparatus according to another embodiment of the present disclosure.

According to the second embodiment of the present technology, there is provided an output method performed by an output apparatus, the output method including operating coefficients of predetermined signals, based on a plurality of base signals of which coefficients become sparse, learned for each of features of signals such that the signals are represented by a linear operation of the plurality of base signals, and the predetermined signals.

The signal processing apparatus according to the first embodiment and the output apparatus according to the second embodiment may be independent apparatuses or may be internal blocks constituting one apparatus.

According to the first embodiment of the present disclosure described above, accurate base signals can be learned.

According to the second embodiment of the present disclosure described above, the accurately learned base signals can be obtained and coefficients of the base signals can be operated.

DETAILED DESCRIPTION OF THE EMBODIMENT(S)

Figure 1:
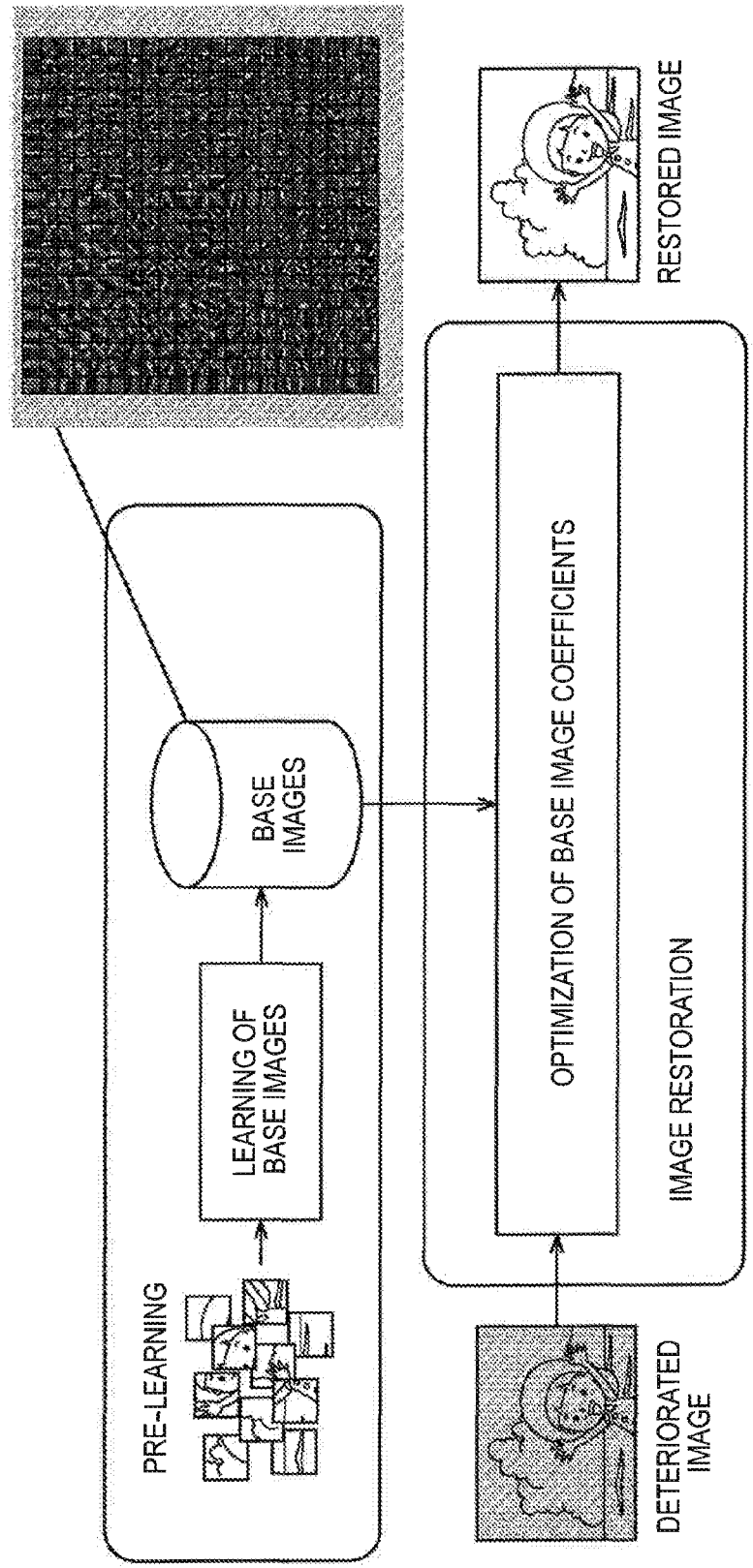
FIG. 1 is a diagram illustrating an outline of image restoration using sparse coding.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<First Embodiment>

[Outline of Image Restoration Using Sparse Coding]

FIG. 1 is a diagram illustrating an outline of image restoration using sparse coding.

As illustrated in FIG. 1, in the image restoration using sparse coding, base images are previously learned using a large amount of learning images not having image quality deterioration and the base images obtained as a result are held. In addition, optimization of base image coefficients is performed with respect to a deteriorated image in which image quality is deteriorated and which is input as an object of the sparse coding, using the base images, and an image not having image quality deterioration that corresponds to the deteriorated image is generated as a restored image, using the optimized base image coefficients and the base images.

[Configuration Example of Learning Apparatus]

Figure 2:
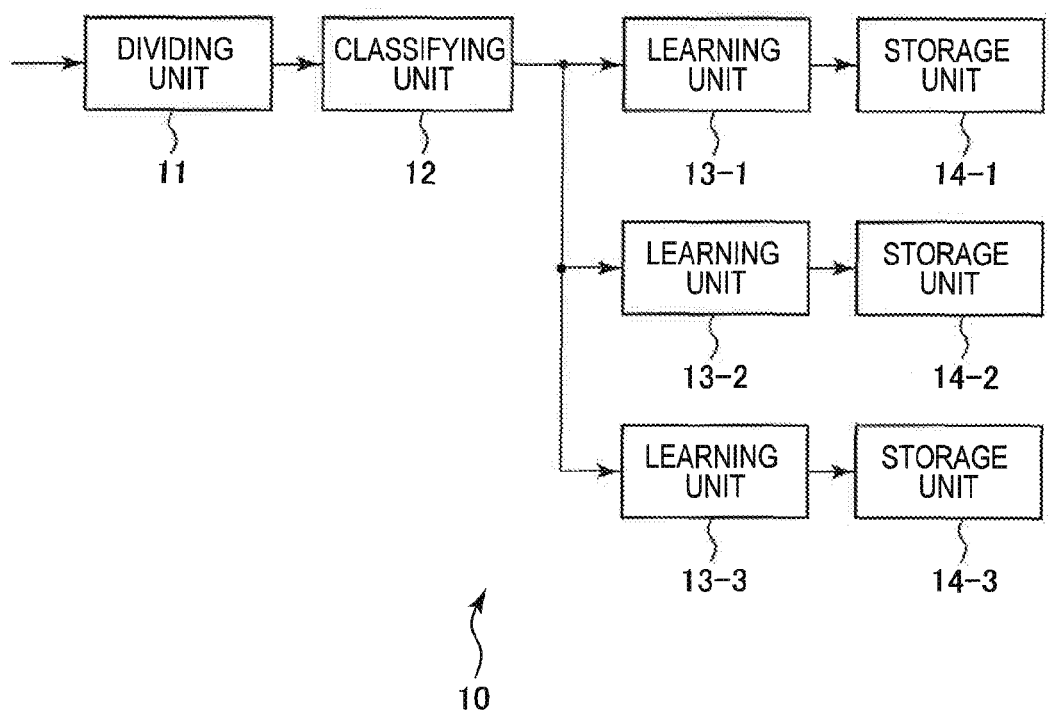
FIG. 2 is a block diagram illustrating a configuration example of a learning apparatus that corresponds to a first embodiment of a signal processing apparatus to which the present disclosure is applied.

FIG. 2 is a block diagram illustrating a configuration example of a learning apparatus that corresponds to a first embodiment of a signal processing apparatus to which the present disclosure is applied.

As illustrated in FIG. 2, a learning apparatus 10 includes a dividing unit 11, a classifying unit 12, learning units 13-1 to 13-3 and a storage unit 14, and learns base images of the sparse coding for the image restoration.

Specifically, still images of a large amount of learning brightness images that do not have image quality deterioration are input from the outside to the dividing unit 11 of the learning apparatus 10. The dividing unit 11 divides the still image of the learning brightness image into blocks having predetermined sizes (for example, 8 ×8 pixels) and supplies the blocks to the learning unit 12.

The classifying unit 12 classifies the blocks supplied from the dividing unit 11 for each feature of bands of the blocks. Specifically, the classifying unit 12 divides the bands of the blocks into a high frequency band (high resolution), an intermediate frequency band (intermediate resolution), and a low frequency band (low resolution). With respect to the blocks of the individual bands generated as a division result, the classifying unit 12 supplies the blocks of the high frequency band to the learning unit 13-1, supplies the blocks of the intermediate frequency band to the learning unit 13-2, and supplies the blocks of the low frequency band to the learning unit 13-3.

The learning unit 13-1 models the blocks of the high frequency band supplied from the classifying unit 12 by the expression 1 and learns a base image of a block unit of the high frequency band. Specifically, the learning unit 13-1 learns the base image of the block unit of the high frequency band, using the blocks of the high frequency band and a cost function defined in the block unit by any one of the expressions 2 to 4. The learning unit 13-1 supplies the learned base image of the block unit of the high frequency band to the storage unit 14-1.

Similar the learning unit 13-1, each of the learning units 13-2 and 13-3 models the blocks supplied from the classifying unit 12 by the expression 1 and learns the base image of the block unit. The learning unit 13-2 supplies a learned base image of the block unit of the intermediate frequency band to the storage unit 14-2 and the learning unit 13-3 supplies a learned base image of the block unit of the low frequency band to the storage unit 14-3.

The storage unit 14-1 stores the base image of the block unit of the high frequency band supplied from the learning unit 13-1. The storage unit 14-2 stores the base image of the block unit of the intermediate frequency band supplied from the learning unit 13-2. The storage unit 14-3 stores the base image of the block unit of the low frequency band supplied from the learning unit 13-3.

Hereinafter, the learning units 13-1 to 13-3 are collectively referred to as the learning units 13, when it is not necessary to distinguish the learning units 13-1 to 13-3 in particular. Likewise, the storage units 14-1 to 14-3 are collectively referred to as the storage units 14.

[Example of Blocks]

Figure 3:
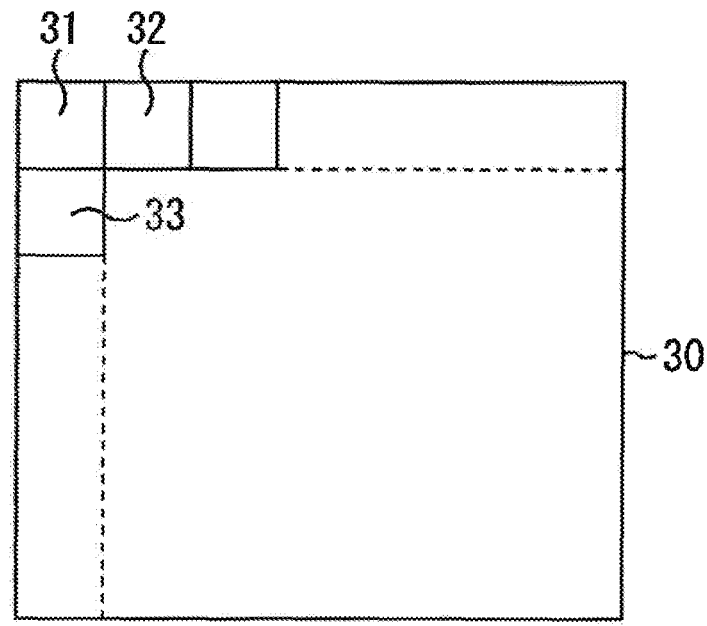
FIG. 3 is a diagram illustrating a first example of blocks divided by a dividing unit of FIG. 2.

FIG. 3 is a diagram illustrating a first example of blocks divided by the dividing unit 11 of FIG. 2.

In the example of FIG. 3, the dividing unit 11 divides a still image 30 of a learning brightness image into blocks having predetermined sizes. Therefore, a block 31 and a block 32 that are adjacent to each other in a horizontal direction and the block 31 and a block 33 that are adjacent to each other in a vertical direction do not overlap each other.

Figure 4:
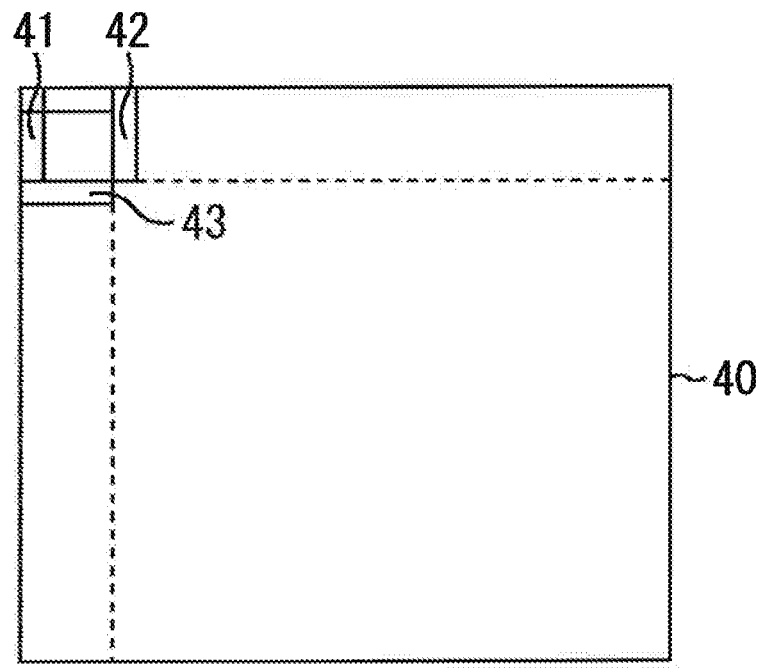
FIG. 4 is a diagram illustrating a second example of blocks divided by the dividing unit of FIG. 2.

FIG. 4 is a diagram illustrating a second example of blocks divided by the dividing unit 11 of FIG. 2.

In the example of FIG. 4, the dividing unit 11 divides a still image 40 of a learning brightness image into blocks having predetermined sizes (block sizes) that are adjacent to each other in a horizontal direction and a vertical direction at intervals (in the example of FIG. 4, ¼ of the block sizes) smaller than the block sizes. Therefore, a block 41 and a block 42 that are adjacent to each other in the horizontal direction and the block 41 and a block 43 that are adjacent to each other in the vertical direction overlap each other.

As illustrated in FIG. 4, in the case in which the blocks are divided to overlap each other, a learning processing amount increases, but learning precision is improved, as compared with the case of FIG. 3. A shape of the blocks is not limited to a square.

[Configuration Example of Band Dividing Unit]

Figure 5:
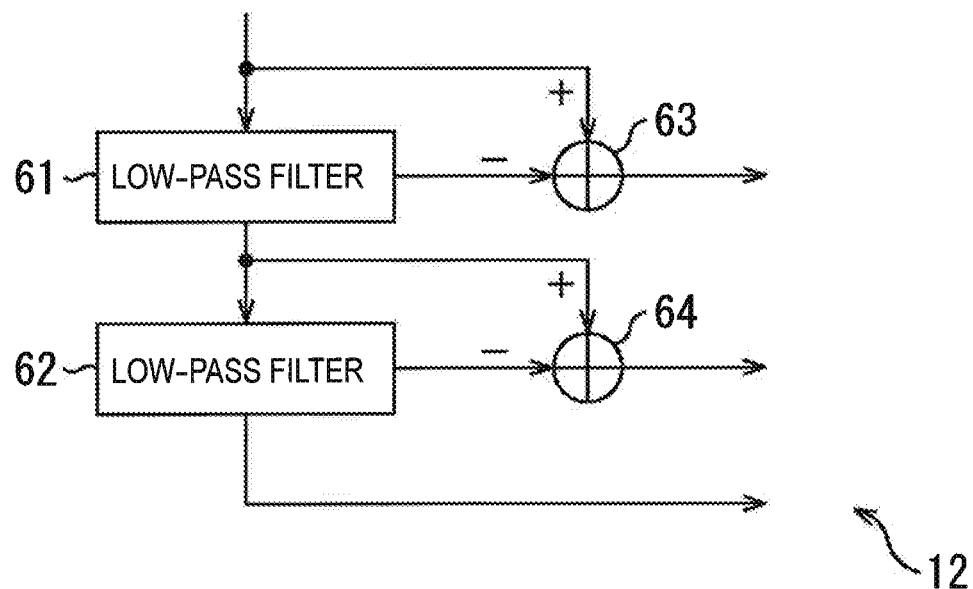
FIG. 5 is a block diagram illustrating a configuration example of a classifying unit of FIG. 2.

FIG. 5 is a block diagram illustrating a configuration example of the classifying unit 12 FIG. 2.

As illustrated in FIG. 5, the classifying unit 12 includes a low-pass filter 61, a low-pass filter 62, a subtracting unit 63, and a subtracting unit 64.

The blocks are input from the dividing unit 11 of FIG. 2 to the low-pass filter 61. The low-pass filter 61 extracts the blocks of the low frequency band among the input blocks and supplies the blocks to the low-pass filter 62, the subtracting unit 63, and the subtracting unit 64.

The low-pass filter 62 extracts the blocks of a further low frequency band among the blocks of the low frequency band supplied from the low-pass filter 61. The low-pass filter 62 supplies the extracted blocks of the low frequency band to the subtracting unit 64 and the learning unit 13-3 (refer to FIG. 2).

The subtracting unit 63 subtracts the blocks of the low frequency band supplied from the low-pass filter 61 from the blocks input from the dividing unit 11 and supplies the obtained blocks of the high frequency band to the learning unit 13-1.

The subtracting unit 64 subtracts the blocks of the further low frequency band supplied from the low-pass filter 62, from the blocks of the low frequency band supplied from the low-pass filter 61, and supplies the obtained blocks of the band between the high frequency band and the low frequency band as the blocks of the intermediate frequency band to the learning unit 13-2.

[Explanation of Processing of Learning Apparatus]

Figure 6:
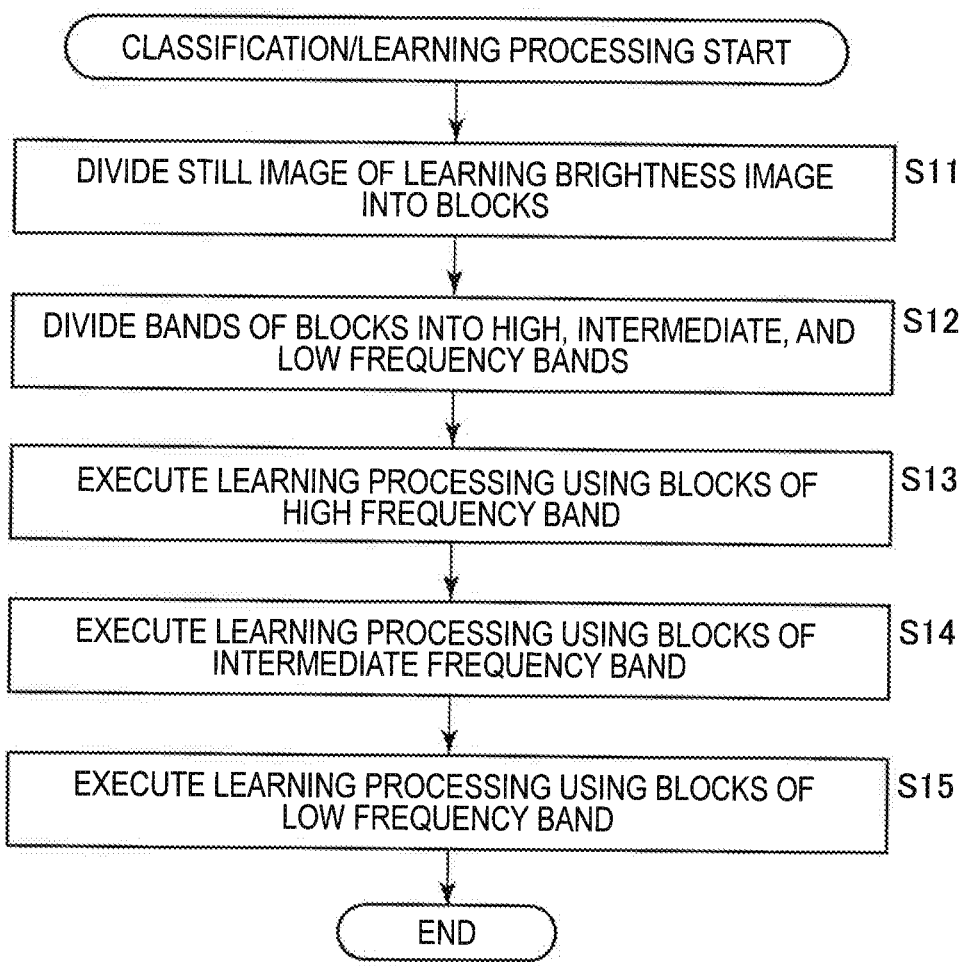
FIG. 6 is a flowchart illustrating classification/learning processing of the learning apparatus of FIG. 2.

FIG. 6 is a flowchart illustrating classification/learning processing of the learning apparatus 10 of FIG. 2. The classification/learning processing is performed off-line when the still images of all the learning brightness images are input from the outside to the learning apparatus 10.

In step S11 of FIG. 6, the dividing unit 11 divides the still image of the learning brightness image input from the outside into the blocks having the predetermined sizes and supplies the blocks to the learning unit 12. In step S12, the classifying unit 12 divides the bands of the blocks supplied from the dividing unit 11 into the high frequency hand, the intermediate frequency band, and the low frequency band. With respect to the blocks generated as the division result, the classifying unit 12 supplies the blocks of the high frequency band to the learning unit 13-1, supplies the blocks of the intermediate frequency band to the learning unit 13-2, and supplies the blocks of the low frequency band to the learning unit 13-3.

In step S13, the learning unit 13-1 executes learning processing for learning the base image of the block unit, using the blocks of the high frequency band supplied from the classifying unit 12 and the cost function defined in the block unit by any one of the expressions 2 to 4. The learning unit 13-1 supplies the learned base image of the block unit of the high frequency band to the storage unit 14-1.

In step S14, the learning unit 13-2 executes the learning processing, using the block of the intermediate frequency band supplied from the dividing unit 11 and the cost function defined in the block unit by any one of the expressions 2 to 4. The learning unit 13-2 supplies the learned base image of the block unit of the intermediate frequency band to the storage unit 14-2

In step S15, the learning unit 13-3 executes learning processing for learning the base image of the block unit, using the blocks of the low frequency band supplied from the dividing unit 11 and the cost function defined in the block unit by any one of the expressions 2 to 4. The learning unit 13-3 supplies the learned base image of the block unit of the low frequency band to the storage unit 14-3. Then, the processing ends.

Figure 7:
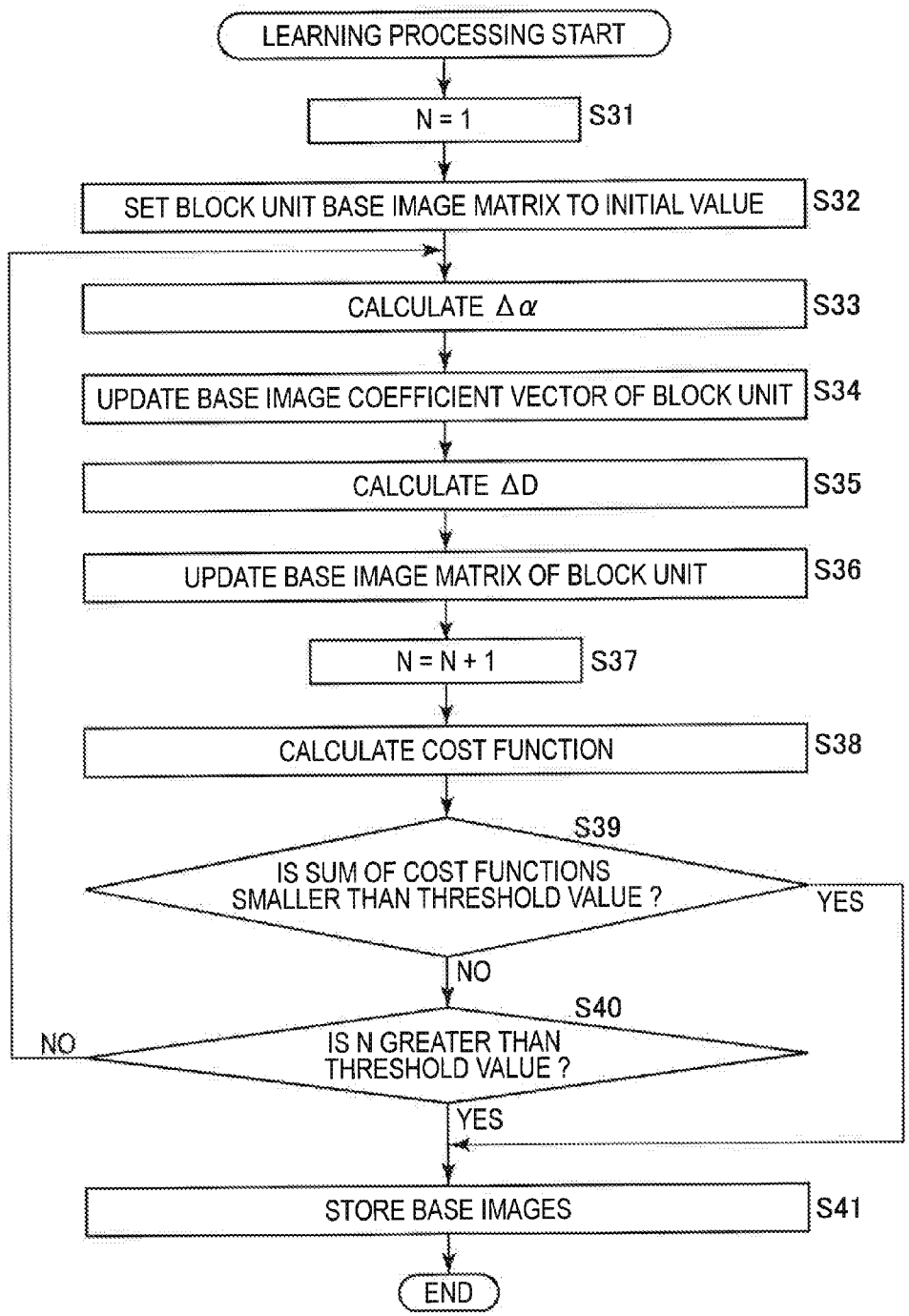
FIG. 7 is a flowchart illustrating learning processing of a learning unit of FIG. 2.

FIG. 7 is a flowchart illustrating the learning processing of the learning unit 13.

In step S31 of FIG. 7, the learning unit 13 sets the number of times N of repeating the learning to 1. Processing of following steps S32 to S36 and S38 is executed for every block, with respect to all blocks of the still images of all the learning brightness images.

In step S32, the learning unit 13 sets a value of a base image matrix of the block unit to an initial value. In step S33, the learning unit 13 calculates a value obtained by partially differentiating the cost function defined in the block unit by any one of the expressions 2 to 4 by $\alpha$ as $\Delta\alpha$, using the set base image matrix of the block unit and the blocks supplied from the classifying unit 12.

In step S34, the learning unit 13 updates a base image coefficient vector of the block unit by the following expression 5, using $\Delta\alpha$ calculated in step S33.

$$\alpha = \alpha + \eta_1 \Delta\alpha \quad (5)$$

In the expression 5, $\alpha$ denotes a block unit base image coefficient vector and $\eta_1$ denotes a parameter of the steepest descent method.

In step S35, the learning unit 13 calculates a value obtained by partially differentiating the cost function defined in the block unit by any one of the expressions 2 to 4 by D as $\Delta D$, using the base image coefficient vector of the block unit updated by step S34 and the blocks.

In step S36, the learning unit 13 updates the base image matrix of the block unit by the following expression 6, using $\Delta D$ calculated by step S35.

$$D = D + \eta_2 \Delta D \quad (6)$$

In the expression 6, D denotes a block unit base image matrix and $\eta_2$ denotes a parameter of the steepest descent method.

In step S37, the learning unit 13 increments the number of times N of repeating the learning by 1. In step S38, the learning unit 13 calculates the cost function defined in the block unit by any one of the expressions 2 to 4, using the base image coefficient vector of the block unit updated by step S34, the base image matrix of the block unit updated by step S36, and the blocks.

In step S39, the learning unit 13 determines whether the sum of the cost functions of the blocks of the still images of all the learning brightness images is smaller than the predetermined threshold value. When it is determined in step S39 that the sum of the cost functions is equal to or greater than the predetermined threshold value, the processing proceeds to step S40.

In step S40, the learning unit 13 determines whether the number of times N of repeating the learning is greater than the predetermined threshold value. When it is determined in step S40 that the number of times N of repeating the learning is the predetermined threshold value or smaller, the processing returns to step S33. The processing of steps S33 to S40 is repeated until the sum of the cost functions becomes smaller than the predetermined threshold value or the number of times N of repeating the learning becomes greater than the predetermined threshold value.

Meanwhile, when it is determined in step S39 that the sum of the cost functions is smaller than the predetermined threshold value or when it is determined in step S40 that the number of times N of repeating the learning is greater than the predetermined threshold value, the processing proceeds to step S41.

In step S41, the learning unit 13 supplies the base images of the block units constituting the block unit base image matrix updated by immediately previous step S36 to the storage unit 14 and causes the storage unit 14 to store the base images.

As described above, in the learning processing of FIG. 7, the learning unit 13 updates the base image matrix using a KSVD method and calculates the base coefficient vector using a matching pursuit method. The KSVD method and the matching pursuit method are described in detail in Michal Aharon, Michael Elad, and Alred Bruckstein, "K-SVD: An Algorithm for Designing Overcomplete Dictionaries for Sparse Representation", IEEE TRANSACTION ON SIGNAL PROCESSING, VOL. 54, NO. 11, NOVEMBER 2006, P4311-4322.

In this case, the block unit base image matrix is repetitively learned using all the blocks of the still images of all the learning brightness images. However, repetition learning using each block may be sequentially performed.

As described above, the learning apparatus 10 learns a base image, for each feature of hands of the still image of the learning brightness image, such that the still image of the learning brightness image is represented by a linear operation of base images of which base image coefficients become sparse. Therefore, an accurate base image for each feature of the bands can be learned.

In the sparse coding, because the base images are learned such that the base image coefficients become sparse, a convergence time of the base images is generally long. Therefore, the learning apparatus 10 can decrease the convergence time of the base images by learning the base image for each feature of the bands. Because the learning apparatus 10 learns the base image for each feature of the bands, the learning apparatus 10 can execute the learning processing in parallel, for each feature of the bands.

[First Configuration Example of Image Generating Apparatus]

Figure 8:
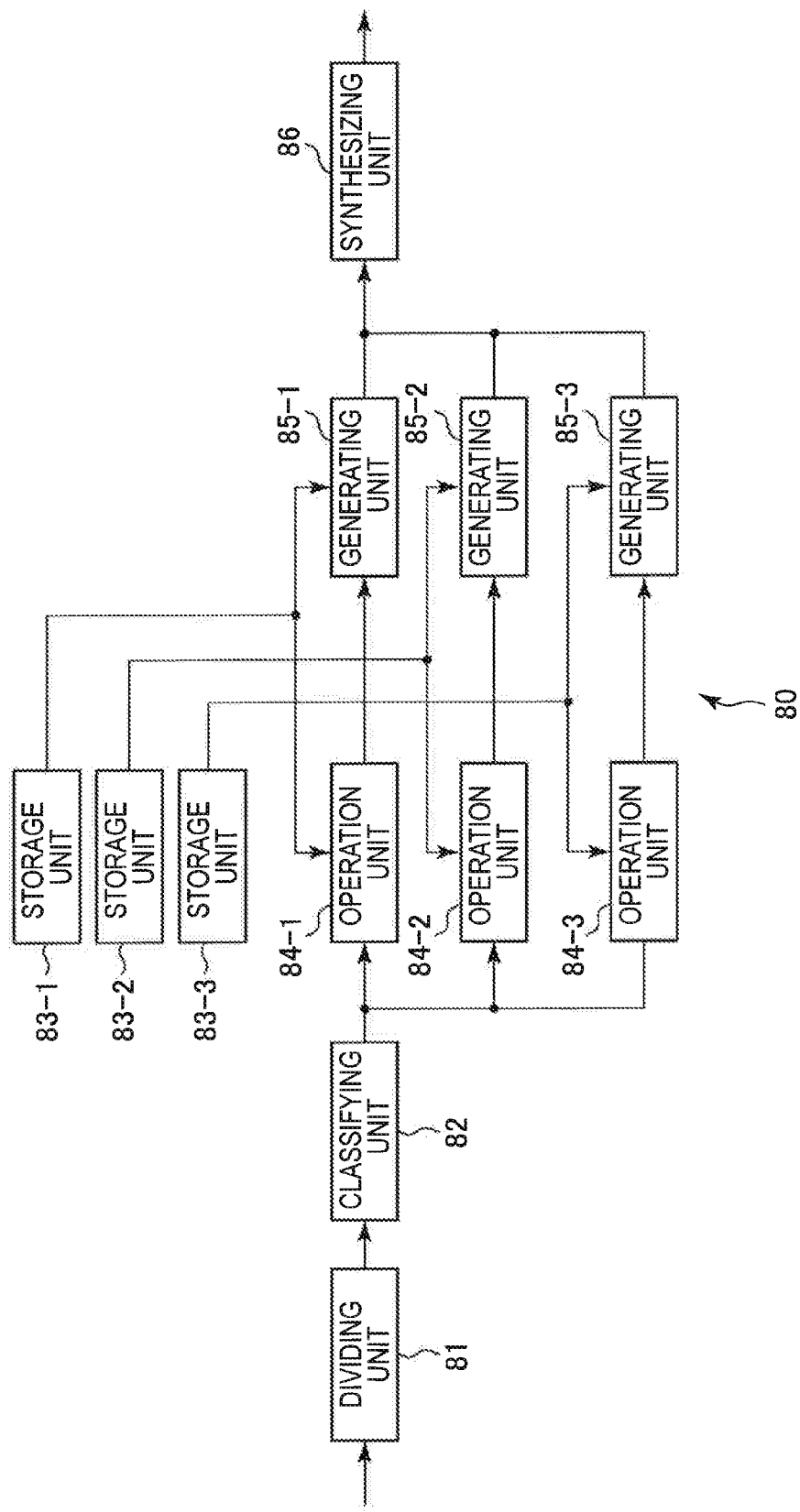
FIG. 8 is a block diagram illustrating a first configuration example of an image generating apparatus that corresponds to a first embodiment of an output apparatus to which the present disclosure is applied.

FIG. 8 is a block diagram illustrating a first configuration example of an image generating apparatus that generates an image using the base images for each feature of the bands learned by the learning apparatus 10 of FIG. 2 and corresponds to a first embodiment of an output apparatus to which the present disclosure is applied.

As illustrated in FIG. 8, an image generating apparatus 80 includes a dividing unit 81, a classifying unit 82, storage units 83-1 to 83-3, operation units 84-1 to 84-3, generating units 85-1 to 85-3, and a synthesizing unit 86. The image generating apparatus 80 performs sparse coding for each band, with respect to a still image of a brightness image input as a deteriorated image from the outside, and generates a restored image.

Specifically, the still image of the brightness image is input as the deteriorated image from the outside to the dividing unit 81 of the image generating apparatus 80. The dividing unit 81 divides the deteriorated image input from the outside into blocks having predetermined sizes and supplies the blocks to the classifying unit 82, similar to the dividing unit 11 of FIG. 2.

The classifying unit 82 has the same configuration as the classifying unit 12 of FIG. 5 and divides the bands of the blocks divided by the dividing unit 81 into the high frequency band, the intermediate frequency band, and the low frequency band. With respect to the blocks obtained as a division result, the classifying unit 82 supplies the blocks of the high frequency band to the operation unit 84-1, supplies the blocks of the intermediate frequency band to the operation unit 84-2, and supplies the blocks of the low frequency band to the operation unit 84-3.

The storage unit 83-1 stores the base image of the block unit of the high frequency band that is learned by the learning apparatus 10 of FIG. 2 and is stored in the storage unit 14-1. The storage unit 83-2 stores the base mage of the block unit of the intermediate frequency band that is stored in the storage unit 14-2 and the storage unit 83-3 stores the base image of the block unit of the low frequency band that is stored in the storage unit 14-3.

The operation unit 84-1 reads the base image of the block unit of the high frequency band from the storage unit 83-1. The operation unit 84-1 operates the base image coefficient vector of the block unit, for each block of the high frequency band of the deteriorated image supplied from the classifying unit 82, such that the cost function becomes smaller than the predetermined threshold value. The cost function is defined in the block unit by an expression obtained by setting Y of any one of the expressions 2 to 4 to a vector (hereinafter, referred to as a deteriorated image vector) in which pixel values of individual pixels of the deteriorated image are arranged in a column direction, using the base image matrix of the block unit including the read base image of the block unit. The operation unit 84-1 supplies the operated base image coefficient vector of the block unit to the generating unit 85-1.

Similar to the operation unit 84-1, the operation units 84-2 and 84-3 read the base images of the block units from the storage units 83-2 and 83-3, respectively, and operate the base image coefficient vectors of the block units, for each block supplied from the classifying unit 82. The operation unit 84-2 supplies the operated base image coefficient vector of the block unit to the generating unit 85-2 and the operation unit 84-3 supplies the operated base image coefficient vector of the block unit to the generating unit 85-3.

The generating unit 85-1 reads the base image of the block unit of the high frequency band from the storage unit 83-1. The generating unit 85-1 generates the still image of the brightness image of the block unit by the following expression 7, for each block, using the base image coefficient vector of the block unit supplied from the operation unit 84-1 and the base image matrix of the block unit including the base image of the block unit of the high frequency band.

$$X = D \times \alpha$$

In the expression 7, X denotes a vector (hereinafter, referred to as a generation image vector) in which pixel values of individual pixels of the generated still image of the brightness image of the block unit are arranged in the column direction, D denotes a block unit base mage matrix, and a denotes a block unit base image coefficient vector.

The generating unit 85-1 sets the generated still image of the brightness image of the block unit as the still image of the brightness image of the block unit of the high frequency band and generates a still image of one brightness image of the high frequency band, from the still image of the brightness image of the block unit of the high frequency band. In addition, the generating unit 85-1 supplies the still image of one brightness image of the high frequency band as a restored image of the high frequency band to the synthesizing unit 86.

Similar to the generating unit 85-1, the generating units 85-2 and 85-3 read the base images of the block units from the storage units 83-2 and 83-3, respectively, and generate still images of brightness images of the block units. Similar to the generating unit 85-1, the generating unit 85-2 generates a restored image of the intermediate frequency band from the generated still image of the brightness image of the block unit and supplies the restored image to the synthesizing unit 86. The generating unit 85-3 generates a restored image of the low frequency band from the generated still image of the brightness image of the block unit and supplies the restored image to the synthesizing unit 86.

The synthesizing unit 86 synthesizes the restored images of the high frequency band, the intermediate frequency band, and the low frequency band supplied from the generating units 85-1 to 85-3, respectively, and outputs a restored image of all the bands obtained as a synthesis result.

Hereinafter, the storage units 83-1 to 83-3 are collectively referred to as the storage units 83, when it is not necessary to distinguish the storage units 83-1 to 83-3 in particular. Likewise, the operation units 84-1 to 84-3 are collectively referred to as the operation units 84 and the generating units 85-1 to 85-3 are collectively referred to as the generating units 85.

[Explanation of Processing of Generating Unit]

Figure 9:
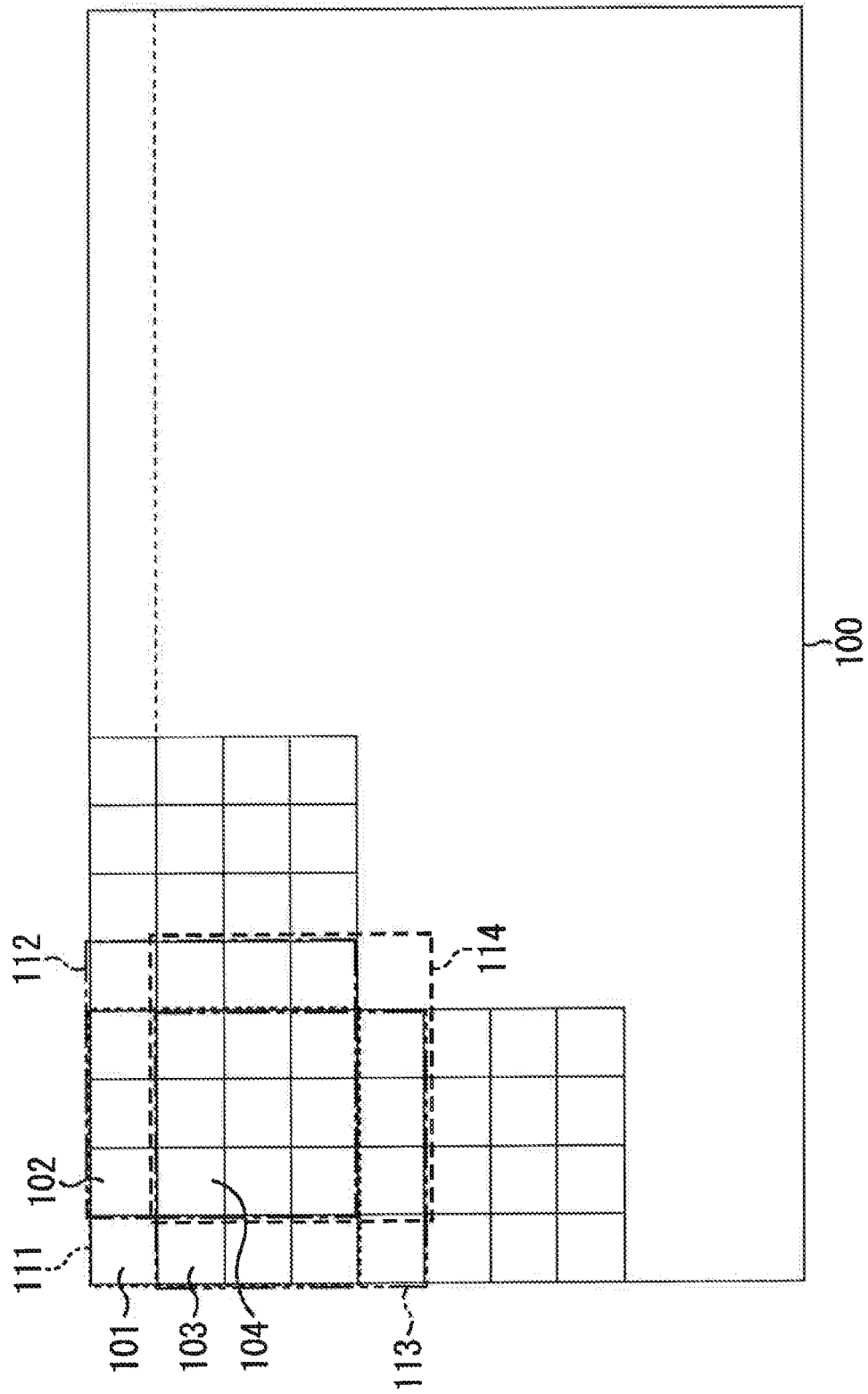
FIG. 9 is a diagram illustrating processing of a generating unit of FIG. 8.

FIG. 9 is a diagram illustrating processing of the generating unit 85 when the dividing unit 81 in FIG. 8 divides the deteriorated image into the blocks illustrated in FIG. 4.

In FIG. 9, a square of a solid line shows a pixel and a square of a dotted line shows a block. In an example of FIG. 9, a size of the block is 4×4 pixels.

As illustrated in FIG. 9, when the dividing unit 81 divides a deteriorated image 100 into the blocks illustrated in FIG. 4, the generating unit 85 generates an average value of components of a block unit generation image vector of a block corresponding to each pixel, as a pixel value of each pixel of the restored image.

Specifically, an upper left pixel 101 is included in only a block 111. Therefore, the generating unit 85 sets a pixel value of the pixel 101 as a component of a generation image vector of the block 111 corresponding to the pixel 101.

Meanwhile, a pixel 102 that is adjacent to the right side of the pixel 101 is included in the block 111 and a block 112. Therefore, the generating unit 85 sets a pixel value of the pixel 102 as an average value of components of generation image vectors of the block 111 and the block 112 corresponding to the pixel 102.

A pixel 103 that is arranged below the pixel 101 is included in the block 111 and a block 113. Therefore, the generating unit 85 sets a pixel value of the pixel 103 as an average value of components of block unit generation image vectors of the block 111 and the block 113 corresponding to the pixel 103.

A pixel 104 that is adjacent to the right side of the pixel 103 is included in the block 111 to a block 114. Therefore, the generating unit 85 sets a pixel value of the pixel 104 as an average value of components of block unit generation image vectors of the block 111 to the block 114 corresponding to the pixel 104.

Meanwhile, although not illustrated in the drawings, when the dividing unit 81 divides the deteriorated image into the blocks illustrated in FIG. 3, the generating unit 85 synthesizes each component of a block unit generation image vector as a pixel value of a pixel corresponding to each component and generates a restored image.

[Explanation of Processing of Image Generating Apparatus 80]

Figure 10:
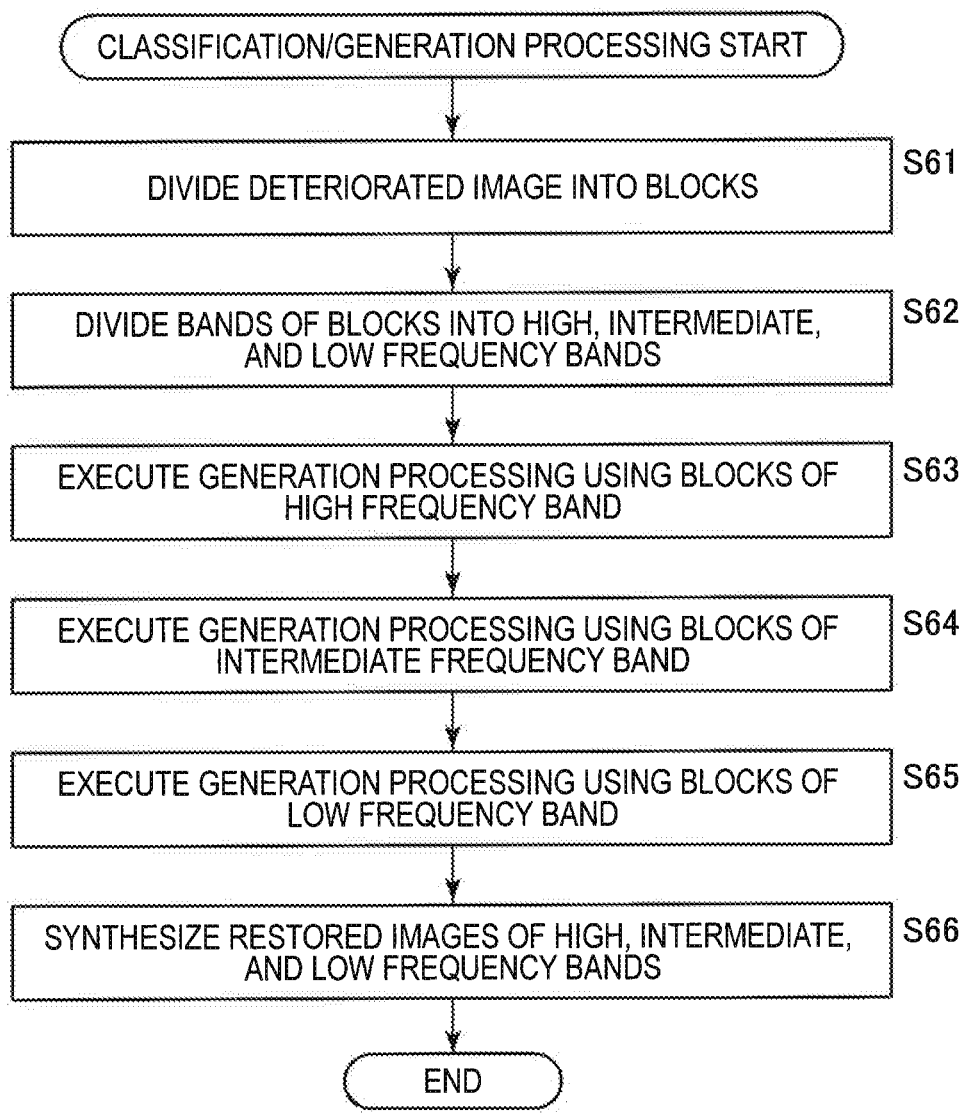
FIG. 10 is a flowchart illustrating classification/generation processing of the image generating apparatus of FIG. 8.

FIG. 10 is a flowchart illustrating classification/generation processing of the image generating apparatus 80 of FIG. 8. The classification/generation processing starts when a still image of a brightness image is input as a deteriorated image from the outside.

In step S61 of FIG. 10, the dividing unit 81 of the image generating apparatus 80 divides the still image of the brightness image input as the deteriorated image from the outside into blocks having predetermined sizes and supplies the blocks to the classifying unit 82, similar to the dividing unit 11 of FIG. 2.

In step S62, the classifying unit 82 divides the bands of the blocks supplied from the classifying unit 81 into the high frequency band, the intermediate frequency band, and the low frequency band. With respect to the blocks obtained as a division result, the classifying unit 82 supplies the blocks of the high frequency band to the operation unit 84-1, supplies the blocks of the intermediate frequency band to the operation unit 84-2, and supplies the blocks of the low frequency band to the operation unit 84-3.

In step S63, the image generating apparatus 80 executes generation processing for generating a still image of one brightness image using the blocks of the high frequency band.

In step S64, the image generating apparatus 80 executes the generation processing using the blocks of the intermediate frequency band. In step S65, the image processing apparatus 80 executes the generation processing using the blocks of the low-frequency band.

In step S66, the synthesizing unit 86 synthesizes the restored images of the high frequency band, the intermediate frequency band, and the low frequency band supplied from the generating units 85-1 to 85-3, respectively, and outputs the restored image of all the bands obtained as the synthesis result. Then, the processing ends.

Figure 11:
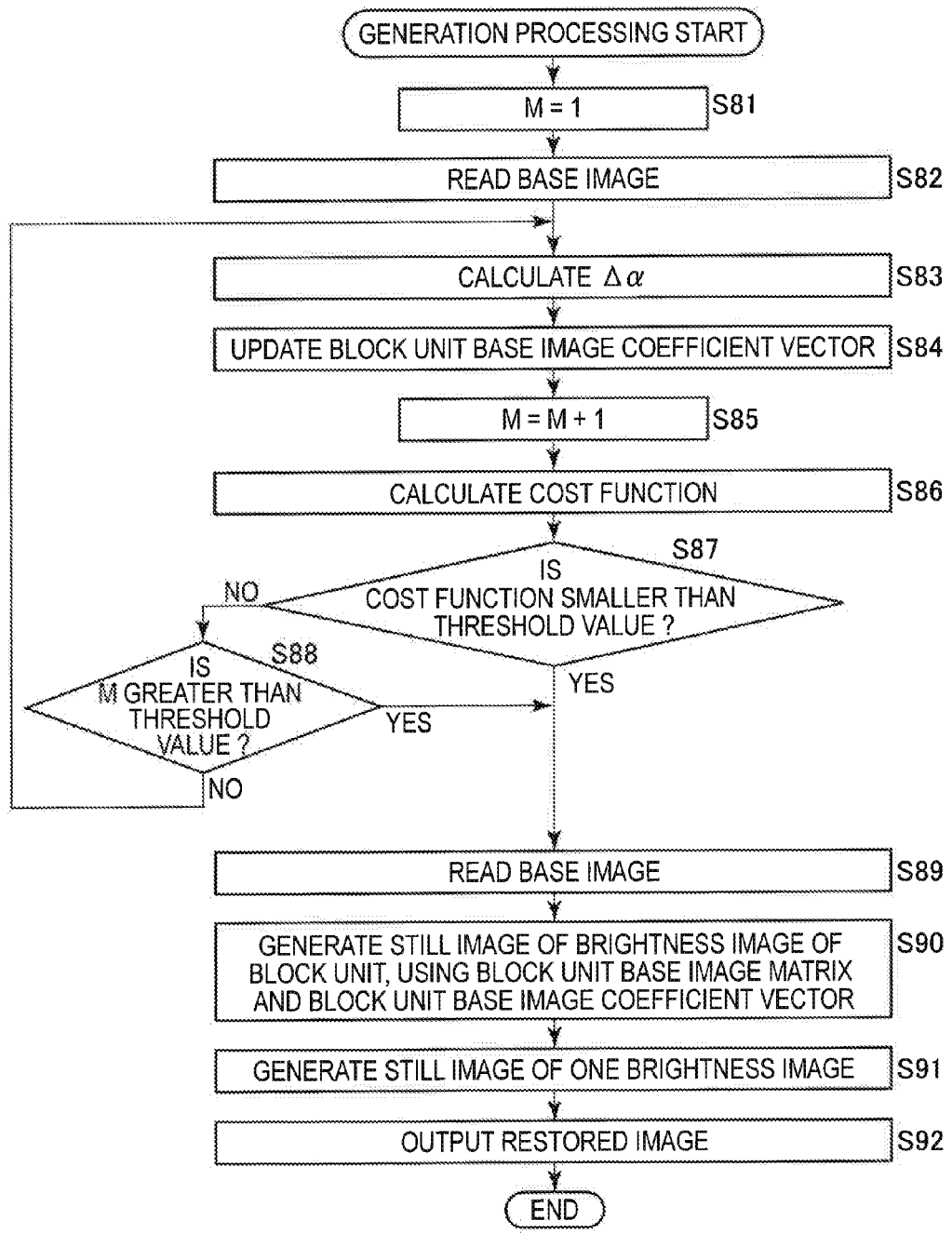
FIG. 11 is a flowchart illustrating generation processing of the image generating apparatus of FIG. 8.

FIG. 11 is a flowchart illustrating the generation processing of the image generating apparatus 80.

Processing of steps S81 to S90 of FIG. 11 is executed in the block unit.

In step S81 in FIG. 11, the operation unit 84 sets the number of times M of repeating the operation of the block unit base image coefficient vector to 1.

In step S82, the operation unit 84 reads the base image of the block unit from the storage unit 83. In step S83, the operation unit 84 calculates a value obtained by partially differentiating the cost function defined in the block unit by any one of the expressions obtained by setting Y of the expressions 2 to 4 to the deteriorated image vector by $\alpha$ as $\Delta\alpha$, using the base image matrix of the block unit including the read base image of the block unit and the blocks supplied from the classifying unit 82.

In step S84, the operation unit 84 updates the block unit base image coefficient vector by the expression 5, using $\Delta\alpha$ calculated by step S83. In step S85, the operation unit 84 increments the number of times M of repeating the operation by 1.

In step S86, the operation unit 84 calculates the cost function defined in a block unit by any one of expressions obtained by setting Y of the expressions 2 to 4 to the deteriorated image vector, using the block unit base image coefficient vector updated by step S84, the block unit base image matrix, and the blocks of the deteriorated image.

In step S87, the operation unit 84 determines whether the cost function is smaller than the predetermined threshold value. When it is determined in step S87 that the cost function is the predetermined threshold value or greater, in step S88, the operation unit 84 determines whether the number of times M of repeating the operation is greater than the predetermined threshold value.

When it is determined in step S88 that the number of times M of repeating the operation is the predetermined threshold value or smaller, the operation unit 84 returns the processing to step S83. The processing of steps S83 to S88 is repeated until the cost function becomes smaller than the predetermined threshold value or the number of times M of repeating the operation becomes greater than the predetermined threshold value.

Meanwhile, when it is determined in step S87 that the cost function is smaller than the predetermined threshold value or when it is determined in step S88 that the number of times M of repeating the operation is greater than the predetermined threshold value, the operation unit 84 supplies the block unit base image coefficient vector updated by immediately previous step S84 to the generating unit 85.

In step S89, the generating unit 85 reads the base image of the block unit from the storage unit 83. In step S90, the generating unit 85 generates the still image of the brightness image of the block unit by the expression 7, using the block unit base image matrix including the read base image of the block unit and the block unit base image coefficient vector supplied from the operation unit 84.

In step S91, the generating unit 85 generates a still image of one brightness image from the still image of the brightness image of the block unit, according to a block division method. In step S92, the generating unit 85 outputs the generated still image of one brightness image to the synthesizing unit 86 as a restored image and ends the processing.

As described above, the image generating apparatus 80 obtains the base image learned by the learning apparatus 10 for each feature of the bands and operates the base image coefficient thr each feature of the bands, based on the base image for each feature of the bands and the deteriorated image. Therefore, the image generating apparatus 80 can generate a restored image in which an image quality of an important portion such as a texture or an edge has been improved, using the base image and the base image coefficient for each feature of the bands.

In the sparse coding, because the base image coefficients are operated such that the base image coefficients become sparse, a convergence time of the base image coefficients is generally long. Therefore, by operating the base image coefficient for each feature of the bands, the image generating apparatus 80 can decrease the convergence time of the base image coefficients.

The image generating apparatus 80 generates the restored image for each feature of the bands, using the base image and the base image coefficient for each feature of the bands. Therefore, the image generating apparatus 80 can execute the generation processing in parallel, for each feature of the bands.

[Second Configuration Example of Image Generating Apparatus]

Figure 12:
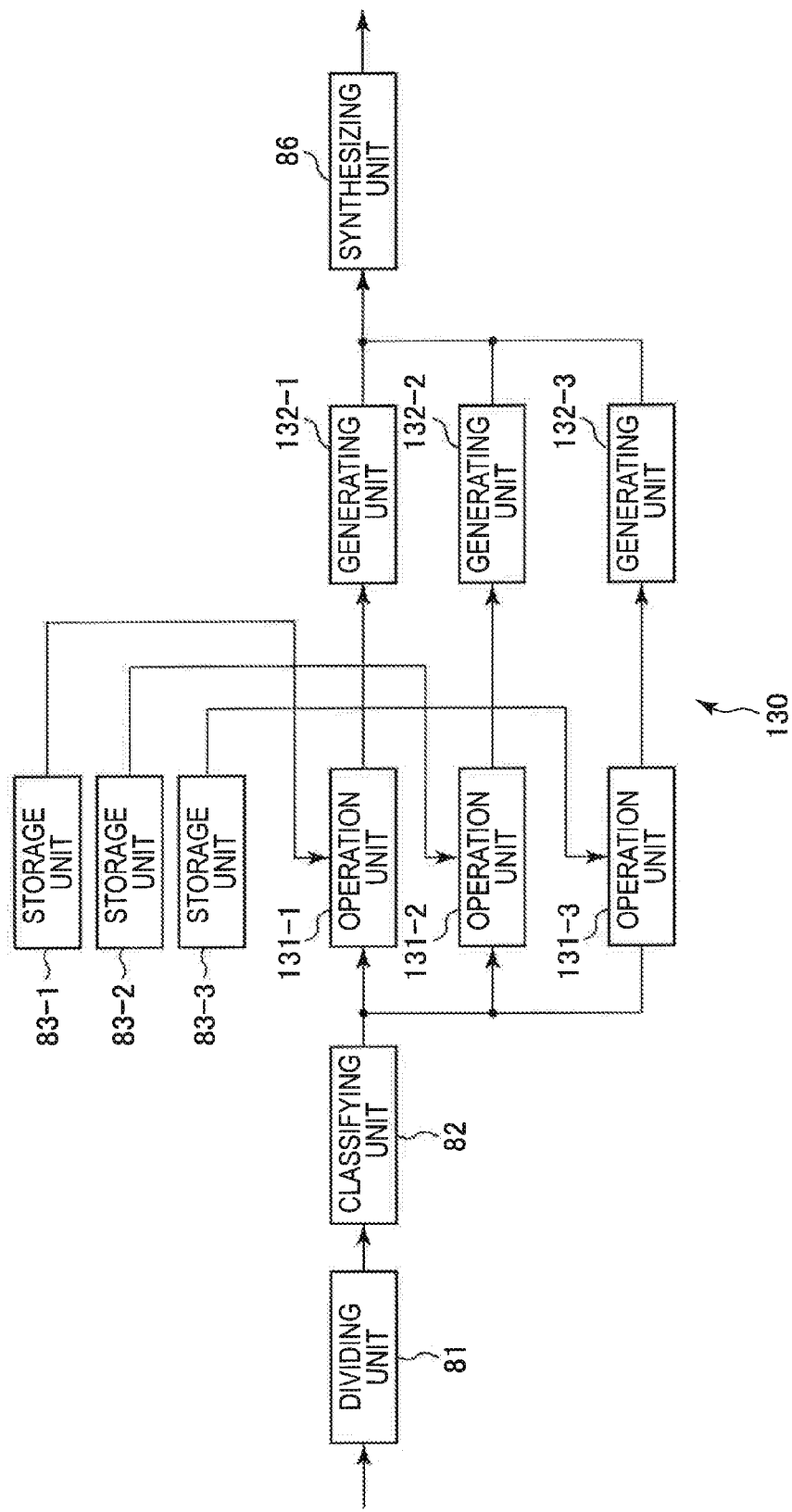
FIG. 12 is a block diagram illustrating a second configuration example of an image generating apparatus that corresponds to the first embodiment of the output apparatus to which the present disclosure is applied.

FIG. 12 is a block diagram illustrating a second configuration example of an image generating apparatus that generates an image using the base images learned by the learning apparatus 10 of FIG. 2 and corresponds to the first embodiment of the output apparatus to which the present disclosure is applied.

Among structural elements illustrated in FIG. 12, the structural elements that are the same as the structural elements of FIG. 8 are denoted with the same reference numerals. Repeated explanation of these structural elements is omitted.

A configuration of an image generating apparatus 130 of FIG. 12 is different from the configuration of FIG. 8 in that operation units 131-1 to 131-3 are provided, instead of the operation units 84-1 to 84-3, and a generating units 132-1 to 132-3 are provided, instead of the generating units 85-1 to 85-3. The image generating apparatus 130 generates a restored image and learns base images.

Specifically, the operation unit 131-1 of the image generating apparatus 130 reads the base image of the block unit from the storage unit 83-1, similar to the operation unit 84-1 of FIG. 8. The operation unit 131-1 operates the block unit base image coefficient vector while learning the block unit base image matrix of the high frequency band, for each block of the deteriorated image of the high frequency band supplied from the dividing unit 82, such that the cost function becomes smaller than the predetermined threshold value.

The cost function is defined in a block unit by an expression obtained by setting Y of any one of the expressions 2 to 4 to a deteriorated image vector, using the block unit base image matrix including the read base image of the block unit. The operation unit 131-1 supplies the learned block unit base image matrix of the high frequency band and the block unit base image coefficient vector to the generating unit 132-1.

Similar to the operation unit 131-1, each of the operation units 131-2 and 131-3 operates the base image coefficient vector of the block unit while learning the base image matrix of the block unit, for each of the blocks supplied from the classifying unit 82. The operation unit 131-2 supplies the learned base image matrix of the block unit of the intermediate frequency band and the base image coefficient vector of the block unit to the generating unit 132-2. The operation unit 131-3 supplies the learned base image matrix of the block unit of the low frequency band and the base image coefficient vector of the block unit to the generating unit 132-3.

Hereinafter, the operation units 131-1 to 131-3 are collectively referred to as the operation units 131, when it is not necessary to distinguish the operation units 131-1 to 131-3 in particular.

The generating unit 132-1 generates a still image of a brightness image of the block unit by the expression 7, for each block, using the base image coefficient vector of the block unit and the base image matrix of the block unit of the high frequency band supplied from the operation unit 131-1. Similar to the generating unit 85-1 of FIG. 8, the generating unit 132 generates a restored image of the high frequency band from the generated still image of the brightness image of the block unit and supplies the restored image to the synthesizing unit 86.

Similar to the generating unit 132-1, each of the generating units 132-2 and 132-3 generates a still image of a brightness image of the block unit, using the base image coefficient vector of the block unit and the base image matrix of the block unit supplied from the operation unit 131. Similar to the generating unit 85-2, the generating unit 132-2 generates a restored image of the intermediate frequency band from the generated still image of the brightness image of the block unit and supplies the restored image to the synthesizing unit 86. Similar to the generating unit 85-3, the generating unit 132-3 generates a restored image of the low frequency band from the generated still image of the brightness image of the block unit and supplies the restored image to the synthesizing unit 86.

Hereinafter, the generating units 132-1 to 132-3 are collectively referred to as the generating units 132, when it is not necessary to distinguish the generating units 132-1 to 132-3 in particular.

[Explanation of Processing of Image Generating Apparatus 130]

Because classification/generation processing of the image generating apparatus 130 of FIG. 12 is the same as the classification/generation processing of Ha 10, except for the generation processing, only the generation processing will be described.

Figure 13:
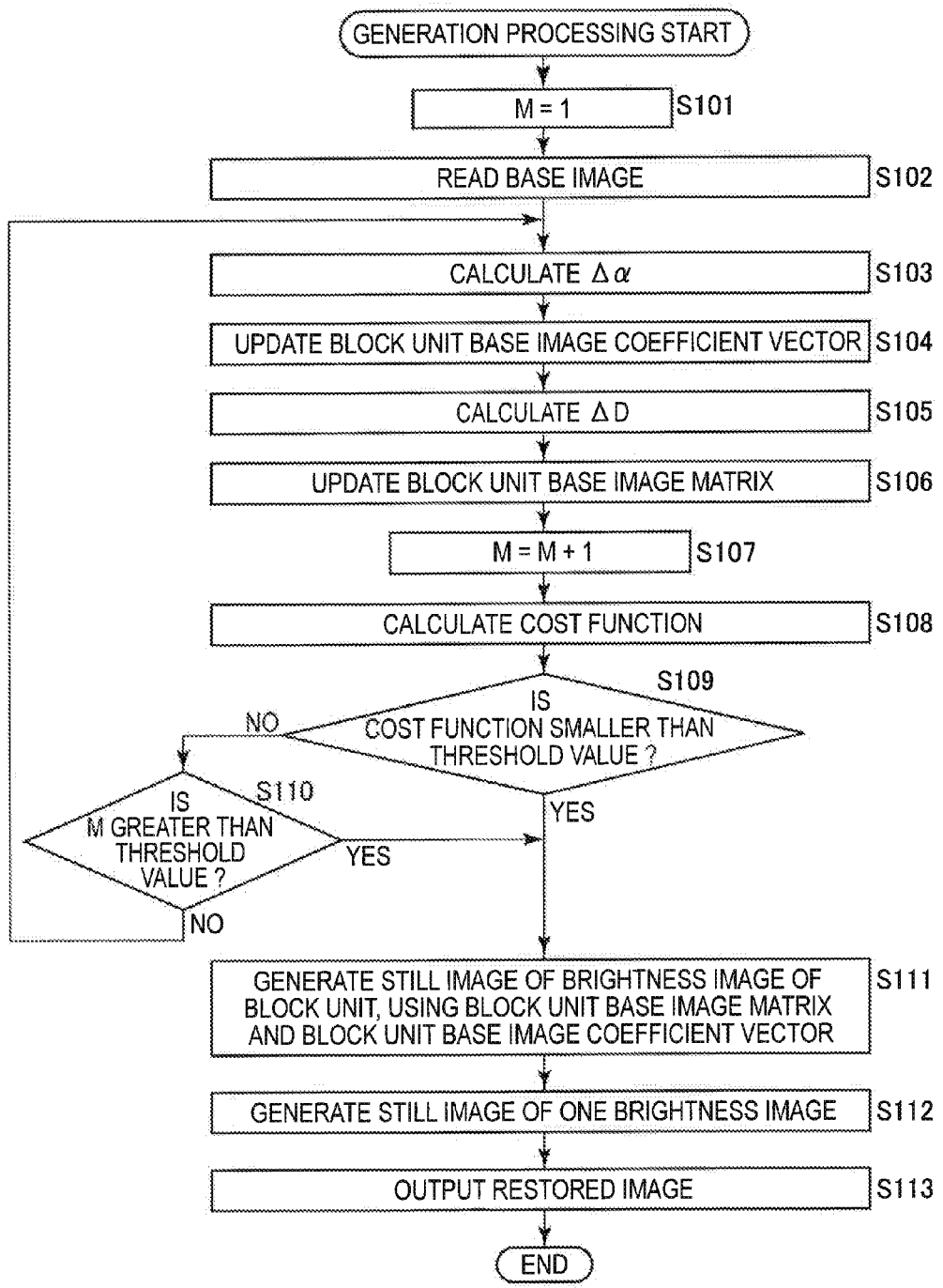
FIG. 13 is a flowchart illustrating generation processing of the image generating apparatus of FIG. 12.

FIG. 13 is a flowchart illustrating the generation processing of the image generating apparatus 130 of FIG. 12.

Because processing of steps S101 to S104 of FIG. 13 is the same as the processing of steps S81 to S84 of FIG. 11, repeated explanation thereof is omitted. Processing of following steps S105 to S111 is executed in the block unit.

In step S105, the operation unit 131 calculates a value obtained by partially differentiating the cost function defined in the block unit by any one of expressions obtained by setting Y of the expressions 2 to 4 to the deteriorated image vectors by D as ΔD, using the base image coefficient vector of the block unit updated by step S104 and the blocks of the deteriorated image.

In step S106, the operation unit 131 updates the block unit base image matrix by the expression 6, using ΔD calculated by step S105. In step S1907, the operation unit 131 increments the number of times M of repeating the operation by 1.

In step S108, the operation unit 131 calculates the cost function to be defined in a block unit by any one of expressions obtained by setting Y of the expressions 2 to 4 to the deteriorated image vector, using the block unit base image coefficient vector updated by step S104, the block unit base image matrix updated by step S106, and the blocks of the deteriorated image.

In step S109, the operation unit 131 determines whether the cost function is smaller than the predetermined threshold value. When it is determined in step S109 that the cost function is the predetermined threshold value or greater, the processing proceeds to step S110.

In step S110, the operation unit 131 determines whether the number of times M of repeating the operation is greater than the predetermined threshold value. When it is determined in step S110 that the number of times M of repeating the operation is the predetermined threshold value or smaller, the processing returns to step S103. The processing of steps S103 to S110 is repeated until the cost function becomes smaller than the predetermined threshold value or the number of times M of repeating the operation becomes greater than the predetermined threshold value.

Meanwhile, when it is determined in step S109 that the cost function is smaller than the predetermined threshold value or when it is determined in step S110 that the number of times M of repeating the operation is greater than the predetermined threshold value, the operation unit 131 supplies the block unit base image coefficient vector updated by immediately previous step S104 and the block unit base image matrix updated by step S106 to the generating unit 132.

In step Sill, the generating unit 132 generates the still image of the brightness image of the block unit by the expression 7, using the block unit base image coefficient vector and the block unit base image matrix supplied from the operation unit 131.

Because processing of steps S112 and S113 is the same as the processing of steps S91 and S92 of FIG. 11, explanation thereof is omitted.

In the generation processing of FIG. 13, the block unit base image matrix is updated for each block. However, the block unit base image matrix may be updated in a deteriorated image unit. In this case, the cost functions are calculated with respect to all the blocks of the deteriorated image and a repetition operation is performed based on a sum of the cost functions.

As described above, because the image generating apparatus 130 generates a restored image and learns the base image of the block unit, precision of the base image of the block unit can be improved and a high-definition restored image can be generated.

However, in the image generating apparatus 130, because it is necessary to perform learning whenever a deteriorated image is input, that is, perform on-line learning, a high processing ability is requested. Therefore, it is preferable to apply the image generating apparatus 130 to a personal computer, cloud computing, or the like having a relatively high processing ability and apply the image generating apparatus 80 to a digital camera or a portable terminal having a relatively low processing ability.

In the first embodiment, the learning image and the deteriorated image are the still images of the brightness images. However, the learning image and the deteriorated image may be still images of color images.

When the learning image and the deteriorated image are the still images of the color images, the still images of the color images are divided into blocks having predetermined sizes, for each color channel (for example, R (Red), G (Green), and B (Blue). A cost function is defined for each color channel. As a result, the learning apparatus 10 learns the base image of the block unit for each color channel and the image generating apparatus 80 (130) generates the still image of the color image for each color channel.

The learning image and the deteriorated image may be moving images. In this case, the moving images are divided into blocks having predetermined sizes, for each frame.

In the first embodiment, the bands of the still image of the brightness image are divided into the three bands of the high frequency band, the intermediate frequency band, and the low frequency band. However, the band division number is not limited to 3. The passage band of the low-pass filter 61 (62) is not limited.

<Second Embodiment>

[Explanation of Outline of Sparse Coding in Second Embodiment]

Figure 14:
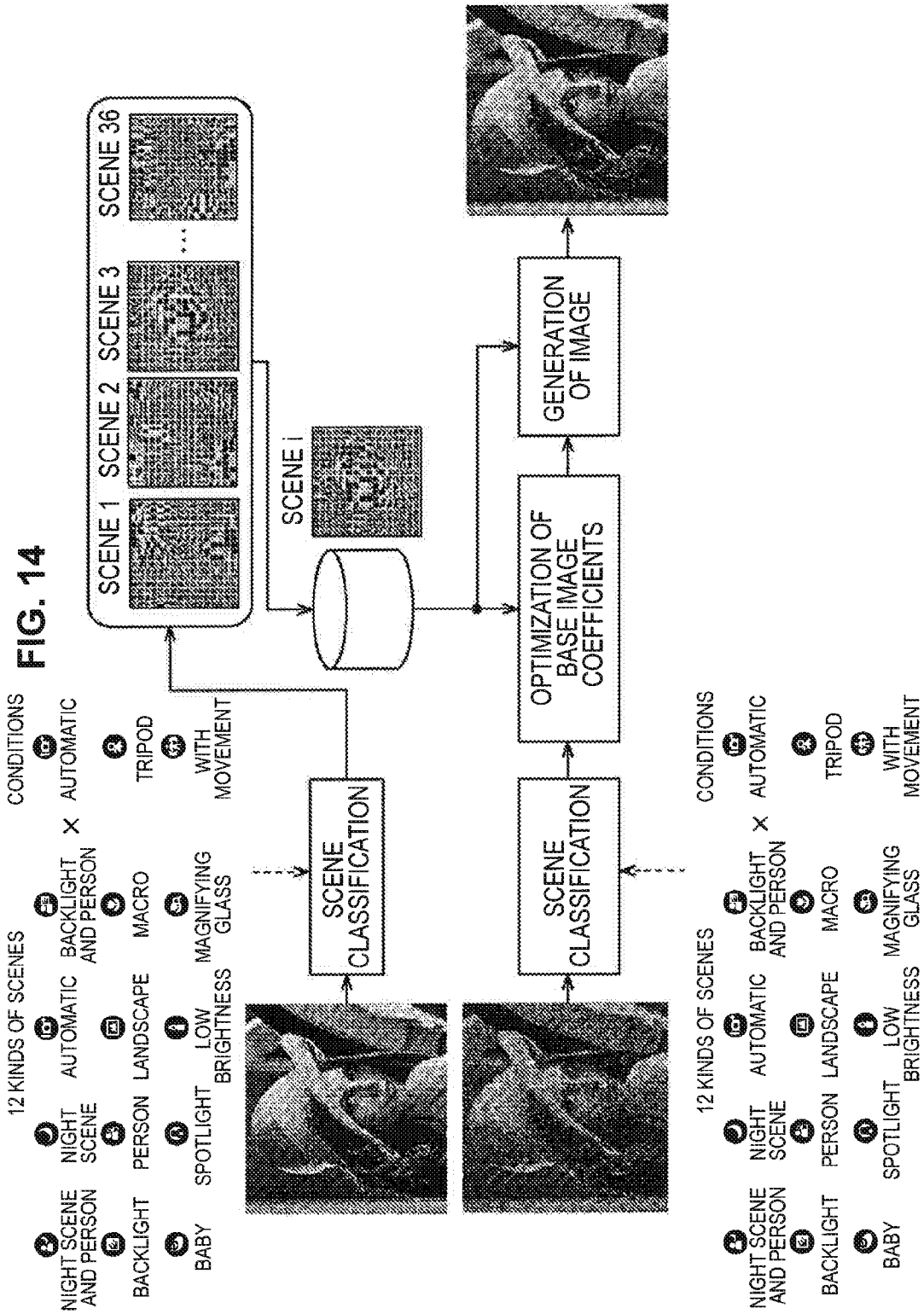
FIG. 14 is a diagram illustrating an outline of sparse coding in a second embodiment to which the present disclosure is applied.

FIG. 14 is a diagram illustrating an outline of sparse coding in a second embodiment to which the present disclosure is applied.

As illustrated in FIG. 14, in the second embodiment, previously, still images of a large amount of learning brightness images not having image quality deterioration are classified for each feature of scenes and base images are learned using the still images of the learning brightness images for each feature of the scenes. The learned base images for each feature of the scenes are held. As the features of the scenes, combinations of photographing situations and photographing modes are used.

In this case, kinds of the photographing situations are 3 kinds of automatic photographing, tripod photographing, and photographing with movement. Kinds of the photographing modes are 12 kinds of a photographing mode of a night scene and a person, a night scene photographing mode, an automatic photographing mode, a backlight photographing mode of a person, a backlight photographing mode, a person photographing mode, a landscape photographing mode, a macro photographing mode, a baby photographing mode, a spotlight photographing mode, a low brightness photographing mode, and a magnifying glass photographing mode. Therefore, kinds of the features of the scenes are 36 (3×12) kinds. However, the kinds of the features of the scenes are not limited to the above examples.

If the deteriorated image is input as a sparse coding object, the deteriorated image is classified into any one of the features of the scenes of the 36 kinds, based on the photographing situation and the photographing mode, and optimization of the base image coefficient is performed with respect to the deteriorated image, using the base image of the feature of the scene. An image not having image quality deterioration that corresponds to the deteriorated image is generated as a restored image, using the optimized base image coefficient and the base image of the feature of the scene into which the deteriorated image is classified.

[Configuration Example of Learning Apparatus]

Figure 15:
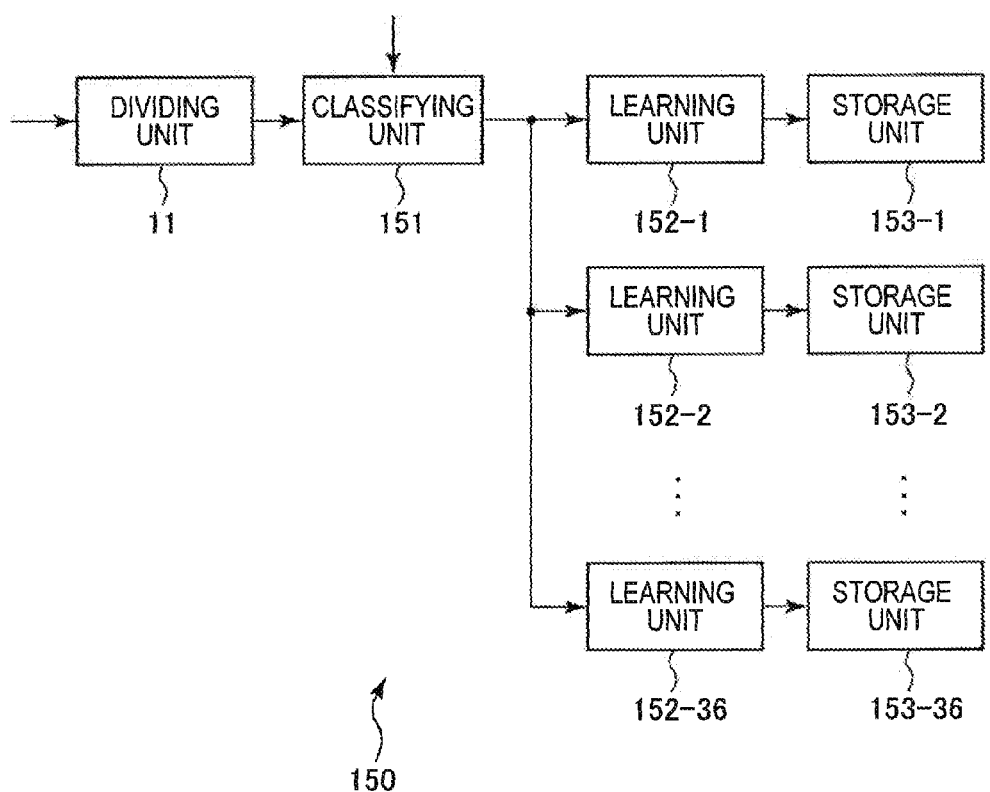
FIG. 15 is a block diagram illustrating a configuration example of a learning apparatus that corresponds to a second embodiment of the signal processing apparatus to which the present disclosure is applied.

FIG. 15 is a block diagram illustrating a configuration example of a learning apparatus that corresponds to a second embodiment of the signal processing apparatus to which the present disclosure is applied.

Among structural elements illustrated in FIG. 15, the structural elements that are the same as the structural elements of FIG. 2 are denoted with the same reference numerals. Repeated explanation of these structural elements is omitted.

A configuration of a learning apparatus 150 of FIG. 15 is different from the configuration of FIG. 2 in that a classifying unit 151 is provided, instead of the classifying unit 12, learning units 152-1 to 152-36 are provided, instead of the learning units 13-1 to 13-3, and storage units 153-1 to 153-36 are provided, instead of the storage units 14-1 to 14-3. The learning apparatus 150 learns a base image for each feature of the scenes.

Specifically, photographing situations and photographing modes of still images of individual learning brightness images are input from the outside to the classifying unit 151. The classifying unit 151 classifies each block supplied from the dividing unit 11 into any one of the features of the scenes of the 36 kinds, based on the photographing situation and the photographing mode of the still image of the learning brightness image of each block, which are input from the outside. The classifying unit 151 supplies the block to any one of the learning units 152-1 to 152-36 corresponding to the feature of the scene into which the block is classified.

The learning units 152-1 to 152-36 correspond to the features of the scenes of the 36 kinds. The learning unit 152-1 models the block supplied from the classifying unit 151 and classified into the feature of the scene corresponding to the learning unit 152-1 by the expression 1 and learns the base image of the block unit of the feature of the scene. Specifically, the learning unit 152-1 learns the base image of the block unit of the scene, using the block classified into the feature of the scene corresponding to the learning unit and the cost function defined in the block unit by any one of the expressions 2 to 4. The learning unit 152-1 supplies the learned base image of the block unit of the feature of the scene corresponding to the learning unit to the storage unit 153-1.

Similar to the learning unit 152-1, each of the learning units 152-2 to 152-36 models the block supplied from the classifying unit 151 and classified into the feature of the scene corresponding to each learning unit by the expression 1 and learns the base image of the block unit of the feature of the scene. The learning units 152-2 to 152-36 supply the learned base images of the block units to the storage units 153-2 to 153-36, respectively. Hereinafter, the learning units 152-1 to 152-36 are collectively referred to as the learning units 152, when it is not necessary to distinguish the learning units 152-1 to 152-36 in particular.

Each of the storage units 153-1 to 153-36 stores the base image of the block unit of the feature of the scene corresponding to the learning unit 152, which is supplied from the learning unit 152. Hereinafter, the storage units 153-1 to 153-36 are collectively referred to as the storage units 153, when it is not necessary to distinguish the storage units 153-1 to 153-36 in particular.

[Explanation of Processing of Learning Apparatus]

Figure 16:
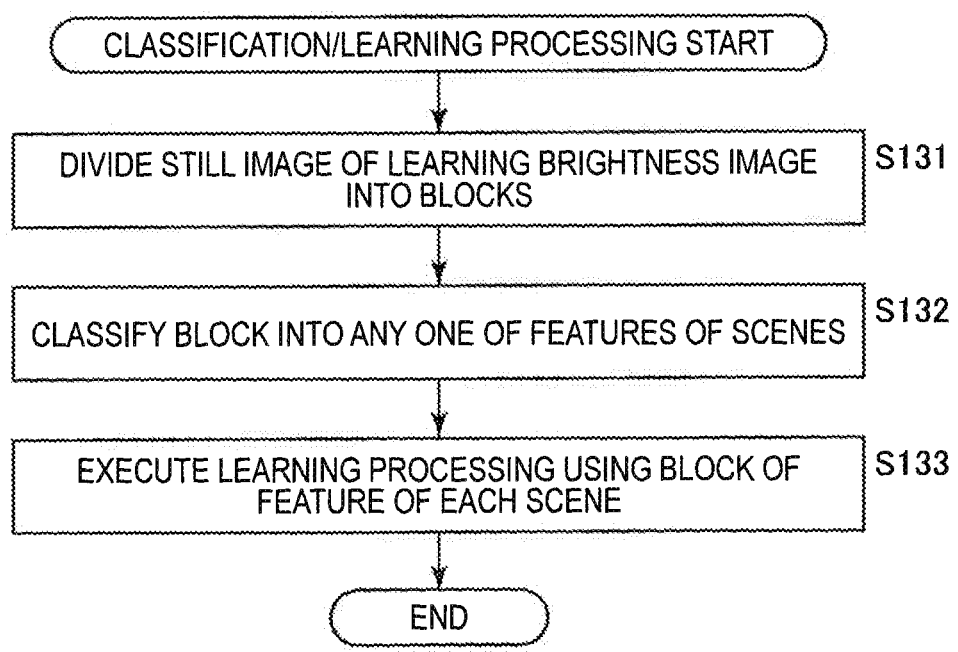
FIG. 16 is a flowchart illustrating classification/learning processing of the learning apparatus of FIG. 15.

FIG. 16 is a flowchart illustrating classification/learning processing of the learning apparatus 150 of FIG. 15. The classification/learning processing is performed off-line when the still images of all the learning brightness images are from the outside to the learning apparatus 150.

in step S131 of FIG. 16, the dividing unit 11 divides the still image of the learning brightness image input from the outside into the blocks having the predetermined sizes and supplies the blocks to the classifying unit 151.

In step S132, the classifying unit 151 classifies the block supplied from the dividing unit 11 into any one of the features of the scenes of the 36 kinds, based on the photographing situation and the photographing mode of the still image of the learning brightness image of the block, which are input from the outside. The classifying unit 151 supplies the block to the learning unit 152 corresponding to the feature of the scene into which the block is classified.

In step S133, the learning unit 152 executes the learning processing of FIG. 7, using the block of the feature of each scene supplied from the classifying unit 151 and the cost function defined in the block unit by any one of the expressions 2 to 4. Then, the processing ends.

As described above, the learning apparatus 150 learns the base image, for each feature of the scenes of the still image of the learning brightness image, such that the still image of the learning brightness image is represented by the linear operation of the base images of which the base image coefficients become sparse. Therefore, an accurate base image for each feature of the scenes can be learned.

By learning the base image for each feature of the scenes, the learning apparatus 150 can decrease a convergence time of the base images, similar to the learning apparatus 10. Because the learning apparatus 150 learns the base image for each feature of the scenes, the learning apparatus 150 can execute the learning processing in parallel, for each feature of the scenes.

[Configuration Example of Image Generating Apparatus]

Figure 17:
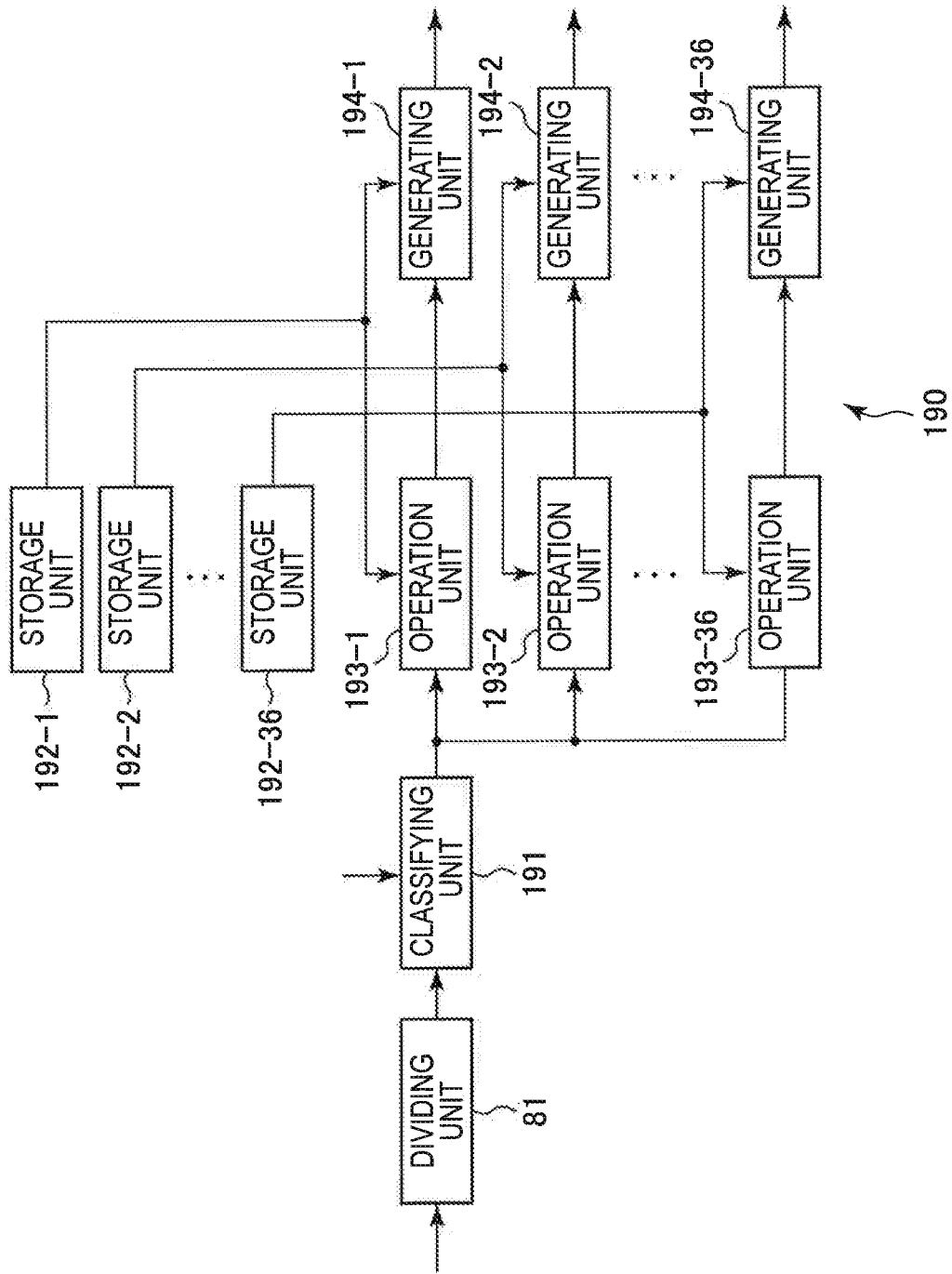
FIG. 17 is a block diagram illustrating a configuration example of an image generating apparatus that corresponds to a second embodiment of the output apparatus to which the present disclosure is applied.

FIG. 17 is a block diagram illustrating a configuration example of an image generating apparatus that generates an image using the base images for each feature of the scenes learned by the learning apparatus 150 of FIG. 15 and corresponds to a second embodiment of the output apparatus to which the present disclosure is applied.

Among structural elements illustrated in FIG. 17, the structural elements that are the same as the structural elements of FIG. 8 are denoted with the same reference numerals. Repeated explanation of these structural elements is omitted.

A configuration of an image generating apparatus 190 of FIG. 17 is different from the configuration of FIG. 8 in that a classifying unit 191, storage units 192-1 to 192-36, operation units 193-1 to 193-36, and generating units 194-1 to 194-36 are provided, instead of the classifying unit 82, the storage units 83-1 to 83-3, the operation units 84-1 to 84-3, and the generating units 85-1 to 85-3, and the synthesizing unit 86 is not provided. The image generating apparatus 190 performs sparse coding according to the feature of the scene with respect to the still image of the brightness in input as the deteriorated image from the outside and generates a restored image.

Specifically, photographing situations and photographing modes of deteriorated images are input from the outside to the classifying unit 191 of the image generating apparatus 190. The classifying unit 191 classifies all blocks of the deteriorated image supplied from the dividing unit 81 into any one of the features of the scenes of the 36 kinds, based on the photographing situation and the photographing mode of the deteriorated image, which are input from the outside. The classifying unit 191 supplies all the blocks to any one of the operation units 193-1 to 193-36 corresponding to the feature of the scene into which all the blocks are classified.

Each of the storage units 192-1 to 192-36 stores the base image of the block unit of the feature of the scene that corresponds to each of the operation units 193-1 to 193-36 learned by the learning apparatus 150 of FIG. 15 and stored in the storage unit 153.

The operation units 193-1 to 193-36 correspond to the features of the scenes of the 36 kinds. The operation unit 193-1 reads the base image of the block unit of the feature of the scene corresponding to the operation unit, from the storage unit 192-1. The operation unit 193-1 operates the base image coefficient vector of the block unit, for each block of the deteriorated image of the feature of the scene corresponding to the operation unit, which is supplied from the classifying unit 191, such that the cost function becomes smaller than a predetermined threshold value. The cost function is defined in the block unit by an expression obtained by setting Y of any one of the expressions 2 to 4 to a deteriorated image vector, using the base image matrix of the block unit including the read base image of the block unit. The operation unit 193-1 supplies the base image coefficient vector of the block unit to the generating unit 194-1.

Similar to the operation unit 193-1, the operation units 193-2 to 193-36 read the base images of the block units of the features of the scenes corresponding to the operation units from the storage units 192-2 to 192-36, respectively. Similar to the operation unit 193-1, each of the operation units 193-2 to 193-36 operates the base image coefficient vector of the block unit, for each block of the deteriorated image of the feature of the scene corresponding to each operation unit, which is supplied from the classifying unit 191. The operation units 193-2 to 193-36 supply the operated base image coefficient vectors of the block units to the generating units 194-2 to 194-36, respectively.

The generating unit 194-1 reads the base image of the block unit of the feature of the scene corresponding to the generating unit, from the storage unit 192-1. The generating unit 194-1 generates the still image of the brightness image of the block unit by the expression 7, for each block, using the base image coefficient vector of the block unit supplied from the operation unit 193-1 and the base image matrix of the block unit including the read base image of the block unit. The generating unit 194-1 generates a still image of one brightness image from the still image of the brightness image of the block unit and outputs the still image as a restored image.

Similar to the generating unit 194-1, the generating units 194-2 to 194-36 read the base images of the block units from the storage units 192-2 to 192-36, respectively, and generate the still images of the brightness images of the block units. Each of the generating units 194-2 to 194-36 generates a still image of one brightness image from the generated still image of the brightness image of the block unit and outputs the still image as a restored image.

Hereinafter, the storage units 192-1 to 192-36 are collectively referred to as the storage units 192, when it is not necessary to distinguish the storage units 192-1 to 192-36 in particular. Likewise, the operation units 193-1 to 193-36 are collectively referred to as the operation units 193 and the generating units 194-1 to 194-36 are collectively referred to as the generating units 194.

[Explanation of Processing of Image Generating Apparatus 130]

Figure 18:
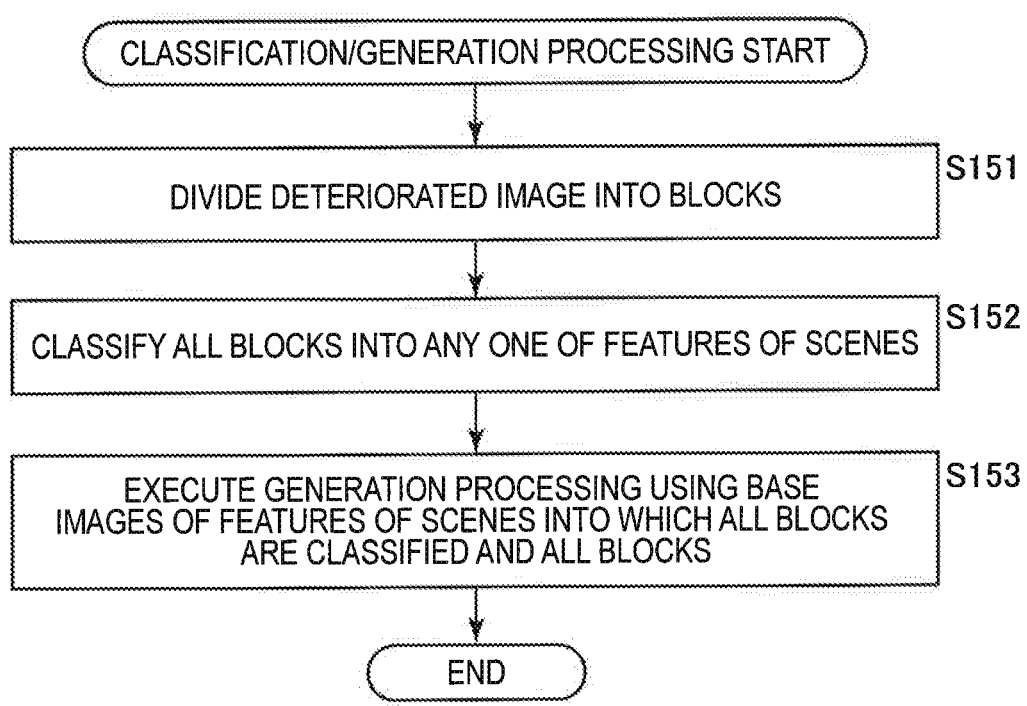
FIG. 18 is a flowchart illustrating classification/generation processing of the image generating apparatus of FIG. 17.

FIG. 18 is a flowchart illustrating classification/generation processing of the image generating apparatus 190 of FIG. 17. The classification/generation processing starts when a still image of a brightness image is input as a deteriorated image from the outside.

In step S151 of FIG. 18, the dividing unit 81 of the image generating apparatus 190 divides the still image of the brightness image input as the deteriorated image from the outside into blocks having predetermined sizes and supplies the blocks to the classifying unit 191, similar to the dividing unit 11 of FIG. 15.

In step S152, the classifying unit 191 classifies all blocks of the deteriorated image supplied from the dividing unit 81 into any one of the features of the scenes of the 36 kinds, based on the photographing situation and the photographing mode of the deteriorated image, which are input from the outside. The classifying unit 191 supplies all the blocks to the operation unit 193 corresponding to the features of the scenes into which all the blocks are classified.

In step S153, the image generating apparatus 190 executes the generation processing of FIG. 11 using the base images of the features of the scenes into which all the blocks are classified and all the blocks and ends the processing.

As described above, the image generating apparatus 190 obtains the base image learned by the learning apparatus 150 for each feature of the scenes and operates the base image coefficient, based on the deteriorated image and the base image of the feature of the scene of the deteriorated image. Therefore, the image generating apparatus 190 can generate a high-definition restored image having a restoration effect suitable for the scene, using the base image and the base image coefficient according to the feature of the scene of the deteriorated image.

By operating the base image coefficient for each feature of the scenes, the image generating apparatus 190 can decrease the convergence time of the base image coefficients, similar to the image generating apparatus 80.

In the second embodiment, the learning image and the deteriorated image are the still images of the brightness images, similar to the first embodiment. However, the learning image and the deteriorated image may be still images of color images. The learning image and the deteriorated image may be moving images. In the second embodiment, the base image can be learned while the restored image is generated, similar to the first embodiment.

In the second embodiment, the classification by the features by the scenes is performed based on the photographing situations and the photographing modes input from the outside. However, the classification by the features of the scenes may be performed based on the still images of the brightness images.

<Third Embodiment>

[Explanation of Outline of Sparse Coding in Third Embodiment]

Figure 19:
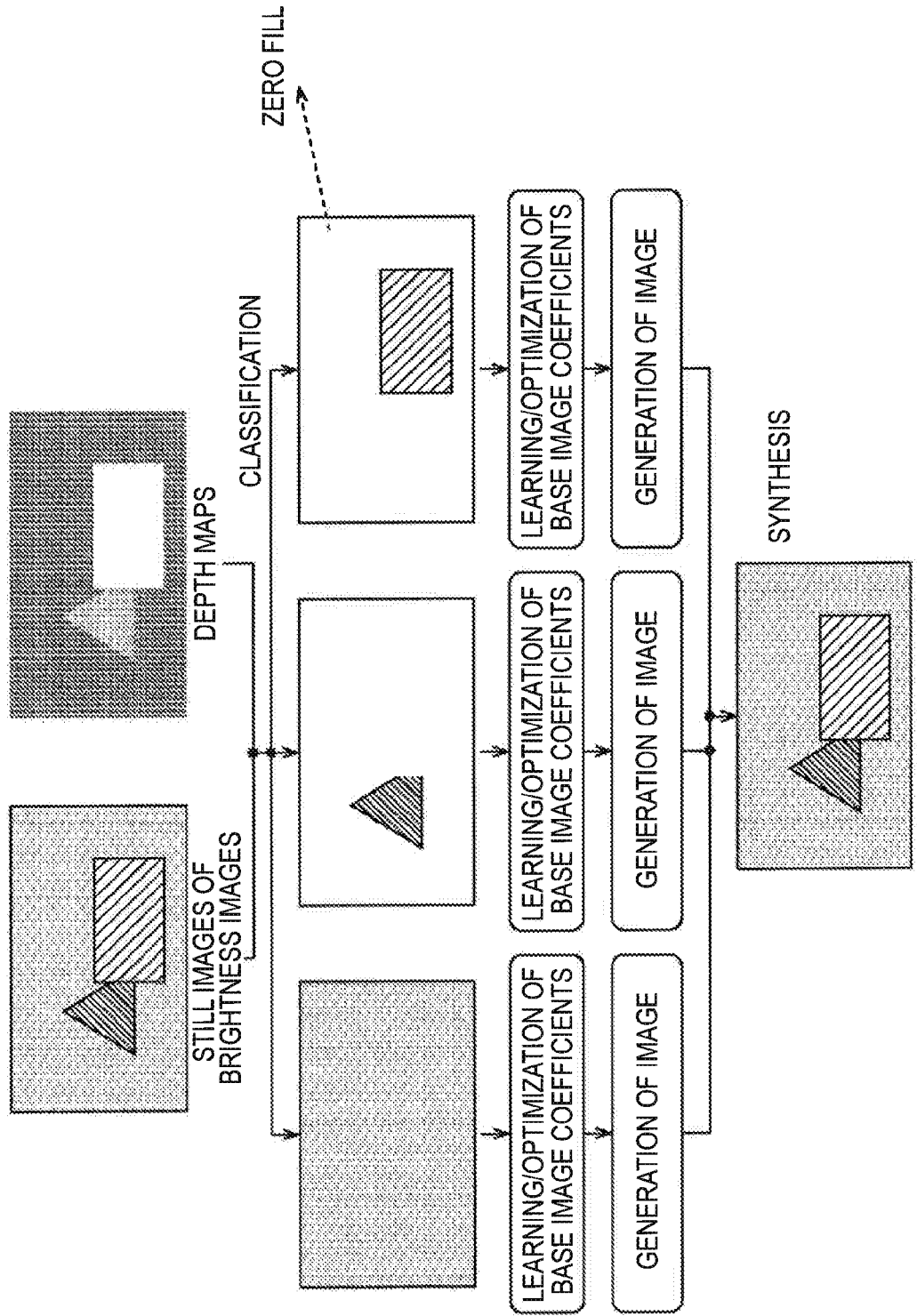
FIG. 19 is a diagram illustrating an outline of sparse coding in a third embodiment to which the present disclosure is applied.

FIG. 19 is a diagram illustrating an outline of sparse coding in a third embodiment to which the present disclosure is applied.

As illustrated in FIG. 19, in the third embodiment, previously, still images of a large amount of learning brightness images not having image quality deterioration are classified for each feature of depth maps and base images are learned using the still images of the learning brightness images for each feature of the depth maps. The learned base images for each feature of the depth maps are held.

The depth map is a map of a depth value that shows a depth direction position of an object of each pixel of a still image of a learning brightness image. In this case, the features of the depth maps are features of three kinds of a feature (hereinafter, referred to as a large depth) where an average value of depth values is greater than a first threshold value, a feature (hereinafter, referred to as an intermediate depth) where an average value of depth values is equal to or greater than a second threshold value and is smaller than the first threshold value, and a feature (hereinafter, referred to as a small depth) where an average value of depth values is smaller than the second threshold value.

The kinds of the features of the depth maps are not limited to the above examples. For example, a relation of a maximum value or a minimum value of the depth values and a predetermined threshold value and a distribution of the depth values may be set as the features of the depth maps.

If the deteriorated image is input as a sparse coding object, the deteriorated image is classified for each feature of the depth maps and optimization of the base image coefficient is performed with respect to the deteriorated image using the base image of the feature of the depth map, for each feature of the depth maps. An image not having image quality deterioration that corresponds to the deteriorated image is generated as a restored image using the optimized base image coefficient and the base image, for each feature of the depth maps, and the restored image of the feature of each depth map is synthesized.

[Configuration Example of Learning Apparatus]

Figure 20:
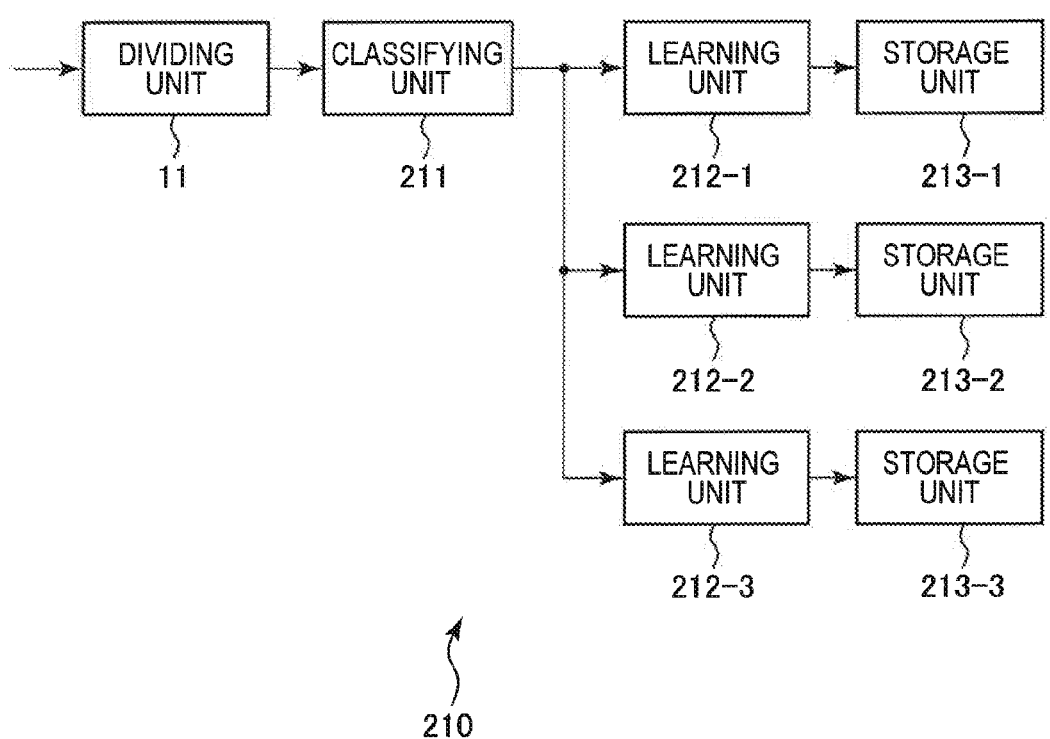
FIG. 20 is a block diagram illustrating a configuration example of a learning apparatus that corresponds to a third embodiment of the signal processing apparatus to which the present disclosure is applied.

FIG. 20 is a block diagram illustrating a configuration example of a learning apparatus that corresponds to a third embodiment of the signal processing apparatus to which the present disclosure is applied.

Among structural elements illustrated in FIG. 20, the structural elements that are the same as the structural elements of FIG. 2 are denoted with the same reference numerals. Repeated explanation of these structural elements is omitted.

A configuration of a learning apparatus 210 of FIG. 20 is different from the configuration of FIG. 2 in that a classifying unit 211 is provided, instead of the classifying unit 12, learning units 212-1 to 212-3 are provided, instead of the learning units 13-1 to 13-3, and storage units 213-1 to 213-3 are provided, instead of the storage units 14-1 to 14-3. The learning apparatus 210 learns a base image for each feature of depth maps.

Specifically, the classifying unit 211 generates a depth map of the block from the block supplied from the dividing unit 11. The classifying unit 211 classifies the individual blocks into a large depth, an intermediate depth, and a small depth, based on the depth maps of the blocks. The classifying unit 211 supplies the block of the large depth to the learning unit 212-1, supplies the block of the intermediate depth to the learning unit 212-2, and supplies the block of the small depth to the learning unit 212-3.

The learning unit 212-1 models the block of the large depth supplied from the classifying unit 211 by the expression 1 and learns the base image of the block unit of the large depth. Specifically, the learning unit 212-1 learns the base image of the block unit of the large depth, using the block of the large depth and the cost function defined in the block unit by any one of the expressions 2 to 4. The learning unit 212-1 supplies the learned base image of the block unit of the large depth to the storage unit 213-1.

Similar to the learning unit 212-1, each of the learning units 212-2 and 212-3 models the block supplied from the classifying unit 211 by the expression 1 and learns the base image of the block unit. The learning unit 212-2 supplies the learned base image of the block unit of the intermediate depth to the storage unit 14-2 and the learning unit 212-3 supplies the learned base image of the block unit of the small depth to the storage unit 14-3. Hereinafter, the learning units 212-1 to 212-3 are collectively referred to as the learning units 212, when it is not necessary to distinguish the learning units 212-1 to 212-3 in particular.

The storage unit 213-1 stores the base image of the block unit of the large depth supplied from the learning unit 212-1. The storage unit 213-2 stores the base image of the block unit of the intermediate depth supplied from the learning unit 212-2. The storage unit 213-3 stores the base image of the block unit of the small depth supplied from the learning unit 212-3. Hereinafter, the storage units 213-1 to 213-3 are collectively referred to as the storage units 213, when it is not necessary to distinguish the storage units 213-1 to 213-3 in particular.

Figure 21:
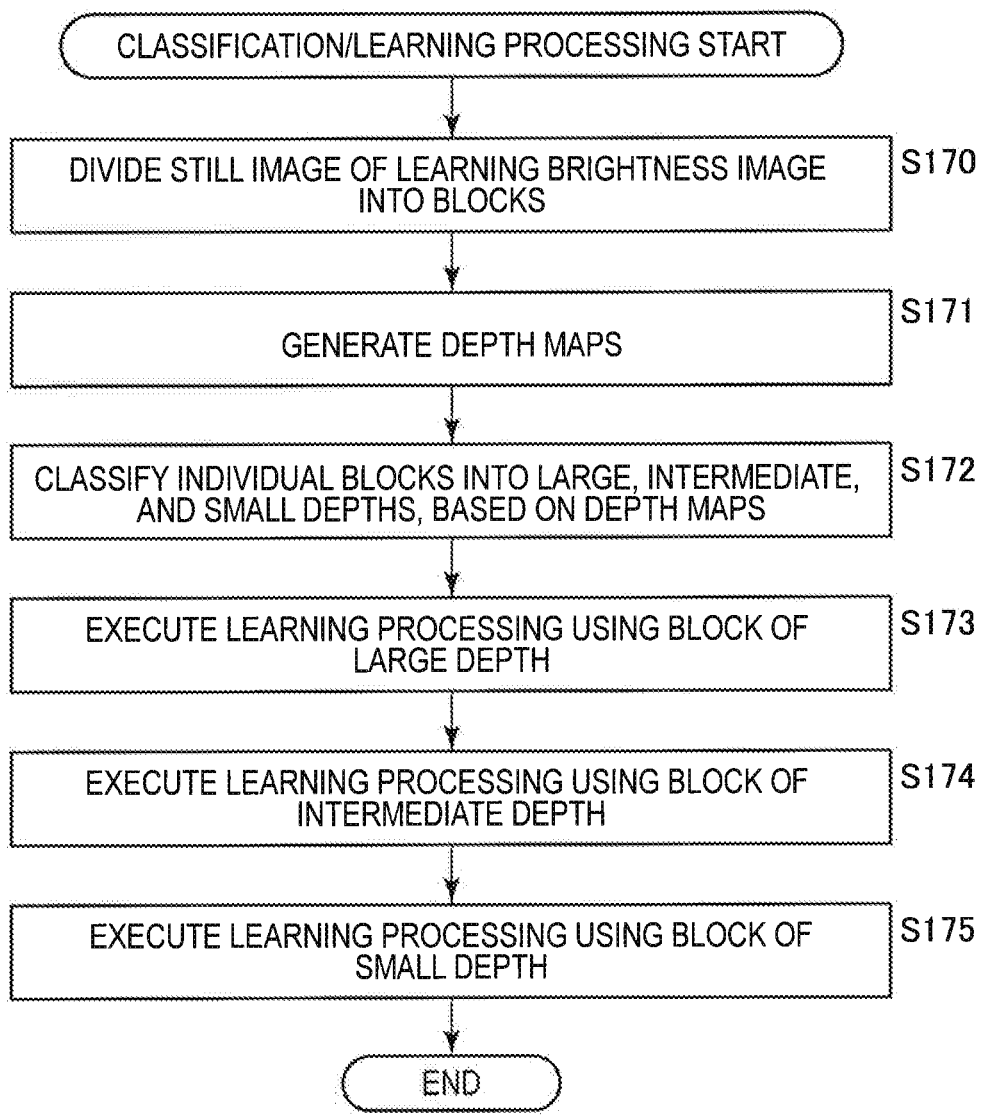
FIG. 21 is a flowchart illustrating classification/learning processing of the learning apparatus of FIG. 20.

In step S170 of FIG. 21, the dividing unit 11 divides a still image of a learning brightness image input from the outside into blocks having predetermined sizes and supplies the blocks to the classifying unit 211. In step S171, the classifying unit 211 generates depth maps of the blocks from the blocks supplied from the dividing unit 11.

In step S172, the classifying unit 211 classifies the individual blocks into the large depth, the intermediate depth, and the small depth, based on the depth maps of the blocks. The classifying unit 211 supplies the block of the large depth to the learning unit 212-1, supplies the block of the intermediate depth to the learning unit 212-2, and supplies the block of the small depth to the learning unit 212-3.

In step S173, the learning unit 212-1 executes the learning processing of FIG. 7, using the block of the large depth supplied from the classifying unit 211 and the cost function defined in the block unit by any one of the expressions 2 to 4. The learning unit 212-1 supplies the learned base image of the block unit of the large depth to the storage unit 213-1.

In step S174, the learning unit 212-2 executes the learning processing of FIG. 7, using the block of the intermediate depth supplied from the classifying unit 211 and the cost function defined in the block unit by any one of the expressions 2 to 4. The learning unit 212-2 supplies the learned base image of the block unit of the intermediate depth to the storage unit 213-2.

In step S175, the learning unit 212-3 executes the learning processing of FIG. 7, using the block of the small depth supplied from the classifying unit 211 and the cost function defined in the block unit by any one of the expressions 2 to 4. The learning unit 212-3 supplies the learned base image of the block unit of the small depth to the storage unit 213-3. Then, the processing ends.

As described above, the learning apparatus 210 learns a base image, for each feature of the depth maps of the still image of the learning brightness image, such that the still image of the learning brightness image is represented by a linear operation of base images of which base image coefficients become sparse. Therefore, an accurate base image for each feature of the depth maps can be learned.

By learning the base image for each feature of the depth maps, the learning apparatus 210 can decrease a convergence time of the base images, similar to the learning apparatus 10. Because the learning apparatus 210 learns the base image for each feature of the depth maps, the learning apparatus 210 can execute the learning processing in parallel, for each feature of the depth maps.

[Configuration Example of Image Generating Apparatus]

Figure 22:
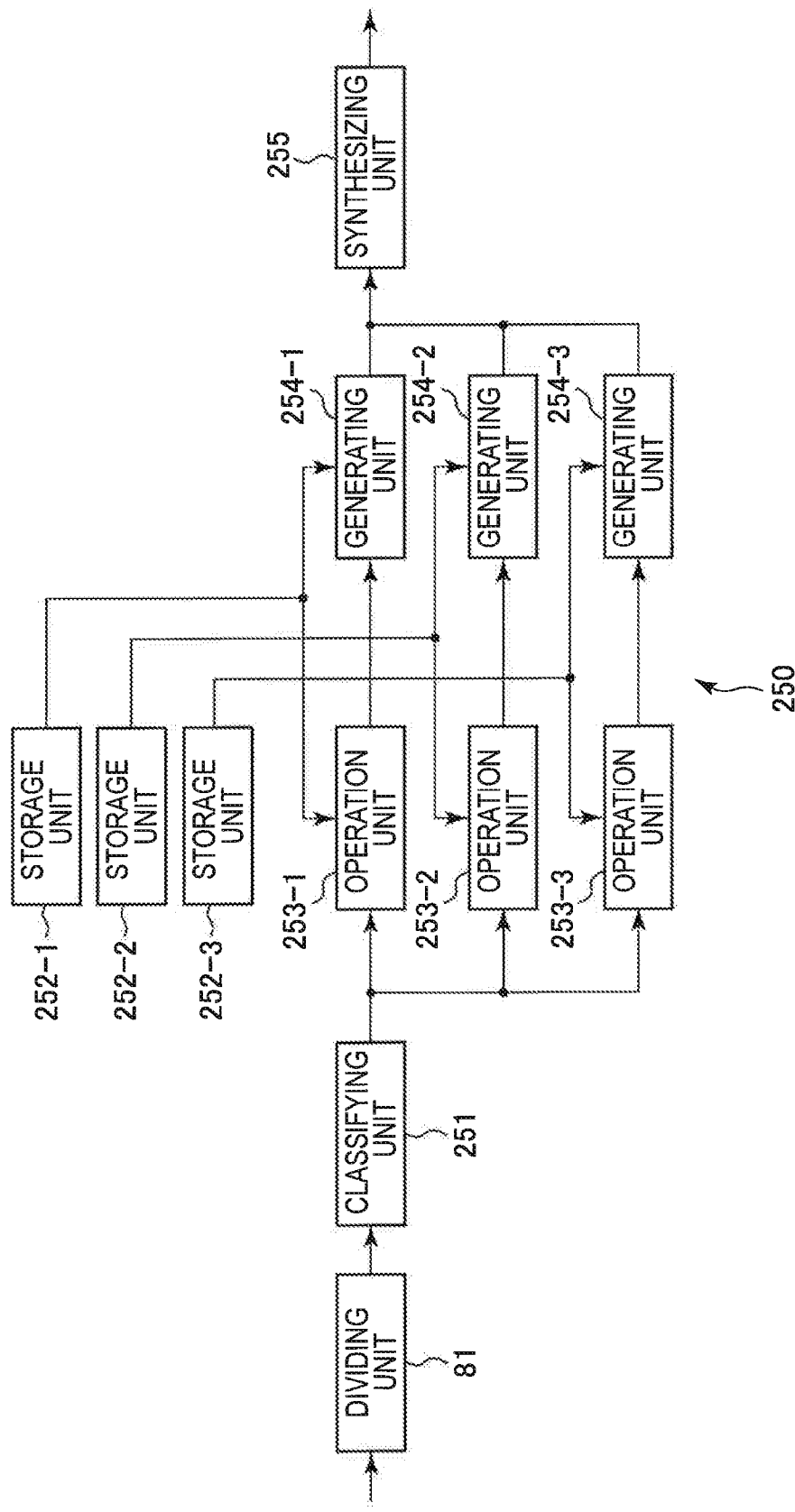
FIG. 22 is a block diagram illustrating a configuration example of an image generating apparatus that corresponds to a third embodiment of the output apparatus to which the present disclosure is applied.

FIG. 22 is a block diagram illustrating a configuration example of an image generating apparatus that generates an image using the base image for each feature of the depth maps learned by the learning apparatus 210 of FIG. 20 and corresponds to a third embodiment of the output apparatus to which the present disclosure is applied.

Among structural elements illustrated in FIG. 22, the structural elements that are the same as the structural elements of FIG. 8 are denoted with the same reference numerals. Repeated explanation of these structural elements is omitted.

A configuration of an image generating apparatus 250 of FIG. 22 is different from the configuration of FIG. 8 in that a classifying unit 251, storage units 252-1 to 252-3, operation units 253-1 to 253-3, generating units 254-1 to 254-3, and a synthesizing unit 255 are provided, instead of the classifying unit 82, the storage units 83-1 to 83-3, the operation units 84-1 to 84-3, the generating units 85-1 to 85-3, and the synthesizing unit 86. The image generating apparatus 250 performs sparse coding according to the feature of the depth map with respect to the still image of the brightness image input as the deteriorated image from the outside and generates a restored image.

Specifically, the classifying unit 251 of the image generating apparatus 250 crates the depth maps of the blocks from the blocks supplied from the dividing unit 81. The classifying unit 251 classifies the individual blocks into the large depth, the intermediate depth, and the small depth, based on the depth maps of the blocks. The classifying unit 251 supplies the block of the large depth to the operation unit 253-1, supplies the block of the intermediate depth to the operation unit 253-2, and supplies the block of the small depth to the operation unit 253-3.

The storage unit 252-1 stores the base image of the block unit of the large depth that is learned by the learning apparatus 210 of FIG. 20 and is stored in the storage unit 213-1. The storage unit 252-2 stores the base mage of the block unit of the intermediate depth that is stored in the storage unit 213-2 and the storage unit 252-3 stores the base image of the block unit of the small depth that is stored in the storage unit 213-3.

The operation unit 253-1 reads the base image of the block unit of the large depth from the storage unit 252-1. The operation unit 253-1 operates the base image coefficient vector of the block unit, for each block of the large depth of the deteriorated image supplied from the classifying unit 251, such that the cost function becomes smaller than the predetermined threshold value. The cost function is defined in the block unit by an expression obtained by setting Y of any one of the expressions 2 to 4 to a deteriorated image vector in which pixel values of individual pixels of the deteriorated image are arranged in a column direction, using the base image matrix of the block unit including the read base image of the block unit. The operation unit 253-1 supplies the base image coefficient vector of the block unit to the generating unit 254-1.

Similar to the operation unit 253-1, the operation units 253-2 and 253-3 read the base images of the block units from the storage units 252-2 and 252-3, respectively, and operate the base image coefficient vectors of the block units, for each block supplied from the classifying unit 251.

The operation unit 253-2 supplies the operated base image coefficient vector of the block unit to the generating unit 254-2 and the operation unit 253-3 supplies the operated base image coefficient vector of the block unit to the generating unit 254-3.

The generating unit 254-1 reads the base image of the block unit of the large depth from the storage unit 252-1. The generating unit 254-1 generates the still image of the brightness image of the block unit of the large depth by the expression 7, for each block, using the base image coefficient vector of the block unit supplied from the operation unit 253-1 and the base image matrix of the block unit including the read base image of the block unit of the large depth.

The generating unit 254-1 generates a still image of a brightness image corresponding to a region of the large depth of the deteriorated image from the still image of the brightness image of the block unit of the large depth and supplies the still image as a restored image of the large depth to the synthesizing unit 255.

Similar to the generating unit 254-1, the generating units 254-2 and 254-3 read the base images of the block units from the storage units 252-2 and 252-3, respectively, and generate still images of brightness images of the block units. The generating unit 254-2 generates a restored image of the intermediate depth from the generated still image of the brightness image of the block unit and supplies the restored image to the synthesizing unit 255. The generating unit 254-3 generates a restored image of the small depth from the generated still image of the brightness image of the block unit and supplies the restored image to the synthesizing unit 255.

The synthesizing unit 255 synthesizes the restored images of the large depth, the intermediate depth, and the small depth supplied from the generating units 254-1 to 254-3, respectively, and outputs a restored image corresponding to the entire region of the deteriorated image obtained as a synthesis result.

Hereinafter, the storage units 252-1 to 252-3 are collectively referred to as the storage units 252, when it is not necessary to distinguish the storage units 252-1 to 252-3 in particular. Likewise, the operation units 253-1 to 253-3 are collectively referred to as the operation units 253 and the generating units 254-1 to 254-3 are collectively referred to as the generating units 254.

[Explanation of Processing of Image Generating Apparatus]

Figure 23:
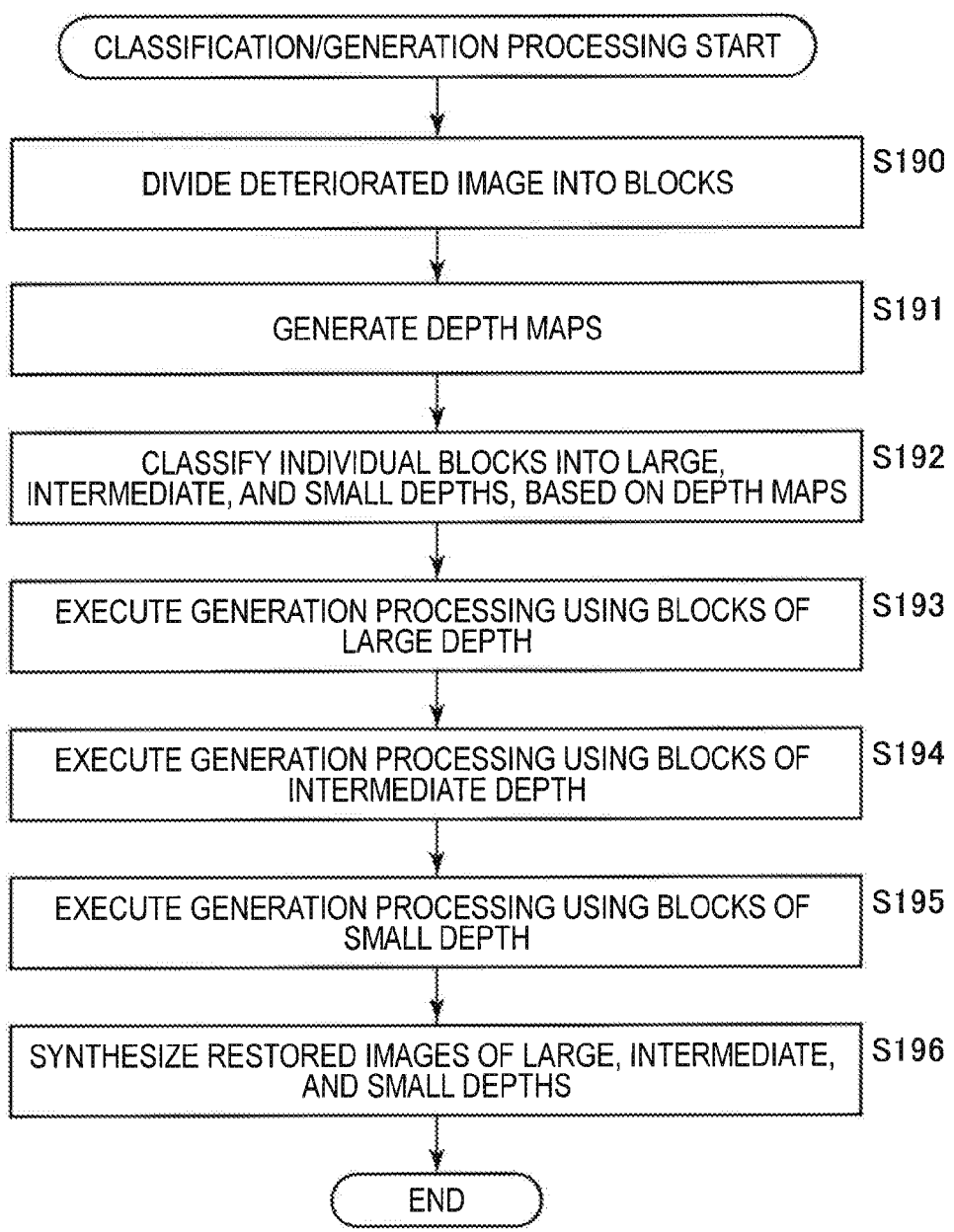
FIG. 23 is a flowchart illustrating classification/generation processing of the image generating apparatus of FIG. 22.

FIG. 23 is a flowchart illustrating classification/generation processing of the image generating apparatus 250 of FIG. 22. The classification/generation processing starts when a still image of a brightness image is input as a deteriorated image from the outside.

In step S190 of FIG. 23, the dividing unit 81 of the image generating apparatus 250 divides the still image of the brightness image input as the deteriorated image from the outside into blocks having predetermined sizes and supplies the blocks to a classifying unit 251, similar to the dividing unit 11 of FIG. 20.

In step S191, the classifying unit 251 generates the depth maps of the blocks from the blocks supplied from the dividing unit 81. In step S192, the classifying unit 251 classifies the individual blocks into the large depth, the intermediate depth, and the small depth, based on the depth maps of the blocks. With respect to the blocks obtained as the classification result, the classifying unit 251 supplies the blocks of the large depth to the operation unit 253-1, supplies the blocks of the intermediate depth to the operation unit 253-2, and supplies the blocks of the small depth to the operation unit 253-3.

In step S193, the image generating apparatus 250 executes the generation processing using the blocks of the large depth. In step S194, the image generating apparatus 250 executes the generation processing using the blocks of the intermediate depth. In step S195, the image generating apparatus 250 executes the generation processing using the blocks of the small depth.

The generation processing that is executed by steps S193 to S195 is the same as the generation processing of FIG. 11, except that a still image of a brightness image corresponding to a region of a deteriorated image of a feature of a corresponding depth map is generated, instead of the still image of one brightness image generated in step S91.

In step S196, the synthesizing unit 255 synthesizes the restored images of the large depth, the intermediate depth, and the small depth supplied from the generating units 254-1 to 254-3, respectively, and outputs a restored image corresponding to an entire region of a deteriorated image obtained as a synthesis result. Then, the processing ends.

As described above, the image generating apparatus 250 obtains the base image learned by the learning apparatus 210 for each feature of the depth maps and operates the base image coefficient for each feature of the depth maps, based on the base image for each feature of the depth maps and the deteriorated image. Therefore, the image generating apparatus 250 can generate a high-definition restored image having a restoration effect suitable for the feature of the depth map, using the base image and the base image coefficient for each feature of the depth maps.

By operating the base image coefficient for each feature of the depth maps, the image generating apparatus 250 can decrease the convergence time of the base image coefficients, similar to the image generating apparatus 80. Because the image generating apparatus 250 generates a restored image for each feature of the depth maps, using the base image and the base image coefficient for each feature of the depth maps, the image generating apparatus 250 can execute the generation processing in parallel, for each feature of the depth maps.

In the third embodiment, the learning image and the deteriorated image are the still images of the brightness images, similar to the first embodiment. However, the learning image and the deteriorated image may be still images of color images. The learning image and the deteriorated image may be moving images. In the third embodiment, the base image can be learned while the restored image is generated, similar to the first embodiment.

In the third embodiment, the depth map is generated from the still image of the brightness image. However, the depth map may be input from the outside.

<Fourth Embodiment>

[Explanation of Outline of Sparse Coding in Fourth Embodiment]

Figure 24:
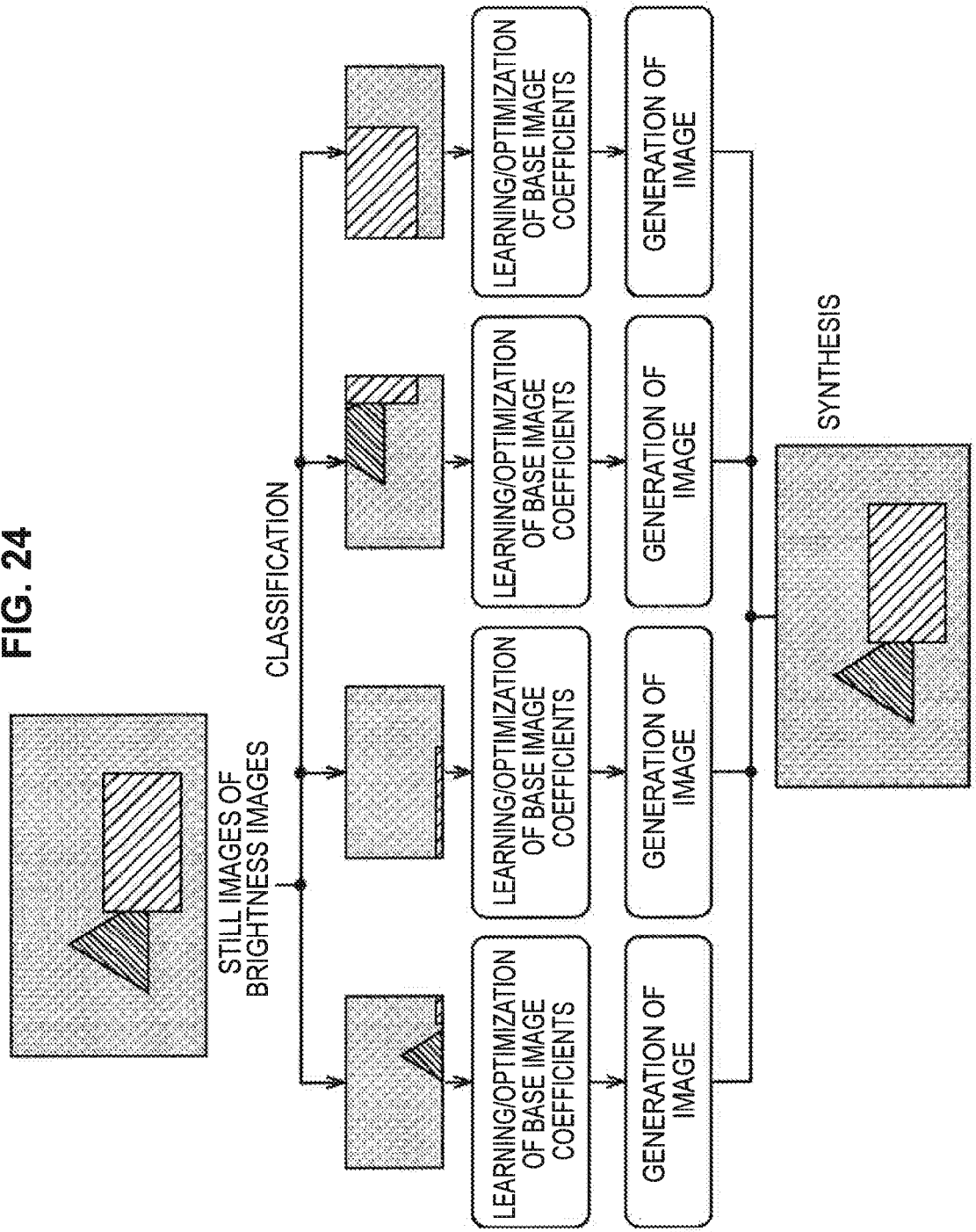
FIG. 24 is a diagram illustrating an outline of sparse coding in a fourth embodiment to which the present disclosure is applied.

FIG. 24 is a diagram illustrating an outline of sparse coding in a fourth embodiment to which the present disclosure is applied.

As illustrated in FIG. 24, in the fourth embodiment, previously, still images of a large amount of learning brightness images not having image quality deterioration are classified for each feature of spatial positions and base images are learned using the still images of the learning brightness images for each feature of the spatial positions. The learned base images for each feature of the spatial positions are held.

In this case, the features of the spatial positions are features of four kinds of a feature (hereinafter, referred to as a upper left region) where the spatial position is in a region of an upper left side when a screen is divided by four, a feature (hereinafter, referred to as an upper right region) where the spatial position is in a region of an upper right side, a feature (hereinafter, referred to as a lower left region) where the spatial position is in a region of a lower left side, and a feature (hereinafter, referred to as a lower right region) where the spatial position is in a region of a lower right side. The kinds of the features of the spatial positions are not limited to the above examples.

If a deteriorated image is input as a sparse coding object, the deteriorated image is classified into the upper left region, the upper right region, the lower left region, and the lower right region corresponding to the features of the spatial positions, based on the spatial positions in the screen. In addition, optimization of the base image coefficients is performed with respect to the deteriorated image using the base images of the features of the spatial positions, for each feature of the spatial positions. An image not having image quality deterioration that corresponds to the deteriorated image is generated as a restored image using the optimized base image coefficient and the base image, for each feature of the spatial positions, and the restored image of the feature of each spatial position is synthesized.

[Configuration Example of Learning Apparatus]

Figure 25:
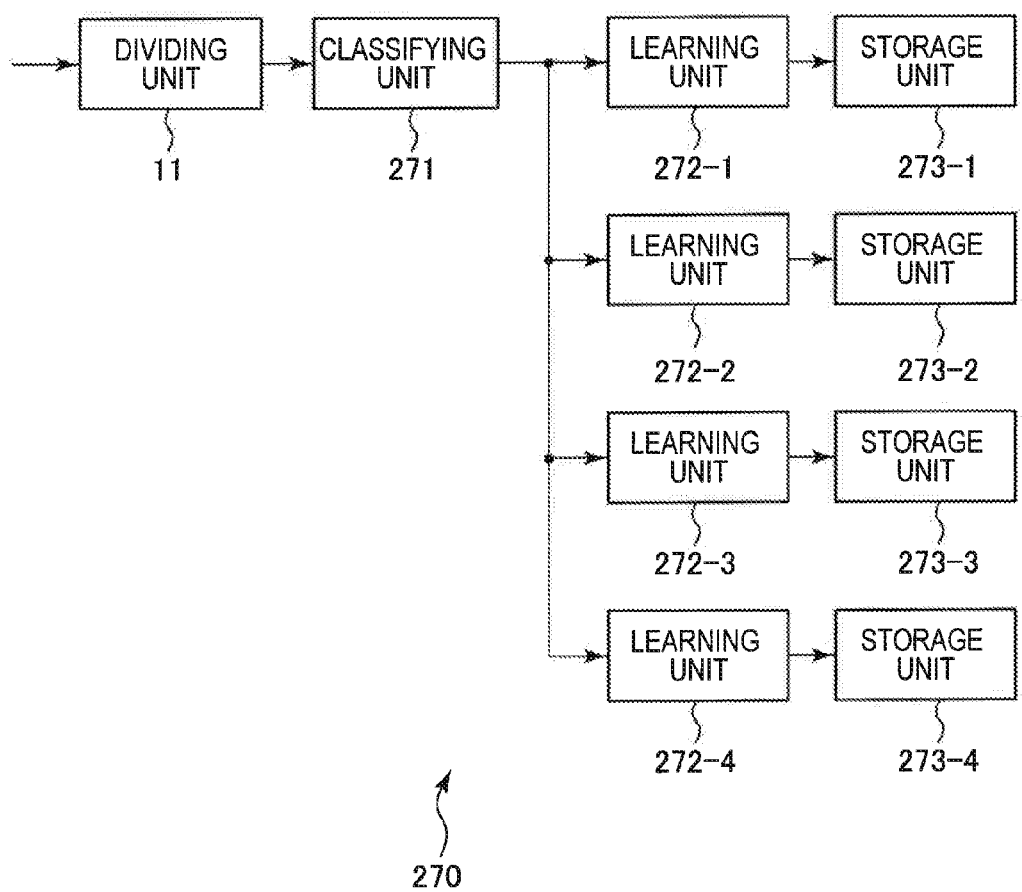
FIG. 25 is a block diagram illustrating a configuration example of a learning apparatus that corresponds to a fourth embodiment of the signal processing apparatus to which the present disclosure is applied.

FIG. 25 is a block diagram illustrating a configuration example of a learning apparatus that corresponds to a fourth embodiment of the signal processing apparatus to which the present disclosure is applied.

Among structural elements illustrated in FIG. 25, the structural elements that are the same as the structural elements of FIG. 2 are denoted with the same reference numerals. Repeated explanation of these structural elements is omitted.

A configuration of a learning apparatus 270 of FIG. 25 is different from the configuration of FIG. 2 in that a classifying unit 271 is provided, instead of the classifying unit 12, learning units 272-1 to 272-4 are provided, instead of the learning units 13-1 to 13-3, and storage units 273-1 to 273-4 are provided, instead of the storage units 14-1 to 14-3. The learning apparatus 270 learns abuse image for each feature of the spatial positions.

Specifically, the classifying unit 271 classifies the blocks supplied from the dividing unit 11 into the upper left region, the lower left region, the lower right region, and the upper right region, based on the spatial positions of the blocks. The classifying unit 271 supplies the block of the upper left region to the learning unit 272-1, supplies the block of the upper right region to the learning unit 272-2, supplies the block of the lower left region to the learning unit 272-3, and supplies the block of the lower right region to the learning unit 272-4.

The learning unit 272-1 models the block of the upper left region supplied from the classifying unit 271 by the expression 1 and learns the base image of the block unit of the upper left region. Specifically, the learning unit 272-1 learns the base image of the block unit of the upper left region, using the block of the upper left region and the cost function defined in the block unit by any one of the expressions 2 to 4. The learning unit 272-1 supplies the learned base image of the block unit of the upper left region to the storage unit 273-1.

Similar to the learning unit 272-1, each of the learning units 272-2 and 272-4 models the block supplied from the classifying unit 271 by the expression 1 and learns the base image of the block unit. The learning unit 272-2 supplies the learned base image of the block unit of the upper right region to the storage unit 273-2 and the learning unit 272-3 supplies the learned base image of the block unit of the lower left region to the storage unit 273-3. In addition, the learning unit 272-4 supplies the learned base image of the block unit of the lower right region to the storage unit 273-4. Hereinafter, the learning units 272-1 to 272-4 are collectively referred to as the learning units 272, when it is not necessary to distinguish the learning units 272-1 to 272-4 in particular.

The storage unit 273-1 stores the base image of the block unit of the upper left region supplied from the learning unit 272-1 and the storage unit 273-2 stores the base image of the block unit of the upper right region supplied from the learning unit 272-2. In addition, the storage unit 273-3 stores the base image of the block unit of the lower left region supplied from the learning unit 272-3 and the storage unit 273-4 stores the base image of the block unit of the lower right region supplied from the learning unit 272-4. Hereinafter, the storage units 273-1 to 273-4 are collectively referred to as the storage units 273, when it is not necessary to distinguish the storage units 273-1 to 273-4 in particular.

[Explanation of Processing of Learning Apparatus]

Figure 26:
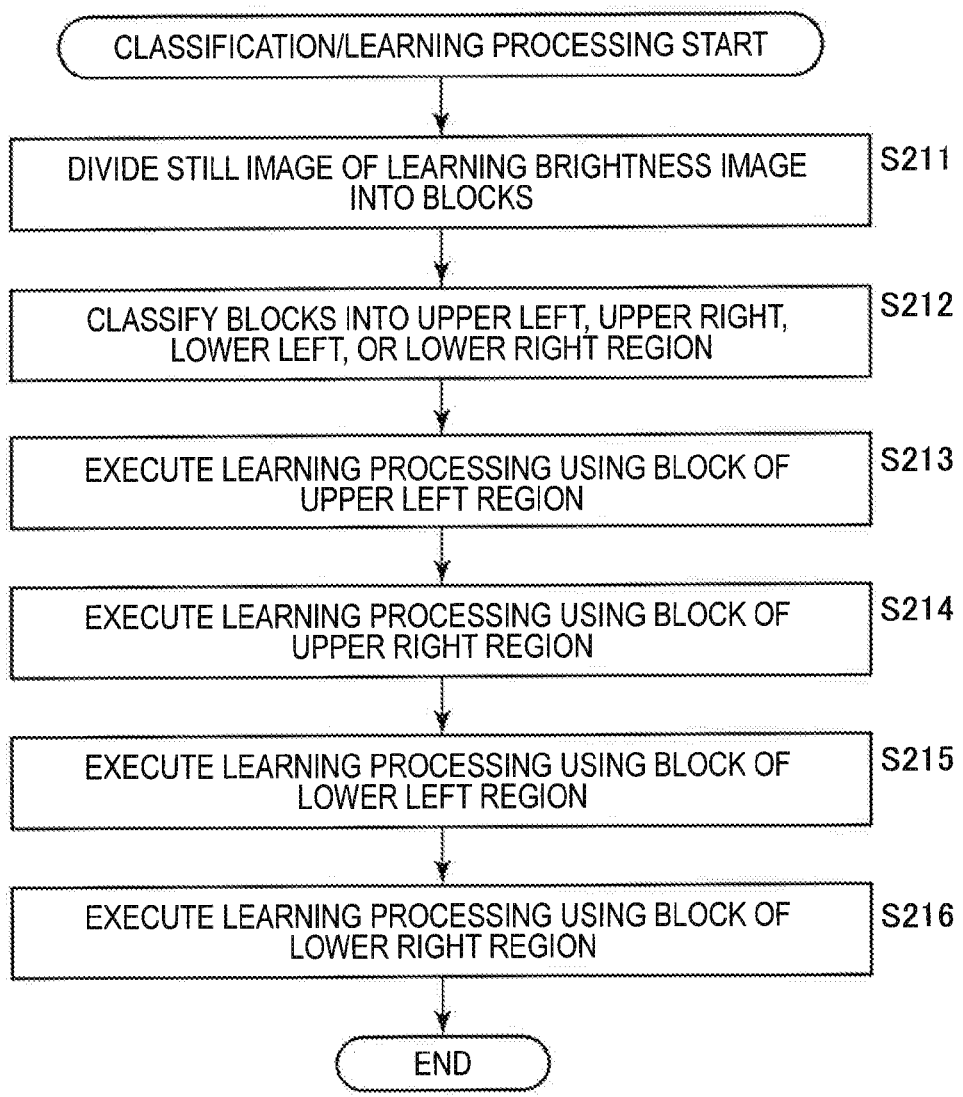
FIG. 26 is a flowchart illustrating classification/learning processing of the learning apparatus of FIG. 25.

FIG. 26 is a flowchart illustrating classification/learning processing of the learning apparatus 270 of FIG. 25. The classification/learning processing is performed off-line when the still images of all the learning brightness images are input from the outside to the learning apparatus 270.

In step S211 of FIG. 26, the dividing unit 11 divides the still image of the learning brightness image input from the outside into the blocks having the predetermined sizes and supplies the blocks to the classifying unit 271.

In step S212, the classifying unit 271 classifies the blocks supplied from the dividing unit 11 into the upper left region, the lower left region, the lower right region, and the upper right region, based on the spatial positions of the blocks in the screen. The classifying unit 271 supplies the block of the upper left region to the learning unit 272-1, supplies the block of the upper right region to the learning unit 272-2, supplies the block of the lower left region to the learning unit 272-3, and supplies the block of the lower right region to the learning unit 272-4.

In step S213, the learning unit 272-1 executes the learning processing of FIG. 7, using the block of the upper left region supplied from the classifying unit 271 and the cost function defined in the block unit by any one of the expressions 2 to 4.

In step S214, the learning unit 272-1 executes the learning processing of FIG. 7, using the block of the upper right region supplied from the classifying unit 271 and the cost function defined in the block unit by any one of the expressions 2 to 4.

In step S215, the learning unit 272-1 executes the learning processing of FIG. 7, using the block of the lower left region supplied from the classifying unit 271 and the cost function defined in the block unit by any one of the expressions 2 to 4.

In step S216, the learning unit 272-1 executes the learning processing of FIG. 7, using the block of the lower right region supplied from the classifying unit 271 and the cost function defined in the block unit by any one of the expressions 2 to 4. Then, the processing ends.

As described above, the learning apparatus 270 learns a base image, for each feature of the spatial positions of the still image of the learning brightness image, such that the still image of the learning brightness image is represented by a linear operation of base images of which base image coefficients become sparse. Therefore, an accurate base image for each feature of the spatial positions can be learned.

By learning the base image for each feature of the spatial positions, the learning apparatus 270 can decrease a convergence time of the base images, similar to the learning apparatus 10. Because the learning apparatus 270 learns the base image for each feature of the spatial positions, the learning apparatus 270 can execute the learning processing in parallel, for each feature of the spatial positions.

[Configuration Example of Image Generating Apparatus]

Figure 27:
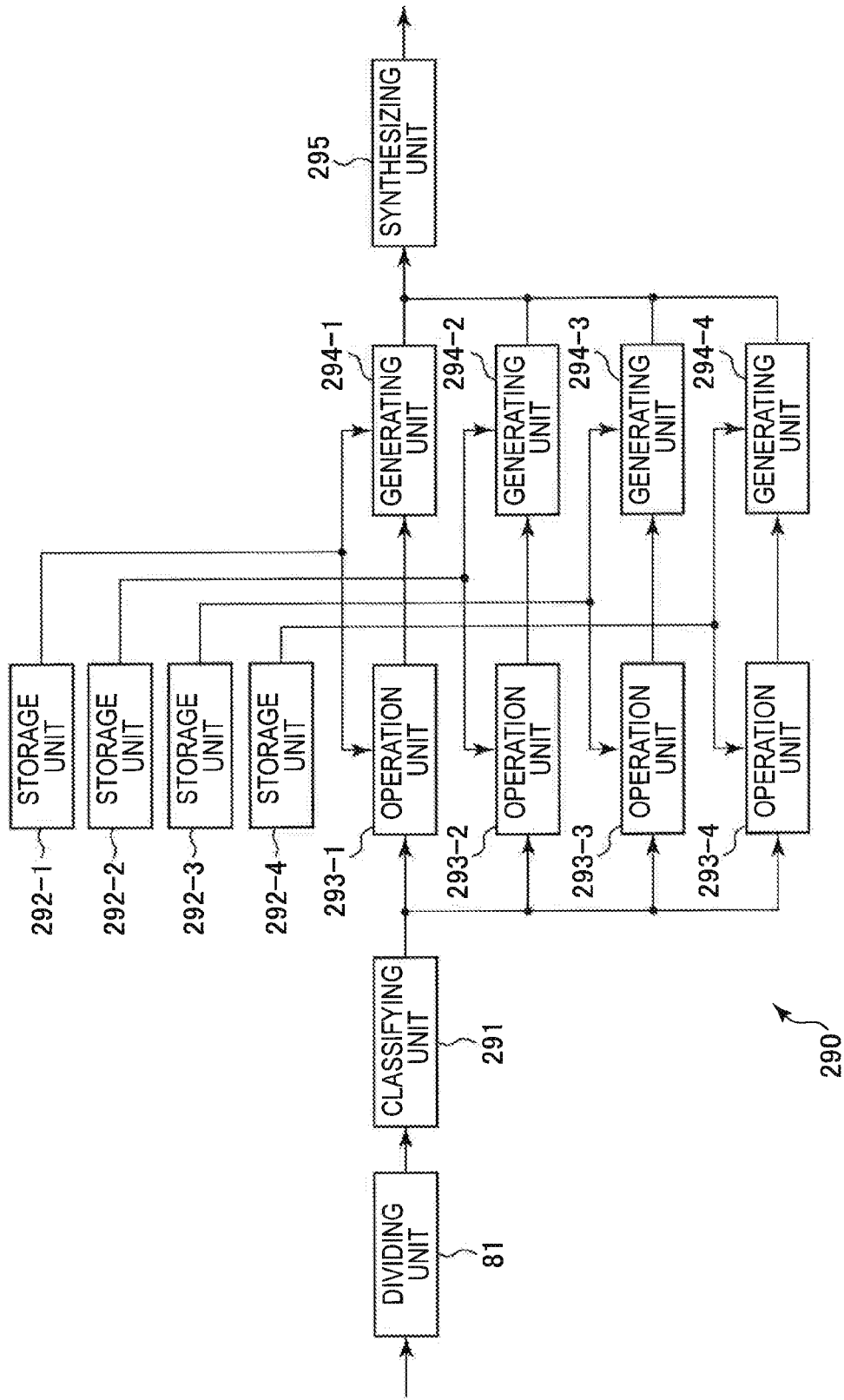
FIG. 27 is a block diagram illustrating a configuration example of an image generating apparatus that corresponds to a fourth embodiment of the output apparatus to which the present disclosure is applied.

FIG. 27 is a block diagram illustrating a configuration example of an image generating apparatus that generates an image using a base image for each feature of the spatial positions learned by the learning apparatus 270 of FIG. 25 and corresponds to a fourth embodiment of the output apparatus to which the present disclosure is applied.

Among structural elements illustrated in FIG. 27, the structural elements that are the same as the structural elements of FIG. 8 are denoted with the same reference numerals. Repeated explanation of these structural elements is omitted.

A configuration of an image generating apparatus 190 of FIG. 27 is different from the configuration of FIG. 8 in that a classifying unit 291, storage units 292-1 to 292-4, operation units 293-1 to 293-4, generating units 294-1 to 294-4, and a synthesizing unit 295 are provided, instead of the classifying unit 82, the storage units 83-1 to 83-3, the operation units 84-1 to 84-3, the generating units 85-1 to 85-3, and the synthesizing unit 86. The image generating apparatus 190 performs sparse coding according to the feature of the spatial position with respect to the still image of the brightness image input as the deteriorated image from the outside and generates a restored image.

Specifically, the classifying unit 291 of the image generating apparatus 190 classifies the blocks supplied from the dividing unit 81 into the upper left region, the upper right region, the lower left region, and the lower right region, based on the spatial positions of the blocks. The classifying unit 291 supplies the block of the upper left region to the operation unit 293-1, supplies the block of the upper right region to the operation unit 293-2, supplies the block of the lower left region to the operation unit 293-3, and supplies the block of the lower right region to the operation unit 293-4.

The storage unit 292-1 stores the base image of the block unit of the upper left region that is learned by the learning apparatus 270 of FIG. 25 and is stored in the storage unit 273-1. The storage unit 292-2 stores the base mage of the block unit of the upper right region that is stored in the storage unit 273-2 and the storage unit 292-3 stores the base image of the block unit of the lower left region that is stored in the storage unit 273-3. The storage unit 292-4 stores the base mage of the block unit of the lower right region that is stored in the storage unit 273-4.

The operation unit 293-1 reads the base image of the block unit of the upper left region from the storage unit 292-1. The operation unit 293-1 operates the base image coefficient vector of the block unit, for each block of the upper left region of the deteriorated image supplied from the classifying unit 291, such that the cost function becomes smaller than the predetermined threshold value. The cost function is defined in the block unit by an expression obtained by setting Y of any one of the expressions 2 to 4 to a deteriorated image vector, using the base image matrix of the block unit including the read base image of the block unit. The operation unit 293-1 supplies the base image coefficient vector of the block unit to the generating unit 294-1.

Similar to the operation unit 293-1, the operation units 293-2 to 293-4 read the base images of the block units from the storage units 292-2 and 292-4, respectively, and operate the base image coefficient vectors of the block units, for each block supplied from the classifying unit 291. The operation units 293-2 to 293-4 supply the operated base image coefficient vectors of the block units to the generating units 294-2 to 294-4, respectively.

The generating unit 294-1 reads the base image of the block unit of the upper left region from the storage unit 292-1. The generating unit 294-1 generates the still image of the brightness image of the block unit of the upper left region by the expression 7, for each block, using the base image coefficient vector of the block unit supplied from the operation unit 293-1 and the base image matrix of the block unit including the read base image of the block unit of the upper left region.

The generating unit 294-1 generates a still image of a brightness image corresponding to the upper left region of the deteriorated image from the still image of the brightness image of the block unit of the upper left region and supplies the still image as a restored image of the upper left region to the synthesizing unit 295.

Similar to the generating unit 294-1, the generating units 294-2 to 294-4 read the base images of the block units from the storage units 292-2 to 292-4, respectively, and generate still images of brightness images of the block units. The generating unit 294-2 generates a restored image of the upper right region from the generated still image of the brightness image of the block unit and supplies the restored image to the synthesizing unit 295.

The generating unit 294-3 generates a restored image of the lower left region from the generated still image of the brightness image of the block unit and supplies the restored image to the synthesizing unit 295. The generating unit 294-4 generates a restored image of the lower right region from the generated still image of the brightness image of the block unit and supplies the restored image to the synthesizing unit 295.

The synthesizing unit 295 synthesizes the restored images of the upper left region, the upper right region, the lower left region, and the lower right region, such that the restored image of the upper left region supplied from the generating unit 294-1 is arranged on the upper left side of the screen, the restored image of the upper right region supplied from the generating unit 294-2 is arranged on the upper right side of the screen, the restored image of the lower left region supplied from the generating unit 294-3 is arranged on the lower left side of the screen, and the restored image of the lower right region supplied from the generating unit 294-4 is arranged on the lower right side of the screen. The synthesizing unit 295 outputs one restored image obtained as a synthesis result.

Hereinafter, the storage units 292-1 to 292-4 are collectively referred to as the storage units 292, when it is not necessary to distinguish the storage units 292-1 to 292-4 in particular. Likewise, the operation units 293-1 to 293-4 are collectively referred to as the operation units 293 and the generating units 294-1 to 294-4 are collectively referred to as the generating units 294.

[Explanation of Processing of Image Generating Apparatus]

Figure 28:
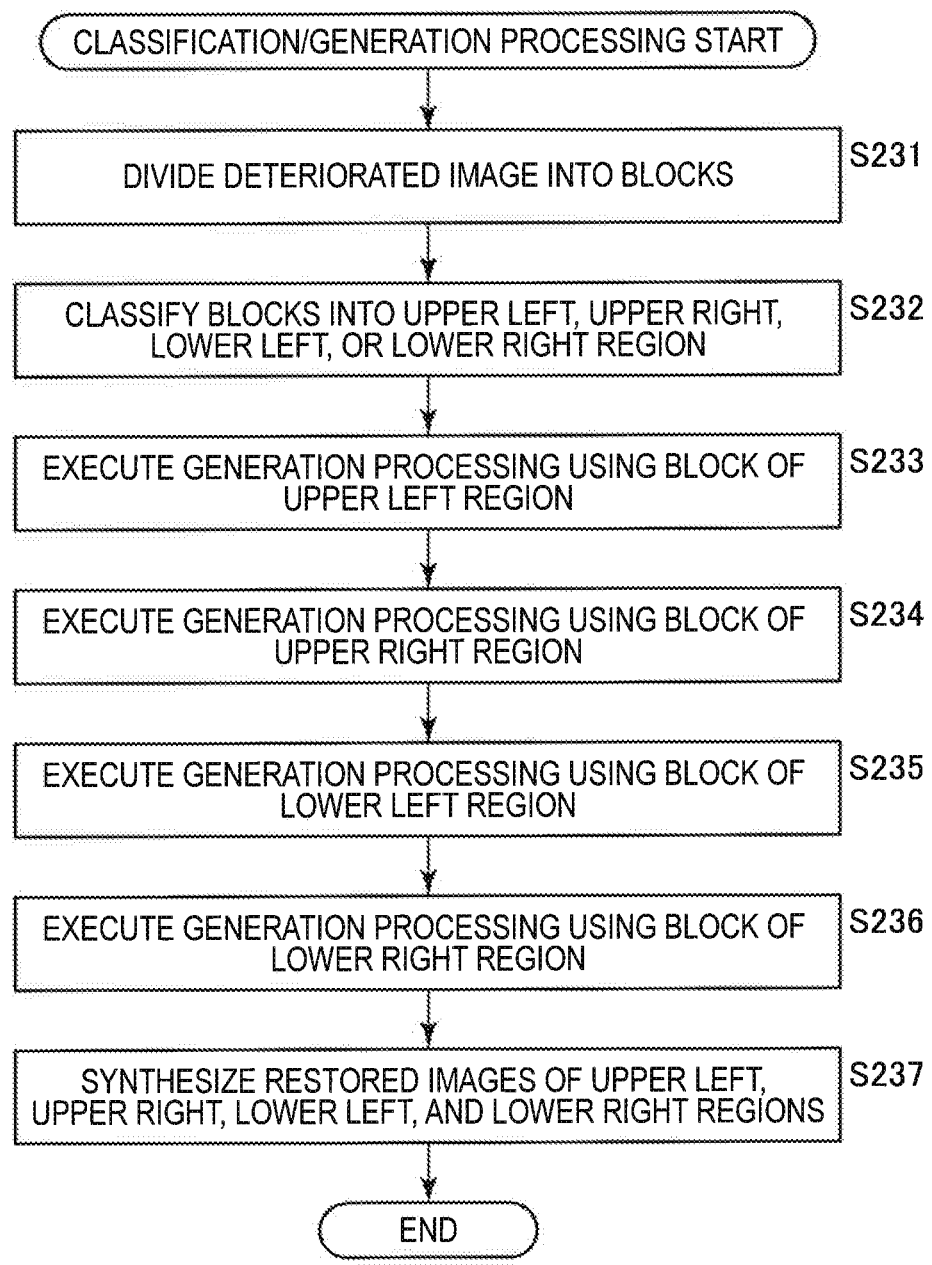
FIG. 28 is a flowchart illustrating classification/generation processing of the image generating apparatus of FIG. 27.

FIG. 28 is a flowchart illustrating classification/generation processing of the image generating apparatus 29 of FIG. 27. The classification/generation processing starts when a still image of a brightness image is input as a deteriorated image from the outside.

In step S231 of FIG. 28, the dividing unit 81 of the image generating apparatus 290 divides the still image of the brightness image input as the deteriorated image from the outside into blocks having predetermined sizes and supplies the blocks to the o classifying unit 291, similar to the dividing unit 11 of FIG. 25.

In step S232, the classifying unit 291 classifies the blocks supplied from the dividing unit 81 into the upper left region, the upper right region, the lower left region, and the lower right region, based on the spatial positions of the blocks in the screen. The classifying unit 291 supplies the block of the upper left region to the operation unit 293-1, supplies the block of the upper right region to the operation unit 293-2, supplies the block of the lower left region to the operation unit 293-3, and supplies the block of the lower right region to the operation unit 293-4.

In step S233, the image generating apparatus 290 executes the generation processing using the block of the upper left region. In step S234, the image generating apparatus 290 executes the generation processing using the block of the upper right region. In step S235, the image generating apparatus 290 executes the generation processing using the block of the lower left region. In step S236, the image generating apparatus 290 executes the generation processing using the block of the lower right region.

The generation processing that is executed in steps S233 to S236 is the same as the generation processing of FIG. 11, except that a still image of a brightness image corresponding to a region of a deteriorated image of a feature of a corresponding spatial position is generated, instead of the still image of one brightness image generated in step S91.

In step S237, the synthesizing unit 295 synthesizes the restored images of the upper left region, the upper right region, the lower left region, and the lower right region, such that the restored image of the upper left region supplied from the generating unit 294-1 is arranged on the upper left side of the screen, the restored image of the upper right region supplied from the generating unit 294-2 is arranged on the upper right side of the screen, the restored image of the lower left region supplied from the generating unit 294-3 is arranged on the lower left side of the screen, and the restored image of the lower right region supplied from the generating unit 294-4 is arranged on the lower right side of the screen. The synthesizing unit 295 outputs one restored image obtained as the synthesis result and ends the processing.

As described above, the image generating apparatus 290 obtains the base image learned by the learning apparatus 270 for each feature of the spatial positions and operates the base image coefficient for each feature of the spatial positions, based on the base image for each feature of the spatial positions of the deteriorated image and the deteriorated image. Therefore, the image generating apparatus 290 can generate a high-definition restored image having a restoration effect suitable for the features of the spatial positions, using the base image and the base image coefficient for each feature of the spatial positions.

By operating the base image coefficient for each feature of the spatial positions, the image generating apparatus 290 can decrease the convergence time of the base image coefficients, similar to the image generating apparatus 80. Because the image generating apparatus 290 generates a restored image for each feature of the spatial positions, using the base image and the base image coefficient for each feature of the spatial positions, the image generating apparatus 290 can execute the generation processing in parallel, for each feature of the spatial positions.

In the fourth embodiment, the learning image and the deteriorated image are the still images of the brightness images, similar to the first embodiment However, the learning image and the deteriorated image may be still images of color images. The learning image and the deteriorated image may be moving images. In the fourth embodiment, the base image can be learned while the restored image is generated, similar to the first embodiment.

<Fifth Embodiment>

[Explanation of Outline of Sparse Coding in Fifth Embodiment]

Figure 29:
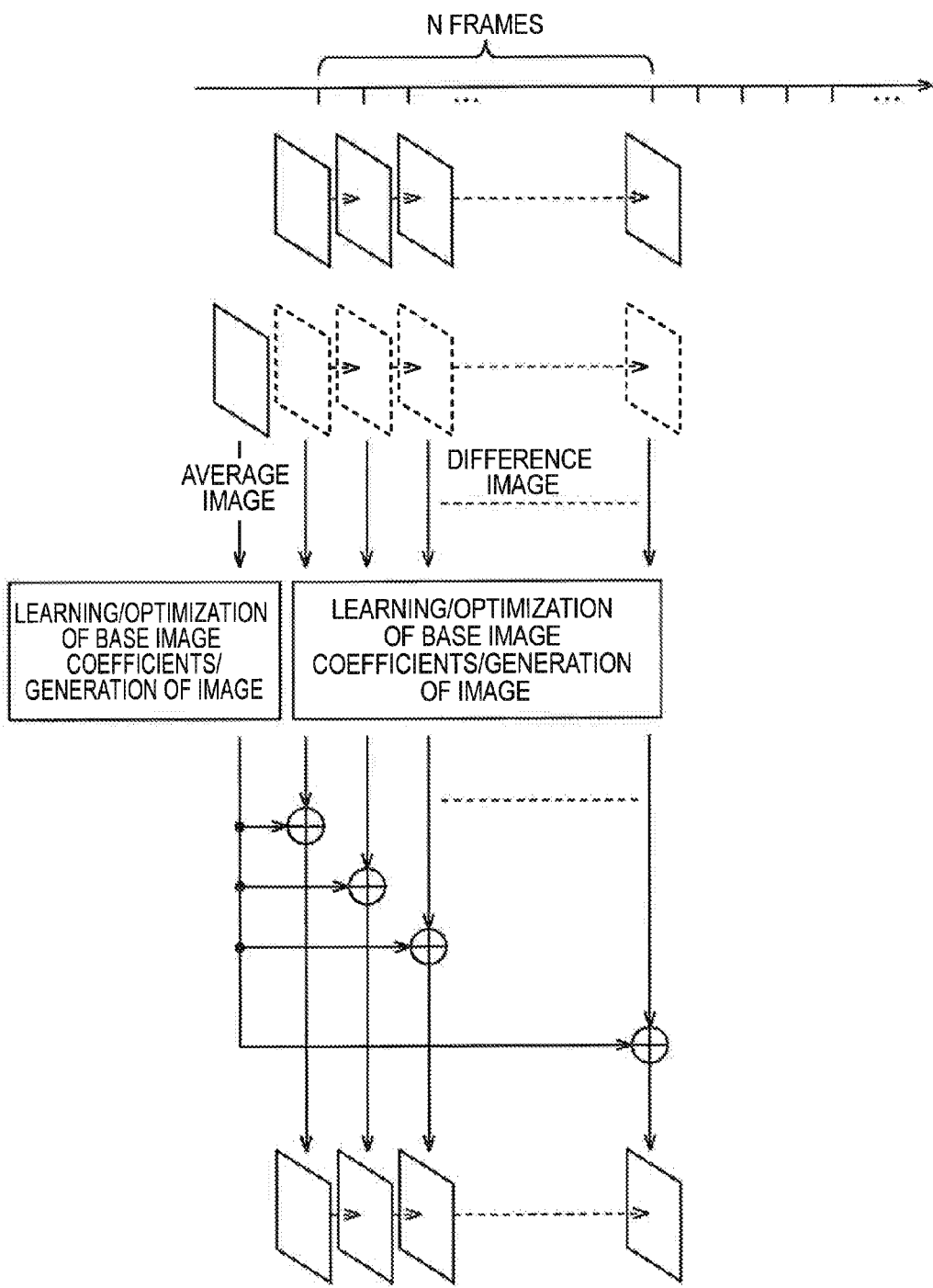
FIG. 29 is a diagram illustrating an outline of sparse coding in a fifth embodiment to which the present disclosure is applied.

FIG. 29 is a diagram illustrating an outline of sparse coding in a fifth embodiment to which the present disclosure is applied.

As illustrated in FIG. 29, in the fifth embodiment, previously, moving images of a large amount of learning brightness images not having image quality deterioration are classified for each feature of a time change and base images are learned using the moving images of the learning brightness images for each feature of the time change. The learned base images for each feature of the time change are held.

In this case, the features of the time change are an average value (hereinafter, referred to as an average image) of pixel values corresponding to N frames to be a feature where there is no time change between N frames and a difference value (hereinafter, referred to as a difference image) of an average value and a pixel value of each frame to be a feature where there is a time change in each frame. The features of the time change are not limited to the above examples.

If a moving image of a brightness image is input as a deteriorated image of a sparse coding object, individual frames of the moving image are classified into the average image and the difference image. In addition, optimization of a base image coefficient is performed using a base image of the average image and the average image and an image not having image quality deterioration that corresponds to the average image is generated as a restored image of the average image, using the base image coefficient and the base image of the average image.

In addition, optimization of a base image coefficient is performed using a base image of the difference image and the difference image and an image not having image quality deterioration that corresponds to the difference image is generated as a restored image of the difference image, using the base image coefficient and the base image of the difference image. A restored image of an average image for every N frames and a restored image of a difference image of each frame are added for each frame and a restored image of each frame is generated.

[Configuration Example of Learning Apparatus]

Figure 30:
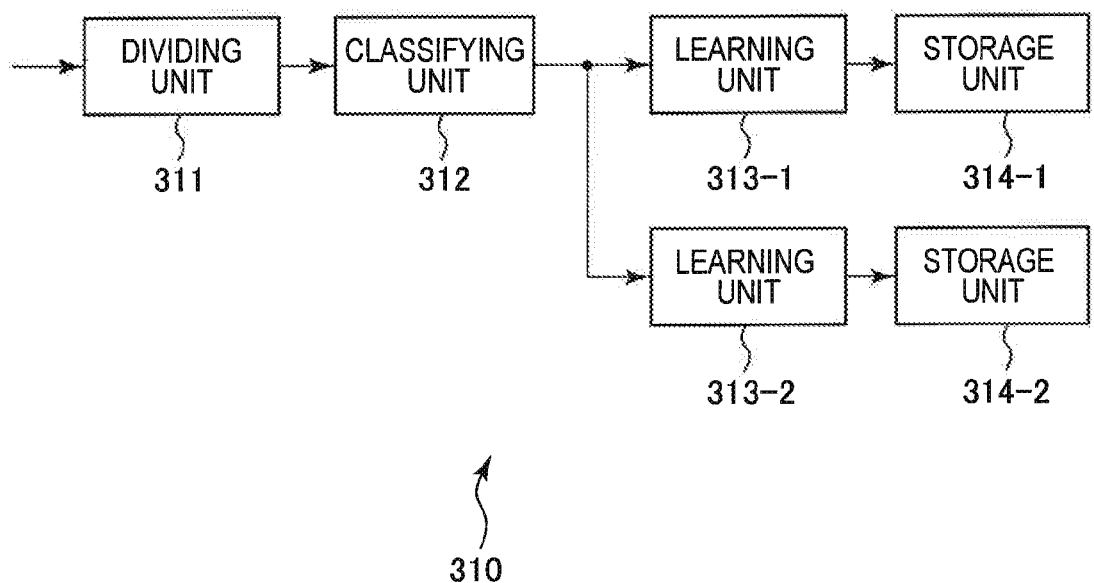
FIG. 30 is a block diagram illustrating a configuration example of a learning apparatus that corresponds to a fifth embodiment of the signal processing apparatus to which the present disclosure is applied.

FIG. 30 is a block diagram illustrating a configuration example of a learning apparatus that corresponds to a fifth embodiment of the signal processing apparatus to which the present disclosure is applied.

A learning apparatus 310 of FIG. 30 includes a dividing unit 311, a classifying unit 213, learning units 313-1 and 313-2, and storage units 314-1 and 314-2 and learns a base image for each feature of a time change.

Specifically, moving images of a large amount of learning brightness images that do not have image quality deterioration are input from the outside to the dividing unit 311 of the learning apparatus 310. The dividing unit 311 divides the moving image of the learning brightness image into blocks having predetermined sizes, for each frame, and supplies the blocks to the classifying unit 312.

The classifying unit 312 generates the average image of the block unit for every N frames, from the blocks of the individual frames supplied from the dividing unit 311, and supplies the average image to the learning unit 313-1. The classifying unit 312 operates a difference value of a pixel value of each block of each frame and an average image of the N frames including the frame, generates a difference image of the block unit, and supplies the difference image to the learning unit 313-2.

The learning unit 313-1 models the average image of the block unit supplied from the classifying unit 312 by the expression 1 and learns the base image of the block unit of the average image. Specifically, the learning unit 313-1 learns the base image of the block unit of the average image, using the average image of the block unit and the cost function defined in the block unit by any one of the expressions 2 to 4. The learning unit 313-1 supplies the learned base image of the block unit of the average image to the storage unit 314-1.

Similar to the learning unit 313-1, the learning unit 313-2 models the difference image of the block unit supplied from the classifying unit 312 by the expression 1 and learns the base image of the block unit of the difference image. The learning unit 313-2 supplies the learned base image of the block unit of the difference image to the storage unit 314-2.

The storage unit 314-1 stores the base image of the block unit of the average image that is supplied from the learning unit 313-1. The storage unit 314-2 stores the base image of the block unit of the difference image that is supplied from the learning unit 313-2.

Hereinafter, the learning units 313-1 and 313-2 are collectively referred to as the learning units 313, when it is not necessary to distinguish the learning units 313-1 and 313-2 in particular. Likewise, the storage units 314-1 and 314-2 are collectively referred to as the storage units 314.

[Explanation of Processing of Learning Apparatus]

Figure 31:
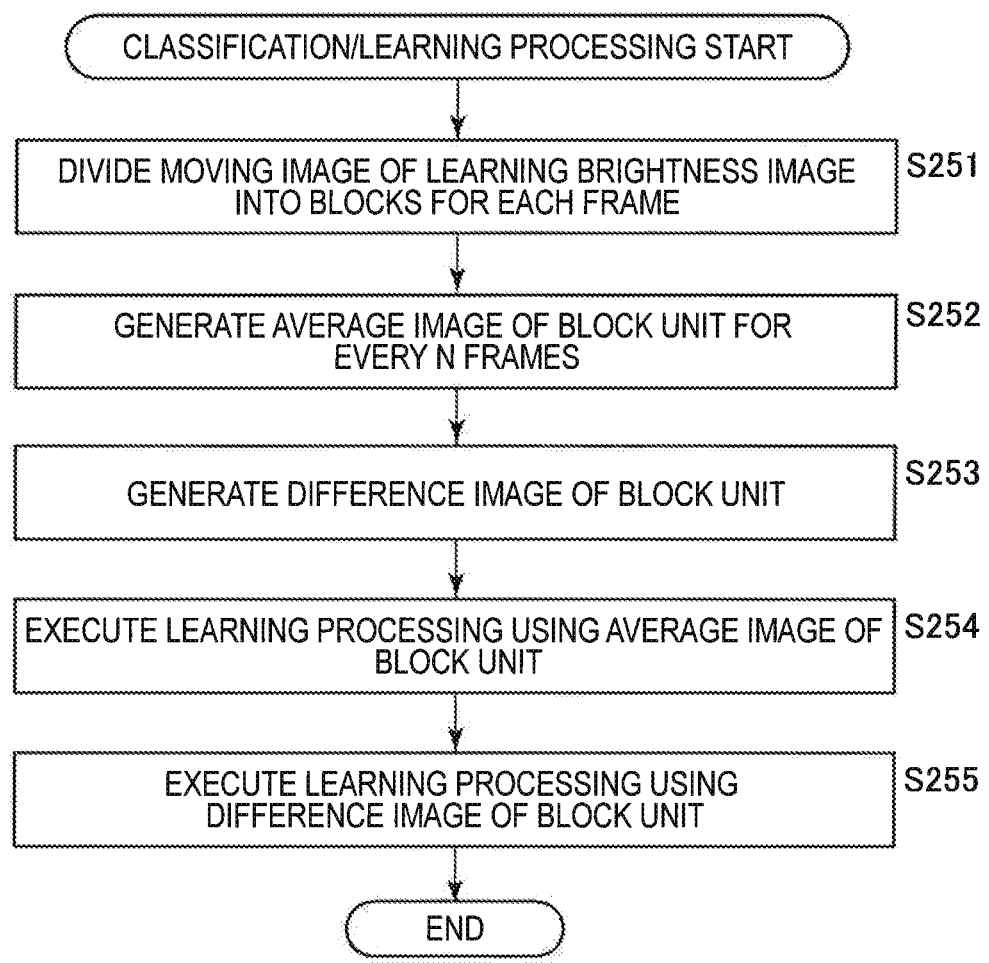
FIG. 31 is a flowchart illustrating classification/learning processing of the learning apparatus of FIG. 30.

FIG. 31 is a flowchart illustrating classification/learning processing of the learning apparatus 310 of FIG. 30. The classification/learning processing is performed off-line when the moving images of all the learning brightness images are from the outside to the learning apparatus 310.

In step S251 of FIG. 31, the dividing unit 311 divides a moving image of a learning brightness image input from the outside into blocks having predetermined sizes for each frame and supplies the blocks to the classifying unit 312.

In step S252, the classifying unit 312 generates the average image of the block unit for every N frames, from the blocks of the individual frames supplied from the dividing unit 311, and supplies the average image to the earning unit 313-1.

In step S253, the classifying unit 312 operates the difference value of the pixel value of each block of each frame and the average image of the N frames including the frame, generates the difference image of the block unit, and supplies the difference image to the learning unit 313-2.

In step S254, the learning unit 313-1 executes the learning processing of FIG. 7, using the average image of the block unit supplied from the classifying unit 312 and the cost function defined in the block unit by any one of the expressions 2 to 4.

In step S255, the learning unit 313-1 executes the learning processing of FIG. 7, using the difference image of the block unit supplied from the classifying unit 312 and the cost function defined in the block unit by any one of the expressions 2 to 4. Then, the processing ends.

As described above, the learning apparatus 310 learns a base image, for each feature of the time change of the moving image of the learning brightness image, such that the moving image of the learning brightness image is represented by a linear operation of base images of which base image coefficients become sparse. Therefore, an accurate base image for each feature of the time change can be learned.

By learning the base image for each feature of the time change, the learning apparatus 310 can decrease a convergence time of the base images, similar to the learning apparatus 10. Because the learning apparatus 310 learns the base image for each feature of the time change, the learning apparatus 310 can execute the learning processing in parallel, for each feature of the time change.

[Configuration Example of Image Generating Apparatus]

Figure 32:
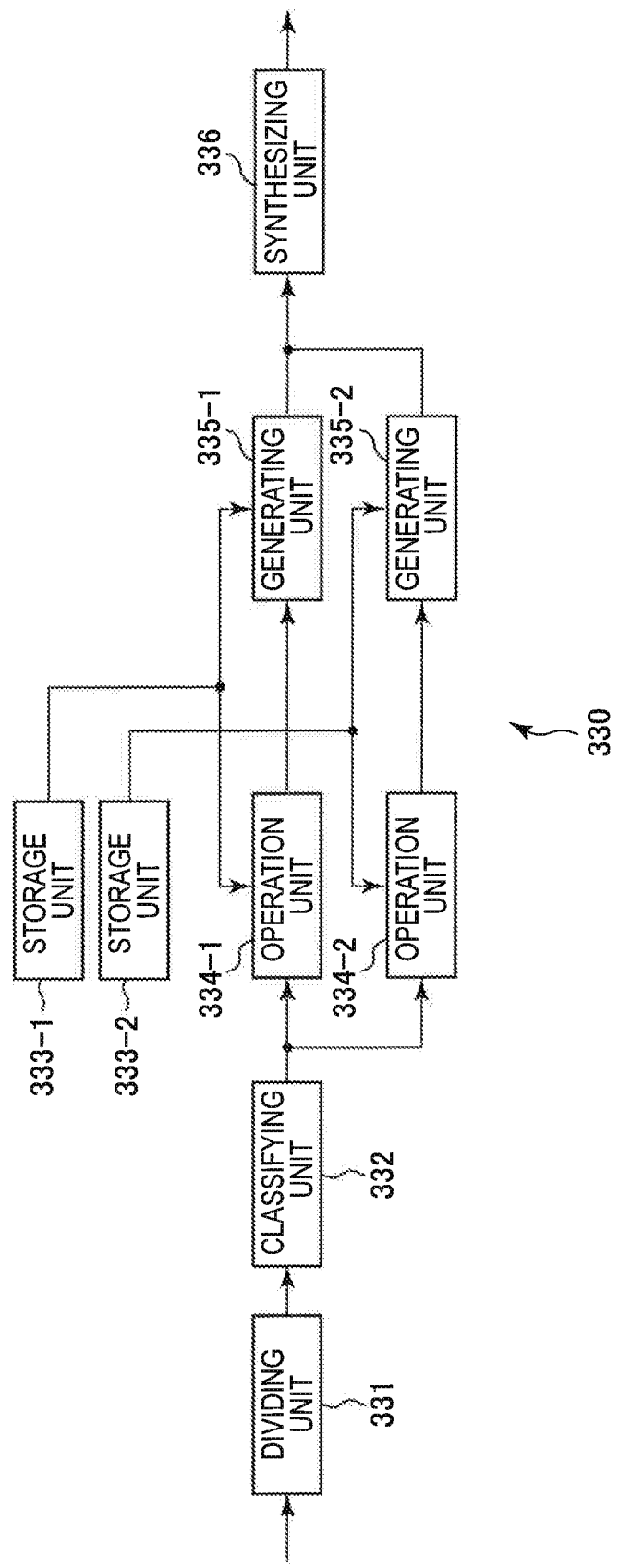
FIG. 32 is a block diagram illustrating a configuration example of an image generating apparatus that corresponds to a fifth embodiment of the output apparatus to which the present disclosure is applied.

FIG. 32 is a block diagram illustrating a configuration example of an image generating apparatus that generates an image using the base image for each feature of the time change learned by the learning apparatus 310 of FIG. 30 and corresponds to a fifth embodiment of the output apparatus to which the present disclosure is applied.

An image generating apparatus 330 of FIG. 32 includes a dividing unit 331, a classifying unit 332, storage units 333-1 and 333-2, operation units 334-1 and 334-2, generating units 335-1 and 335-2, and a synthesizing unit 336. The image generating apparatus 330 performs sparse coding for each feature of the time change, with respect to a moving image of a brightness image input as a deteriorated image from the outside, and generates a restored image.

Specifically, the moving image of the brightness image is input as the deteriorated image from the outside to the dividing unit 331 of the image generating apparatus 330. The dividing unit 331 divides the deteriorated image input from the outside into blocks having predetermined sizes, for each frame, and supplies the blocks to the classifying unit 312, similar to the dividing unit 311 of FIG. 30.

The classifying unit 332 generates the average image of the block unit for every N frames, from the blocks of the individual frames supplied from the dividing unit 331, and supplies the average image to the operation unit 334-1. The classifying unit 332 operates a difference value of a pixel value of each block of each frame and an average image of the N frames including the frame, generates a difference image of the block unit, and supplies the difference image to the operation unit 334-2.

The storage unit 333-1 stores the base image of the block unit of the average image that is learned by the learning apparatus 310 of FIG. 30 and is stored in the storage unit 314-1 and the storage unit 333-2 stores the base image of the block unit of the difference image that is stored in the storage unit 314-2.

The operation unit 334-1 reads the base image of the block unit of the average image from the storage unit 333-1. The operation unit 334-1 operates a base image coefficient vector of the block unit, for each average image of the block unit supplied from the classifying unit 332, such that the cost function becomes smaller than the predetermined threshold value. The cost function is defined in the block unit by an expression obtained by setting Y of any one of the expressions 2 to 4 to a deteriorated image vector, using the base image matrix of the block unit including the read base image of the block unit. The operation unit 334-1 supplies the operated base image coefficient vector of the block unit to the generating unit 335-1.

Similar to the operation unit 334-1, the operation unit 334-2 operates a base image coefficient vector of the block unit, for each block of the different image supplied from the classifying unit 332, and supplies the base image coefficient vector to the generating unit 335-2.

The generating unit 335-1 reads the base image of the block unit of the average image from the storage unit 333-1. The generating unit 335-1 generates the moving image of the brightness image of the block unit by the expression 7, for each block, using the base image coefficient vector of the block unit supplied from the operation unit 334-1 and the base image matrix of the block unit including the base image of the block unit of the average image. The generating unit 335-1 generates a moving image of a brightness mage of a frame unit from the generated moving image of the brightness image of the block unit and supplies the moving image as a restored image of the average image to the synthesizing unit 336.

Similar to the generating unit 335-1, the generating unit 335-2 reads the base image of the block unit of the difference image from the storage unit 333-2 and generates a moving image of a brightness image of the block unit. The generating unit 335-2 generates a moving image of a brightness mage of a frame unit from the generated moving image of the brightness image of the block unit and supplies the moving image as a restored image of the difference image to the synthesizing unit 336.

The synthesizing unit 336 synthesizes (adds) the restored image of the average image supplied from the generating unit 335-1 and the restored image of the difference image supplied from the generating unit 335-2, for each frame, and generates a restored image. The synthesizing unit 336 outputs the generated restored image.

Hereinafter, the storage units 333-1 and 333-2 are collectively referred to as the storage units 333, when it is not necessary to distinguish the storage units 333-1 and 333-2 in particular. Likewise, the operation units 334-1 and 334-2 are collectively referred to as the operation units 334 and the generating units 335-1 and 335-2 are collectively referred to as the generating units 335.

[Explanation of Processing of Image Generating Apparatus]

Figure 33:
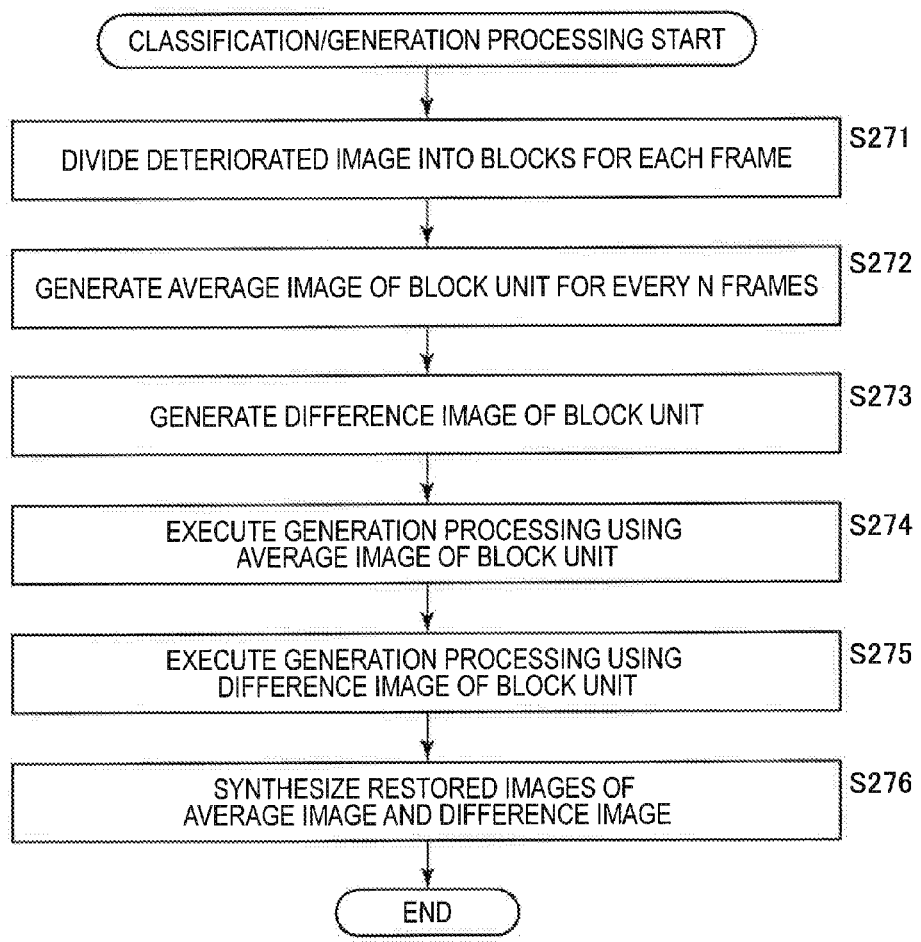
FIG. 33 is a flowchart illustrating classification/generation processing of the image generating apparatus of FIG. 32.

FIG. 33 is a flowchart illustrating classification/generation processing of the image generating apparatus 330 of FIG. 32. The classification/generation processing starts when a moving image of a brightness image is input as a deteriorated image from the outside.

In step S271 of FIG. 33, the classifying unit 331 of the image generating apparatus 330 divides the moving image of the brightness image input as the deteriorated image from the outside into blocks having predetermined sizes, for each frame, and supplies the blocks to the classifying unit 332, similar to the dividing unit 311 of FIG. 30.

In step S272, the classifying unit 332 generates the average image of the block unit for every N frames, from the blocks of the individual frames supplied from the dividing unit 331, and supplies the average image to the operation unit 334-1.

In step S273, the classifying unit 332 operates a difference value of a pixel value of each block of each frame and an average image of the N frames including the frame, generates a difference image of the block unit, and supplies the difference image to the operation unit 334-2.

In step S274, the image generating apparatus 330 executes the generation processing of FIG. 11, using the average image of the block unit. In step S275, the image generating apparatus 330 executes the generation processing of FIG. 11, using the difference image of the block unit.

In step S276, the synthesizing unit 336 synthesizes the restored image of the average image supplied from the generating unit 335-1 and the restored image of the difference image supplied from the generating unit 335-2, for each frame, and generates a restored image. The synthesizing unit 336 outputs the generated restored image and ends the processing.

As described above, the image generating apparatus 330 obtains the base image learned by the learning apparatus 310 for each feature of the time change and operates the base image coefficient for each feature of the time change, based on the base image for each feature of the time change and the deteriorated image. Therefore, the image generating apparatus 330 can generate a smooth and high-definition restored image, using the base image and the base image coefficient for each feature of the time change.

By operating the base image coefficient for each feature of the time change, the image generating apparatus 330 can decrease the convergence time of the base image coefficients, similar to the image generating apparatus 80. Because the image generating apparatus 330 generates a restored image for each feature of the time change, using the base image and the base image coefficient for each feature of the time change, the image generating apparatus 330 can execute the generation processing in parallel, for each feature of the time change.

In the fifth embodiment, the learning image and the deteriorated image are the moving images of the brightness images. However, the learning image and the deteriorated image may be moving images of color images. In the fifth embodiment, the base image can be learned while the restored image is generated, similar to the first embodiment.

<Sixth Embodiment>

[Explanation of Outline of Sparse Coding in Sixth Embodiment]

Figure 34:
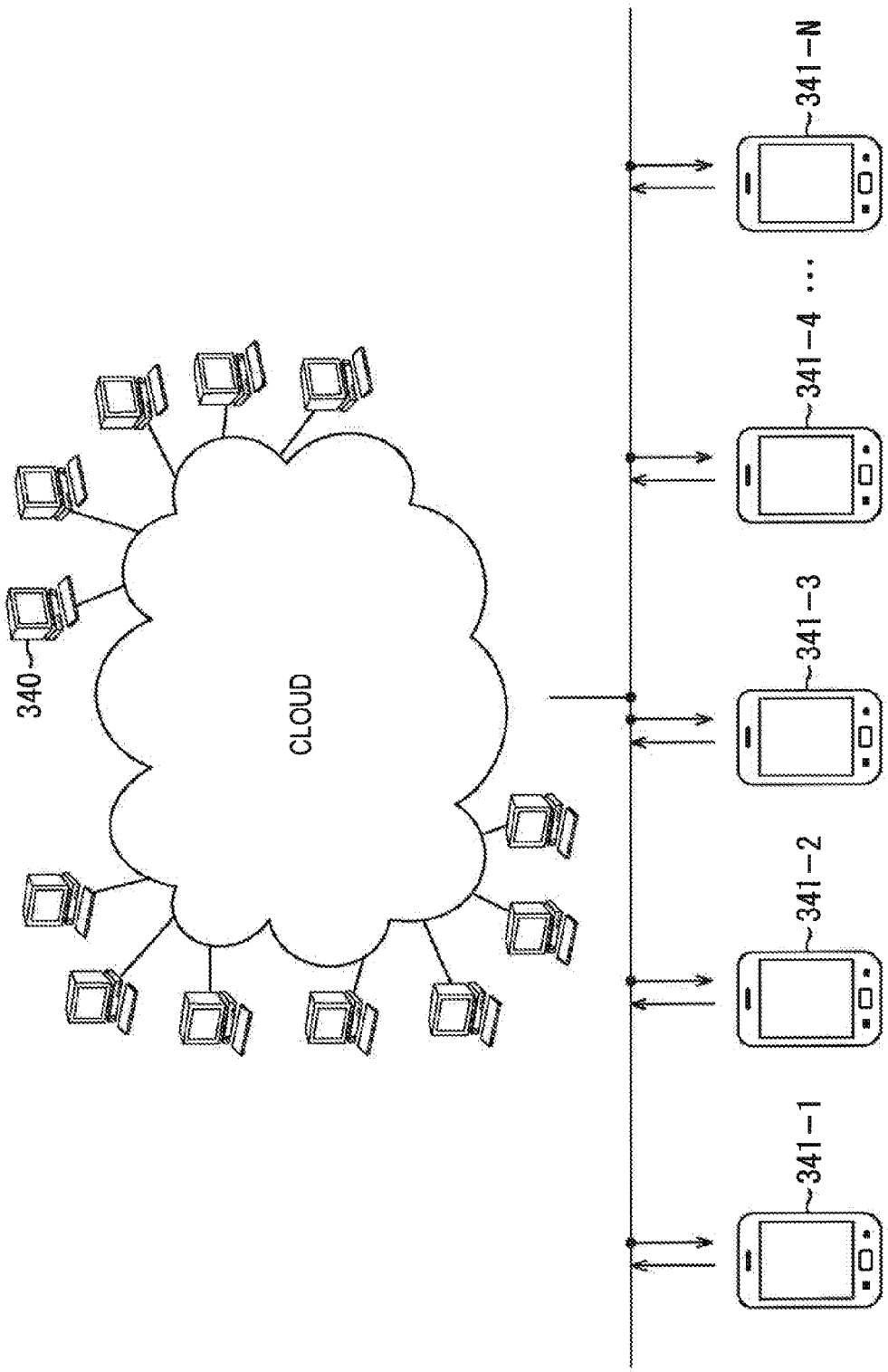
FIG. 34 is a diagram illustrating an outline of sparse coding in a sixth embodiment to which the present disclosure is applied.

FIG. 34 is a diagram illustrating an outline of sparse coding in a sixth embodiment to which the present disclosure is applied.

As illustrated in FIG. 34, in the sixth embodiment, image generating apparatuses 340 and terminals 341-1 to 341-N take a configuration of cloud computing. The image generating apparatus 340 transmits a deteriorated image to the different image generating apparatus 340 and receives a restored image corresponding to the deteriorated image from the different image generating apparatus 340.

In this case, previously, still images of a large amount of learning brightness images not having image quality deterioration are classified for each feature of the terminals 341-1 to 341-N and base images are learned using the still images of the learning brightness images for each feature of the terminals 341-1 to 341-N. The learned base images for each feature of the terminals 341-1 to 341-N are held.

Hereinafter, the terminals 341-1 to 341-N are collectively referred to as the terminals 341, when it is not necessary to distinguish the terminals 341-1 to 341-N in particular. As the features of the terminals 341, types of the terminals 341, photographing setting parameters, and global positioning system (GPS) information exist. In this case, the features of the terminals 341 are the types of the terminals 341 and the types of the terminals 341 are 3 types of a type A, a type B, and a type C.

If the deteriorated image is transmitted as a sparse coding object from the terminal 341, the image generating apparatus 340 classifies the deteriorated image into any one of the types A to C, based on the feature of the terminal 341 of a transmission origin. The image generating apparatus 340 performs optimization of a base image coefficient with respect to the deteriorated image, using a base image of the type into which the deteriorated image is classified. The image generating apparatus 340 generates an image not having image quality deterioration corresponding to the deteriorated image as a restored image, using the optimized base image coefficient and the base image of the type into which the deteriorated image is classified, and transmits the restored image to the terminal 341.

[Configuration Example of Learning Apparatus]

Figure 35:
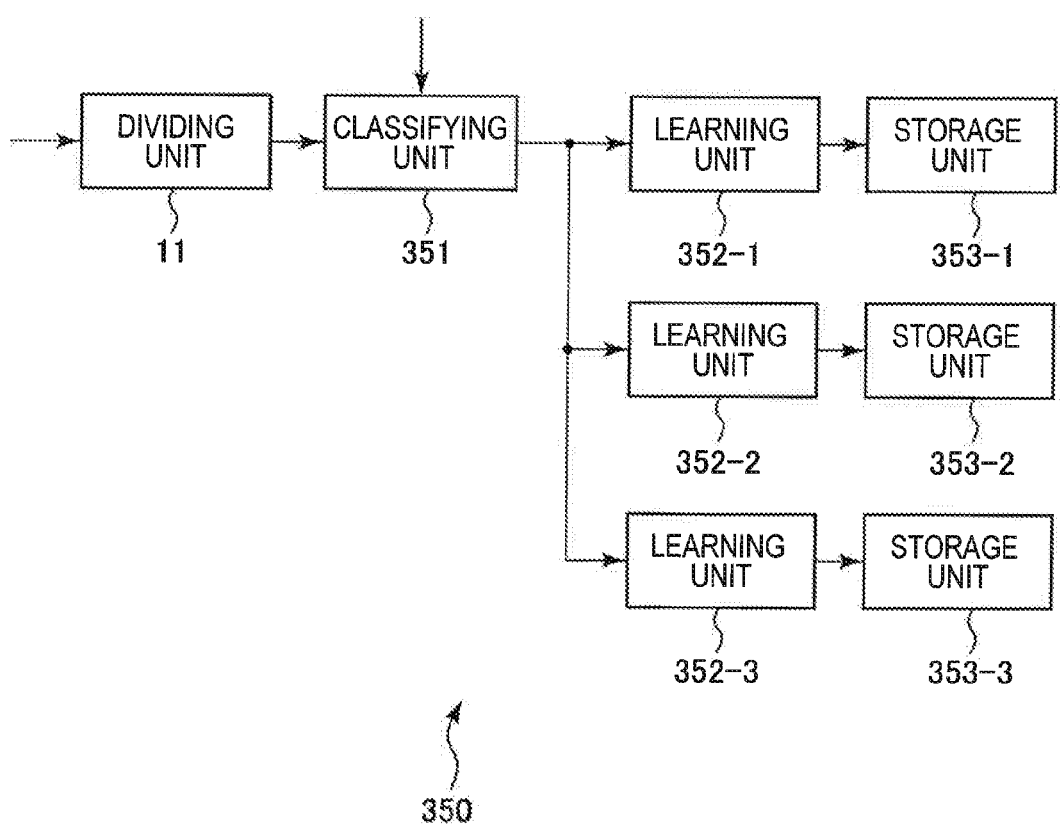
FIG. 35 is a block diagram illustrating a configuration example of a learning apparatus that corresponds to a sixth embodiment of the signal processing apparatus to which the present disclosure is applied.

FIG. 35 is a block diagram illustrating a configuration example of a learning apparatus that corresponds to a sixth embodiment of the signal processing apparatus to which the present disclosure is applied.

Among structural elements illustrated in FIG. 35, the structural elements that are the same as the structural elements of FIG. 2 are denoted with the same reference numerals. Repeated explanation of these structural elements is omitted.

A configuration of a learning apparatus 350 of FIG. 35 is different from the configuration of FIG. 2 in that a classifying unit 351 is provided, instead of the classifying unit 12, learning units 352-1 to 352-3 are provided, instead of the learning units 13-1 to 13-3, and storage units 353-1 to 353-3 are provided, instead of the storage units 14-1 to 14-3. The learning apparatus 350 learns a base image for each feature of the terminals 341.

Specifically, the type of the terminal 341 that corresponds to the still image of each learning brightness image is input from the outside to the classifying unit 351. The classifying unit 351 classifies the block supplied from the dividing unit 11 into any one of the types A to C, based on the type of the terminal 341 corresponding to the still image of the learning brightness image of the block, which is input from the outside. The classifying unit 351 supplies the block to any one of the learning units 352-i to 352-3 corresponding to the type into which the block is classified.

The learning units 352-1 to 352-3 correspond to the types A, B, and C. The learning unit 352-1 models the block of the type A supplied from the classifying unit 351 by the expression 1 and learns a base image of a block unit of the type A. Specifically, the learning unit 352-1 learns the base image of the block unit of the type A, using the block of the type A and the cost function defined in the block unit by any one of the expressions 2 to 4. The learning unit 352-1 supplies the learned base image of the block unit of the type A to the storage unit 353-1.

Similar to the learning unit 352-1, each of the learning units 352-2 and 352-3 models the block supplied from the classifying unit 351 by the expression 1 and learns a base image of a block unit. The learning unit 352-2 supplies the learned base image of the block unit of the type B to the storage unit 353-2 and the learning unit 352-3 supplies the learned base image of the block unit of the type C to the storage unit 353-3.

The storage unit 353-1 stores the base image of the block unit of the type A that is supplied from the learning unit 352-1 and the storage unit 353-2 stores the base image of the block unit of the type B that is supplied from the learning unit 352-2. The storage unit 353-3 stores the base image of the block unit of the type C that is supplied from the learning unit 352-3.

Hereinafter, the learning units 352-1 to 352-3 are collectively referred to as the learning units 352, when it is not necessary to distinguish the learning units 352-1 to 352-3 in particular. Likewise, the storage units 353-1 to 353-3 are collectively referred to as the storage units 353.

[Explanation of Processing of Learning Apparatus]

Figure 36:
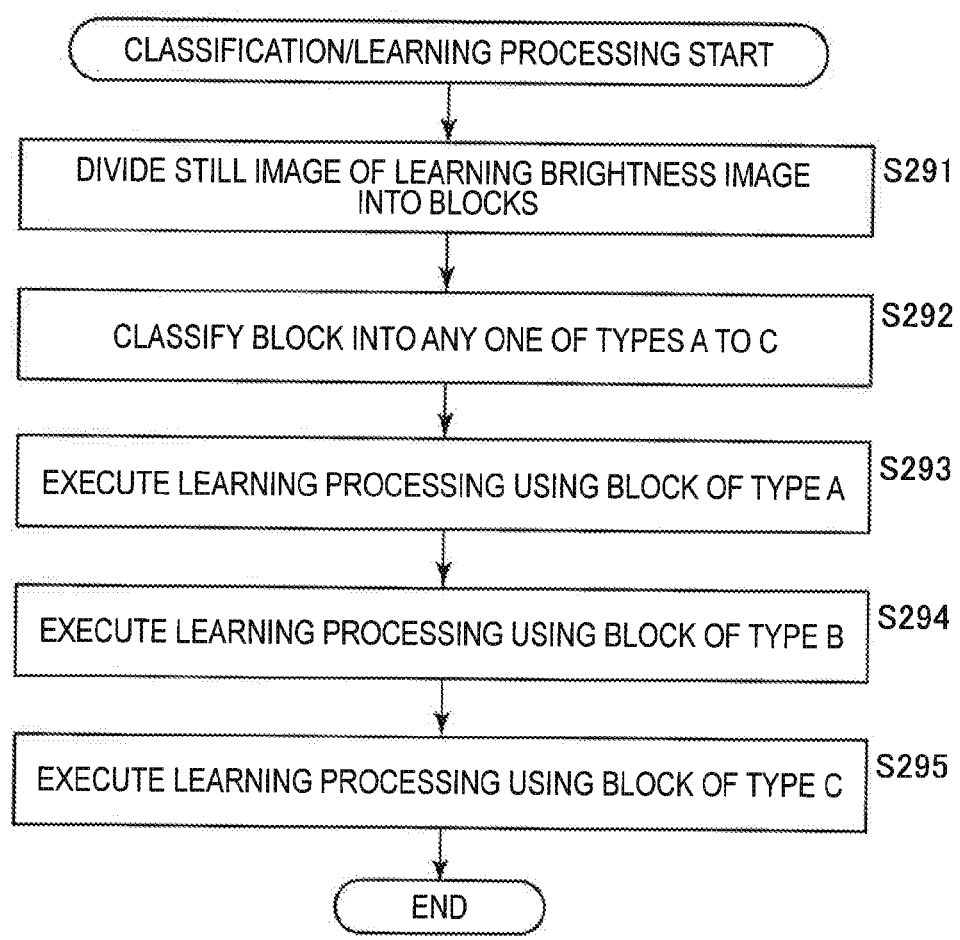
FIG. 36 is a flowchart illustrating classification/learning processing of the learning apparatus of FIG. 35.

FIG. 36 is a flowchart illustrating classification/learning processing of the learning apparatus 350 of FIG. 35. The classification/learning processing is performed off-line when the still images of all the learning brightness images are from the outside to the learning apparatus 350.

In step S291 of FIG. 36, the dividing unit 11 divides the still image of the learning brightness image input from the outside into the blocks having the predetermined sizes and supplies the blocks to the classifying unit 351.

In step S292, the classifying unit 351 classifies the block supplied from the dividing unit 11 into any one of the types A to C, based on the type of the terminal 341 corresponding to the still image of the learning brightness image of the block, which is input from the outside. The classifying unit 351 supplies the block to the learning unit 352 corresponding to the type into which the block is classified.

In step S293, the learning unit 352-1 executes the learning processing of FIG. 7, using the block of the type A supplied from the classifying unit 351 and the cost function defined in the block unit by any one of the expressions 2 to 4.

In step S294, the learning unit 352-2 executes the learning processing of FIG. 7, using the block of the type B supplied from the classifying unit 351 and the cost function defined in the block unit by any one of the expressions 2 to 4.

In step S295, the learning unit 352-3 executes the learning processing of FIG. 7, using the block of the type C supplied from the classifying unit 351 and the cost function defined in the block unit by any one of the expressions 2 to 4. Then, the processing ends.

As described above, the learning apparatus 350 learns the base image, for each feature of the terminals 341 corresponding to the still image of the learning brightness image, such that the still image of the learning brightness image is represented by a linear operation of base images of which base image coefficients become sparse. Therefore, an accurate base image for each feature of the terminals 341 can be learned.

By learning the base image for each feature of the terminals 341, the learning apparatus 350 can decrease a convergence time of the base images, similar to the learning apparatus 10. Because the learning apparatus 350 learns the base image for each feature of the terminals, the learning apparatus 350 can execute the learning processing in parallel, for each feature of the terminals.

[Configuration Example of Image Generating Apparatus]

Figure 37:
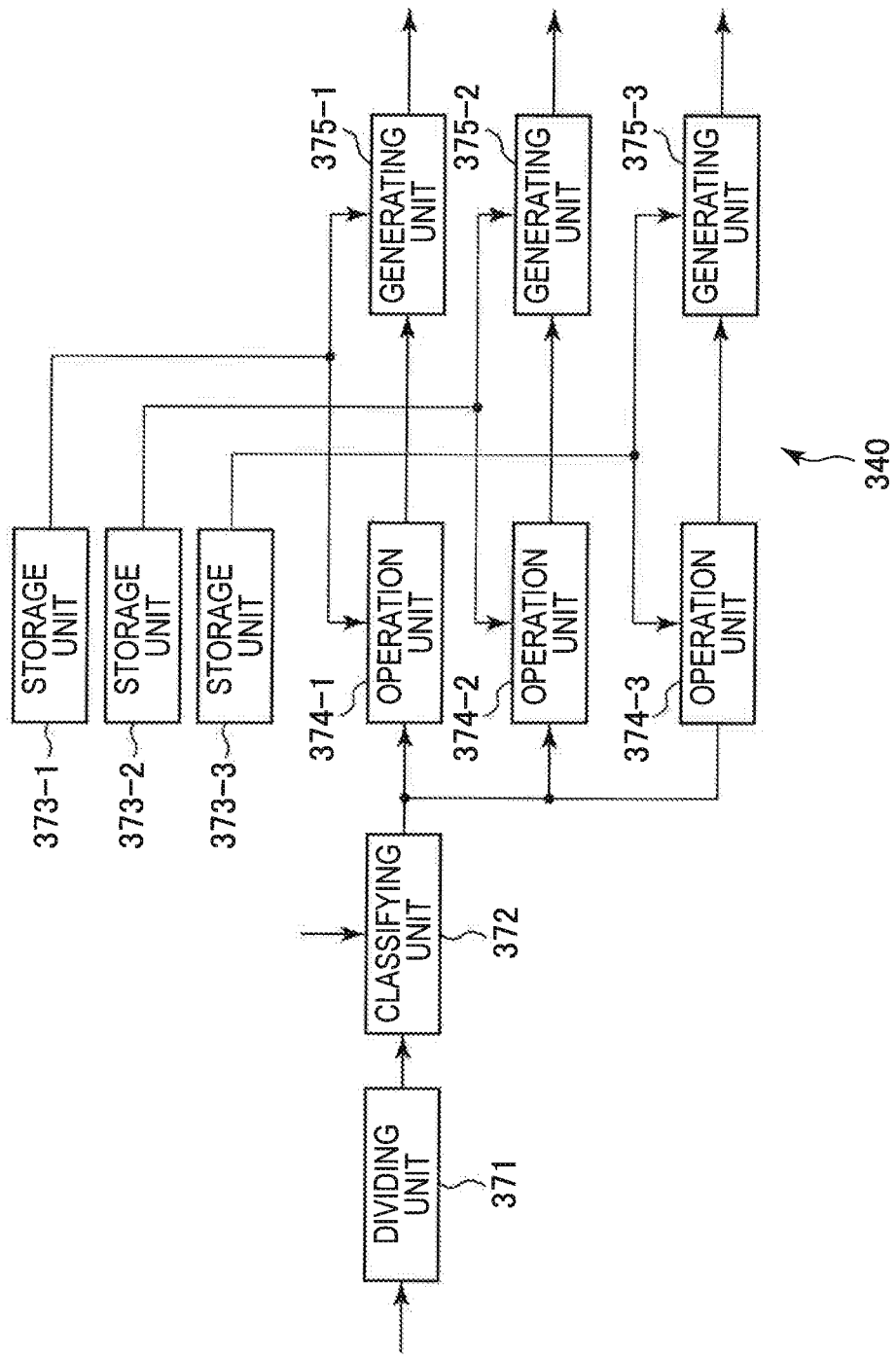
FIG. 37 is a block diagram illustrating a configuration example of an image generating apparatus that corresponds to a sixth embodiment of the output apparatus to which the present disclosure is applied.

FIG. 37 is a block diagram illustrating a configuration example of an image generating apparatus that generates an image using the base images for each feature of the terminals 341 learned by the learning apparatus 350 of FIG. 35 and corresponds to a sixth embodiment of the output apparatus to which the present disclosure is applied.

An image generating apparatus 340 of FIG. 37 includes a dividing unit 371, a classifying unit 372, storage units 373-1 to 373-3, operation units 374-1 to 374-3, and generating units 375-1 to 375-3. The image generating apparatus 340 performs sparse coding according to the feature of the terminal 341, with respect to the still image of the brightness image transmitted as the deteriorated image from the terminal 341, and generates a restored image.

Specifically, the dividing unit 371 of the image generating apparatus 340 receives the still image of the brightness image that is transmitted as the deteriorated image from the terminal 341. The dividing unit 371 divides the still image into blocks having predetermined sizes and supplies the blocks to the classifying unit 82, similar to the dividing unit 11 of FIG. 35.

The classifying unit 372 receives the type of the terminal 341 transmitted from the terminal 341. The classifying unit 372 classifies all the blocks of the deteriorated image supplied from the dividing unit 371 into any one of the types A to C, based on the type of the terminal 341 that has transmitted the deteriorated image. The classifying unit 372 supplies all the blocks to any one of the operation units 374-1 to 374-3 corresponding to the type into which all the blocks are classified.

The storage unit 373-1 stores the base image of the block unit of the type A that is learned by the learning apparatus 350 of FIG. 35 and is stored in the storage unit 353-1. The storage unit 373-2 stores the base image of the block unit of the type B that is stored in the storage unit 353-2 and the storage unit 373-3 stores the base image of the block unit of the type C that is stored in the storage unit 353-3.

The operation units 374-1 to 374-3 correspond to the types A, B, and C. The operation unit 374-1 reads the base image of the block unit of the type A from the storage unit 373-1. The operation unit 374-1 operates abuse image coefficient vector of the block unit, for each block of the deteriorated image of the type A supplied from the classifying unit 372, such that the cost function becomes smaller than the predetermined threshold value. The cost function is defined in the block unit by an expression obtained by setting Y of any one of the expressions 2 to 4 to a deteriorated image vector, using the base image matrix of the block unit including the read base image of the block unit. The operation unit 374-1 supplies the base image coefficient vector of the block unit to the generating unit 375-1.

Similar to the operation unit 374-1, the operation units 374-2 and 374-3 read the base images of the block units from the storage units 373-2 and 373-3, respectively, and operate the base image coefficient vectors of the block units, for each block supplied from the classifying unit 372. The operation unit 374-2 supplies the operated base image coefficient vector of the block unit to the generating unit 375-2 and the operation unit 374-3 supplies the operated base image coefficient vector of the block unit to the generating unit 375-3.

The generating unit 375-1 reads the base image of the block unit of the type A from the storage unit 373-1. The generating unit 375-1 generates the still image of the brightness image of the block unit by the expression 7, for each block, using the base image coefficient vector of the block unit supplied from the operation unit 374-1 and the base image matrix of the block unit including the read base image of the block unit of the type A. The generating unit 375-1 generates a still image of one brightness image from the generated still image of the brightness image of the block unit and outputs the still image as a restored image.

Similar to the generating unit 375-1, the generating units 375-2 and 375-3 read the base images of the block units from the storage units 373-2 and 373-3 and generate the still images of the brightness images of the block units. Each of the generating units 375-2 and 375-3 generates a still image of one brightness image from the generated still image of the brightness image of the block unit and outputs the still image as a restored image.

Hereinafter, the storage units 373-1 to 373-3 are collectively referred to as the storage units 373, when it is not necessary to distinguish the storage units 373-1 to 373-3 in particular. Likewise, the operation units 374-1 to 374-3 are collectively referred to as the operation units 374 and the generating units 375-1 to 375-3 are collectively referred to as the generating units 375.

[Explanation of Processing of Image Generating Apparatus]

Figure 38:
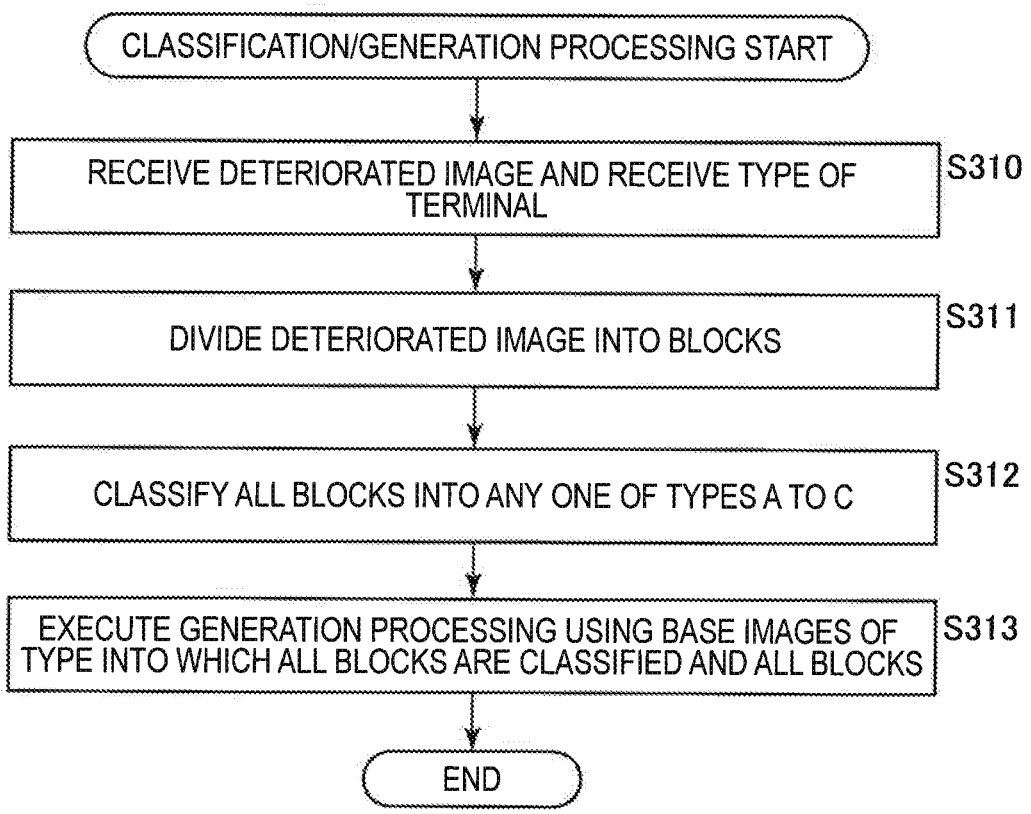
FIG. 38 is a flowchart illustrating classification/generation processing of the image generating apparatus of FIG. 37.

FIG. 38 is a flowchart illustrating classification/generation processing of the image generating apparatus 340 of FIG. 37. The classification/generation processing starts when the still image of the brightness image corresponding to the deteriorated image and the type of the terminal 341 are transmitted from the terminal 341.

In step S310 of FIG. 38, the dividing unit 371 of the image generating apparatus 340 receives the still image of the brightness image transmitted as the deteriorated image from the terminal 341 and the classifying unit 372 receives the type of the terminal 341 transmitted from the terminal 341. In step S311, the dividing unit 371 divides the received deteriorated image into blocks having predetermined sizes and supplies the blocks to the classifying unit 372, similar to the dividing unit 11 of FIG. 35.

In step S312, the classifying unit 372 classifies all the blocks of the deteriorated image supplied from the dividing unit 371 into any one of the types A to C, based on the type of the terminal 341 received by step S310. The classifying unit 372 supplies all the blocks to the operation unit 374 corresponding to the type into which all the blocks are classified.

In step S313, the image generating apparatus 340 executes the generation processing of FIG. 11 using the base images of the type into which all the blocks are classified and all the blocks and ends the processing.

As described above, the image generating apparatus 340 obtains the base image learned by the learning apparatus 350 for each feature of the terminals 341 and operates the base image coefficient, based on the deteriorated image and the base image of the feature of the terminal 341 of the transmission origin of the deteriorated image. Therefore, the image generating apparatus 340 can generate a high-definition restored image having a restoration effect suitable for the feature of the terminal 341 of the transmission origin, using the base image and the base image coefficient according to the feature of the terminal 341 of the transmission origin of the deteriorated image.

By operating the base image coefficient for each feature of the terminals 341, the image generating apparatus 340 can decrease the convergence time of the base image coefficients, similar to the image generating apparatus 80.

In the sixth embodiment, the learning image and the deteriorated image are the still images of the brightness images, similar to the first embodiment. However, the learning image and the deteriorated image may be still images of color images. The learning image and the deteriorated image may be moving images. In the sixth embodiment, the base image can be learned while the restored image is generated, similar to the first embodiment.

[Configuration Example of Learning Apparatus]

Figure 39:
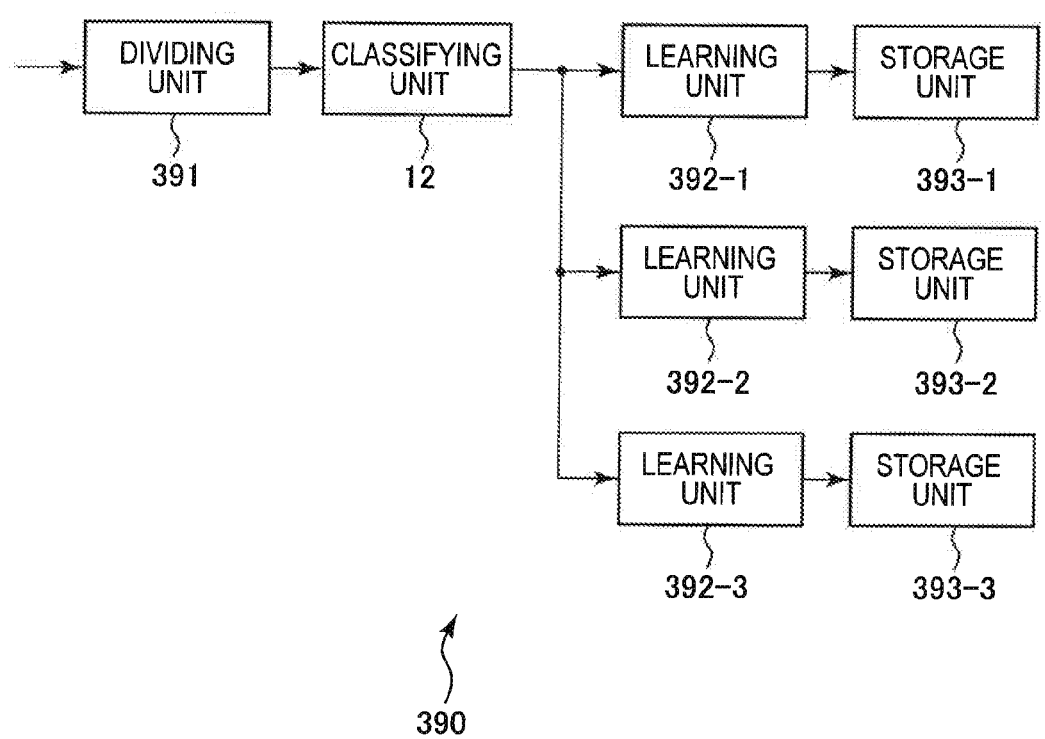
FIG. 39 is a block diagram illustrating a configuration example of a learning apparatus that corresponds to a seventh embodiment of the signal processing apparatus to which the present disclosure is applied.

FIG. 39 is a block diagram illustrating a configuration example of a learning apparatus that corresponds to a seventh of the signal processing apparatus to which the present disclosure is applied.

Among structural elements illustrated in FIG. 39, the structural elements that are the same as the structural elements of FIG. 2 are denoted with the same reference numerals. Repeated explanation of these structural elements is omitted.

A configuration of a learning apparatus 390 of FIG. 39 is different from the configuration of FIG. 2 in that a dividing unit 391, learning units 392-1 to 392-3, and storage units 393-1 to 393-3 are provided, instead of the dividing unit 11, the learning units 13-1 to 13-3, and the storage units 14-1 to 14-3. The learning apparatus 390 learns a base audio signal of sparse coding for audio restoration.

Specifically, a large amount of learning audio signals that do not have large sound quality deterioration are input from the outside to the dividing unit 391 or the learning apparatus 390. The dividing unit 391 divides the learning audio signal into blocks (frames) of predetermined sections and supplies the blocks to the classifying unit 12.

The learning unit 392-1 models a block of a high frequency band supplied from the classifying unit 12 by an expression obtained by setting an image of the expression 1 to an audio signal and learns a base audio signal of a block unit of the high frequency band. Specifically, the learning unit 392-1 earns the base audio signal of the block unit of the high frequency band, using the block of the high frequency band and a cost function defined in the block unit by an expression obtained by setting an image of any one of the expressions 2 to 4 to the audio signal. The learning unit 392-1 supplies the learned base audio signal of the block unit of the high frequency band to the storage unit 393-1.

Similar to the learning unit 392-1, each of the learning units 392-2 and 392-3 models a block supplied from the classifying unit 12 by the expression obtained by setting the image of the expression 1 to the audio signal and learns the base audio signal of the block unit. The learning unit 392-2 supplies a learned base audio signal of a block unit of an intermediate frequency band to the storage unit 393-2 and the learning unit 392-3 supplies a learned base audio signal of a block unit of a low frequency band to the storage unit 393-3.

The storage unit 393-1 stores the base audio signal of the block unit of the high frequency band supplied from the learning unit 392-1 and the storage unit 393-2 stores the base audio signal of the block unit of the intermediate frequency band supplied from the learning unit 392-2. The storage unit 393-3 stores the base audio signal of the block unit of the low frequency band supplied from the learning unit 392-3.

[Explanation of Processing of Learning Apparatus]

Learning processing of the learning apparatus 390 is the same as the classification/learning processing of FIG. 6, except that a learning signal is an audio signal, not a still image of a brightness image, the learning signal is divided into blocks of predetermined section units, and a cost function is calculated by the expression obtained by setting the image of any one of the expressions 2 to 4 to the audio signal. Therefore, illustration and explanation of the learning processing are omitted.

As described above, the learning apparatus 390 learns a base audio signal, for each feature of the bands of the learning audio signal, such that the learning audio signal is represented by a linear operation of base audio signals of which base audio coefficients become sparse. Therefore, an accurate base audio signal for each feature of the bands can be learned.

By learning the base audio signal for each feature of the bands, the learning apparatus 390 can decrease the convergence time of the base audio signals, similar to the learning apparatus 10. Because the learning apparatus 390 learns the base audio signal for each feature of the bands, the learning apparatus 390 can execute the learning processing in parallel, for each feature of the bands.

[Configuration Example of Audio Generating Apparatus]

Figure 40:
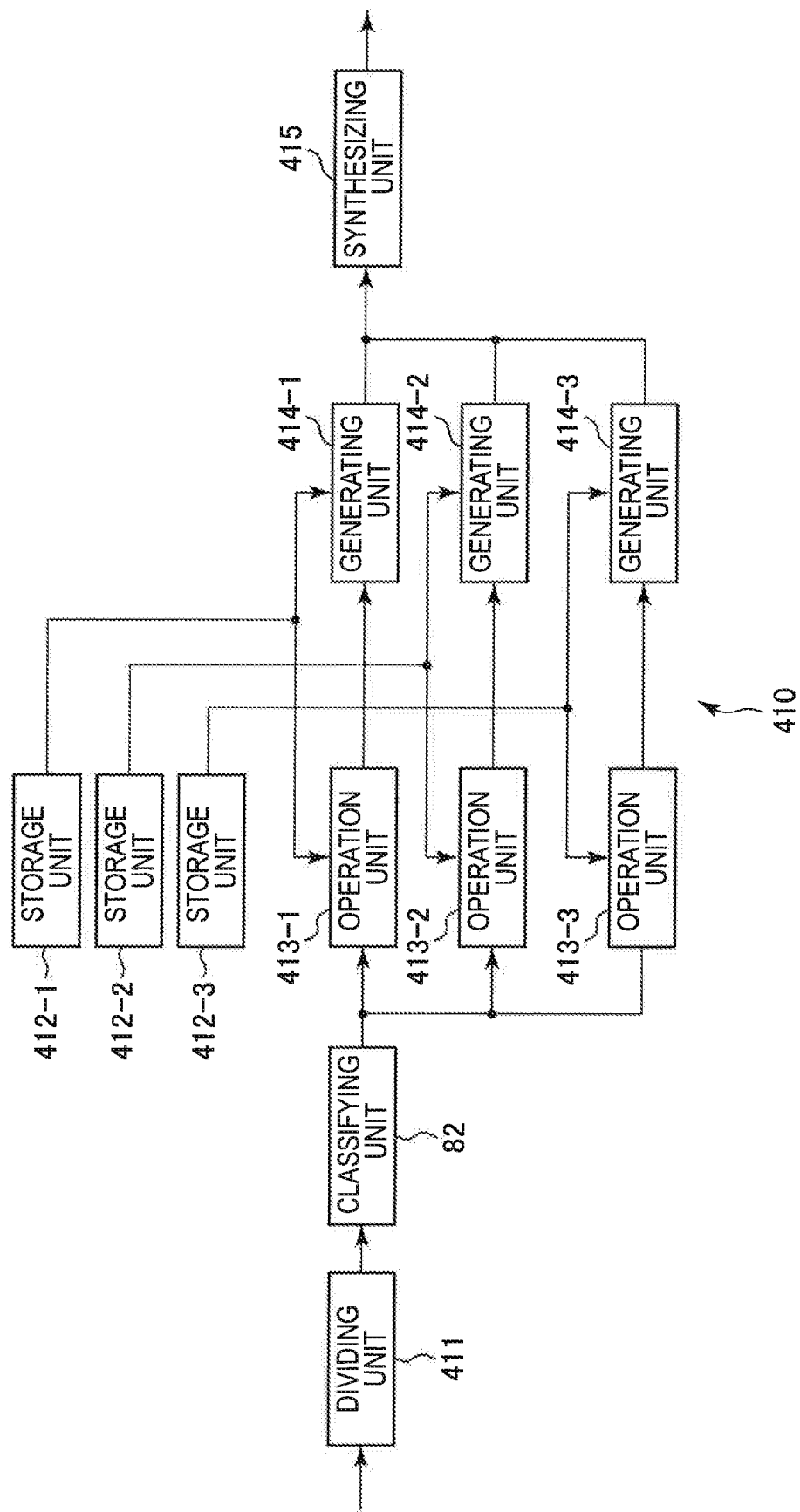
FIG. 40 is a block diagram illustrating a configuration example of an audio generating apparatus that corresponds to a seventh embodiment of the output apparatus to which the present disclosure is applied.

FIG. 40 is a block diagram illustrating a configuration example of an audio generating apparatus that generates an audio signal using the base audio signal for each feature of the bands learned by the learning apparatus 390 of FIG. 39 and corresponds to a seventh embodiment of the output apparatus to which the present disclosure is applied.

Among structural elements illustrated in FIG. 40, the structural elements that are the same as the structural elements of FIG. 8 are denoted with the same reference numerals. Repeated explanation of these structural elements is omitted.

A configuration of an audio generating apparatus 410 of FIG. 40 is different from the configuration of FIG. 8 in that a dividing unit 411, storage units 412-1 to 412-3, operation units 413-1 to 413-3, generating units 414-1 to 414-3, and a synthesizing unit 415 are provided, instead of the dividing unit 81, the storage units 83-1 to 83-3, the operation units 84-1 to 84-3, the generating units 85-1 to 85-3, and the synthesizing unit 86. The audio generating apparatus 410 performs sparse coding for each band, with respect to a sound quality deteriorated deterioration audio signal input from the outside, and generates a restoration audio signal.

Specifically, the deterioration audio signal is input from the outside to the dividing unit 411 of the audio generating apparatus 410. The dividing unit 411 divides the deterioration audio signal input from the outside into blocks of predetermined sections and supplies the blocks to the classifying unit 82, similar to the dividing unit 391 of FIG. 39.

The storage unit 412-1 stores the base audio signal of the block unit of the high frequency band that is learned by the learning apparatus 390 of FIG. 39 and is stored in the storage unit 393-1. The storage unit 412-2 stores the base audio signal of the block unit of the intermediate frequency band that is stored in the storage unit 393-2 and the storage unit 412-3 stores the base audio signal of the block unit of the low frequency band that is stored in the storage unit 393-3.

The operation unit 413-1 reads the base audio signal of the block unit of the high frequency band from the storage unit 412-1. The operation unit 413-1 operates the base audio coefficient vector of the block unit, for each bock of the high frequency band of the deterioration audio signal supplied from the classifying unit 82, such that the cost function becomes smaller than the predetermined threshold value. The cost function is defined in the block unit by an expression obtained by setting Y of any one of the expressions 2 to 4 to a vector in which individual sampling values of the deterioration audio signal are arranged in a column direction, using the base audio signal matrix of the block unit including the read base audio signal of the block unit. The operation unit 413-1 supplies the operated base audio coefficient vector of the block unit to the generating unit 414-1.

Similar to the operation unit 413-1, the operation units 413-2 and 413-3 read the base audio signals of the block units from the storage units 412-2 and 412-3, respectively. Similar to the operation unit 413-1, each of the operation units 413-2 and 413-3 operates the base audio coefficient vector of the block unit for each block supplied from the classifying unit 82.

The operation unit 413-2 supplies the operated base audio coefficient vector of the block unit to the generating unit 414-2 and the operation unit 413-3 supplies the operated base audio coefficient vector of the block unit to the generating unit 414-3.

The generating unit 414-1 reads the base audio signal of the block unit of the high frequency band from the storage unit 412-1. The generating unit 414-1 generates the audio signal of the block unit by an expression obtained by setting the image of the expression 7 to the audio signal, for each block, using the base audio coefficient vector of the block unit supplied from the operation unit 413-1 and the base audio signal matrix of the block unit including the base audio signal of the block unit of the high frequency band.

The generating unit 414-1 generates an audio signal of all sections from the generated audio signal of the block unit and supplies the audio signal as a restoration audio signal of the high frequency band to the synthesizing unit 415. Similar to the generating unit 414-1, the generating units 414-2 and 414-3 read the base audio signals of the block units from the storage units 412-2 and 412-3, respectively, and generate the audio signals of the block units.

The generating unit 414-2 generates a restoration audio signal of the intermediate frequency band from the generated audio signal of the block unit and supplies the restoration audio signal to the synthesizing unit 415. The generating unit 414-3 generates a restoration audio signal of the low frequency band from the generated audio signal of the block unit and supplies the restoration audio signal to the synthesizing unit 415.

The synthesizing unit 415 synthesizes the restoration audio signals of the high frequency band, the intermediate frequency band, and the low frequency band supplied from the generating units 414-1 to 414-3, respectively, and outputs a restoration audio signal of all the bands obtained as a synthesis result.

[Explanation of Processing of Audio Generating Apparatus]

The classification/generation processing of the audio generating apparatus 410 is the same as the classification/generation processing of FIG. 10, except that the sparse coding object signal is the deterioration audio signal, not the deteriorated Image, the sparse coding object signal is divided into blocks of predetermined section units, the cost function is calculated by the expression obtained by setting the image of any one of the expressions 2 to 4 to the audio signal, and the audio signal of the block unit is calculated by the expression obtained by setting the image of the expression 7 to the audio signal. Therefore, illustration and explanation of the classification/generation processing are omitted.

As described above, the audio generating apparatus 410 obtains the base audio signal learned by the learning apparatus 390 for each feature of the bands and operates the base audio coefficient for each feature of the bands, based on the base audio signal for each feature of the bands and the deterioration audio signal. Therefore, the audio generating apparatus 410 can generate a high-definition restoration audio signal having a restoration effect suitable for each feature of the bands, using the base audio signal and the base audio coefficient for each feature of the bands.

By operating the base audio coefficient for each feature of the bands, the audio generating apparatus 410 can decrease the convergence time of the base audio coefficients, similar to the image generating apparatus 80. Because the audio generating apparatus 410 generates a restoration audio signal for each feature of the bands, using the base audio signal and the base audio coefficient for each feature of the bands, the audio generating apparatus 410 can execute the generation processing in parallel, for each feature of the bands.

Among structural elements illustrated in FIG. 40, the structural elements that are the same as the structural elements of FIG. 8 are denoted with the same reference numerals. Repeated explanation of these structural elements is omitted.

Figure 41:
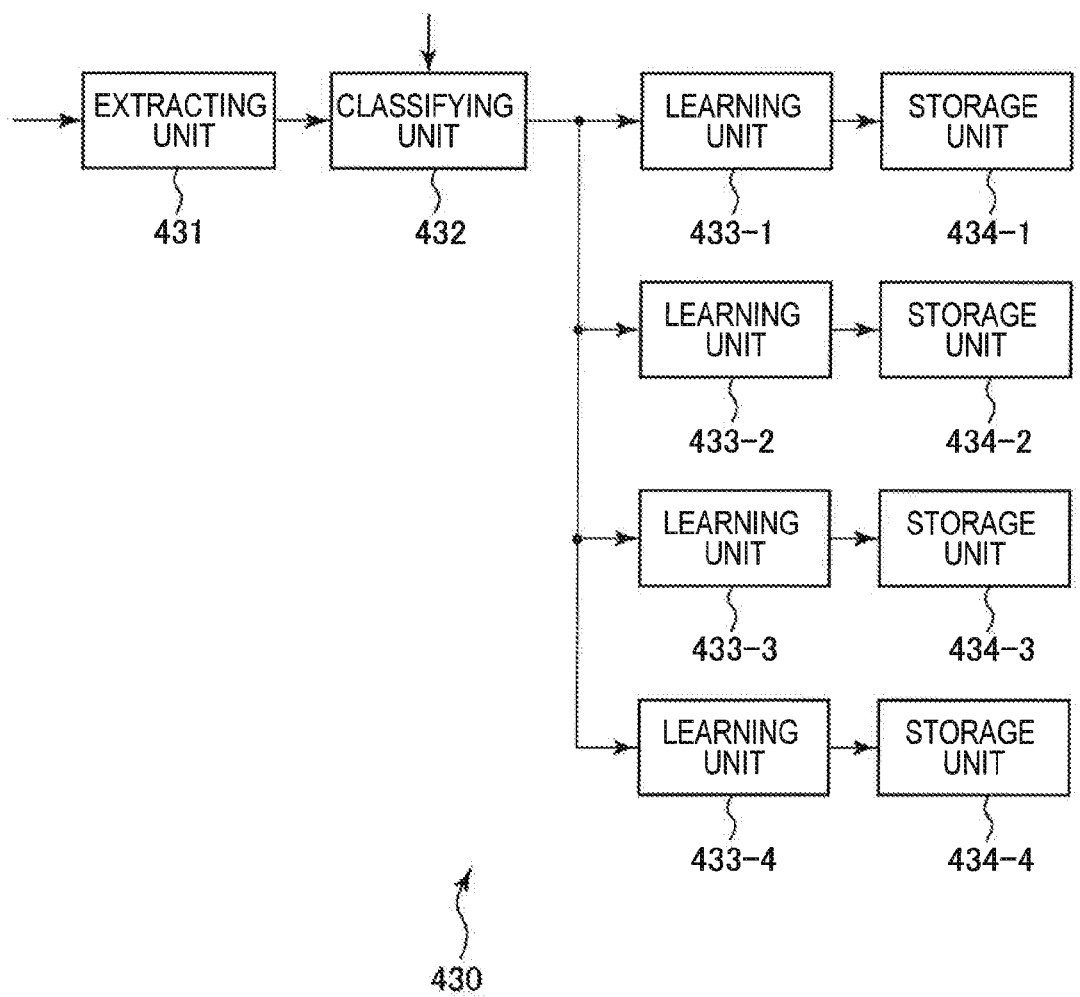
FIG. 41 is a block diagram illustrating a configuration example of a learning apparatus that corresponds to an eighth embodiment of the signal processing apparatus to which the present disclosure is applied.

A learning apparatus 430 of FIG. 41 includes an extracting unit 431, a classifying unit 432, learning units 433-1 to 433-3, and storage units 434-1 to 434-3. Moving images of a large amount of normal brightness images imaged by a monitoring camera not illustrated in the drawings are input as moving images of learning brightness images to the learning apparatus 430 and information of a photographing environment (monitoring environment) is input.

The extracting unit 431 of the learning apparatus 430 extracts an abnormality detection object region (hereinafter, referred to as a detection region) by an abnormality detecting apparatus to be described below, from each frame of the moving images of the large amount of normal brightness images input by the monitoring camera by the moving images of the learning brightness images.

For example, when the abnormality detecting apparatus to be described below detects abnormality of a person, the extracting unit 431 detects a region of the person or a face and extracts the region as the detection region. When the abnormality detecting apparatus to be described below detects abnormality of a vehicle, the extracting unit 431 detects a region including a previously set feature point of the vehicle and extracts the region as the detection region. The extracting unit 431 extracts the detection region for every frames of a predetermined number, not every frame. During a period in which the detection region is not extracted, the extracting unit 431 may track the extracted detection region and set the detection region.

The extracting unit 431 normalizes the extracted detection region, forms blocks having predetermined sizes, and supplies the blocks to the classifying unit 432.

The number of detection regions may be singular or plural for each frame. When the number of detection regions of each frame is plural, the base image is learned for each detection region. The classifying unit 432 classifies the block supplied from the extracting unit 431 into any one of features of a plurality of photographing environments, based on the photographing environment of the moving image of the learning brightness image of the block input from the monitoring camera not illustrated in the drawings. In this case, the photographing environments are time zones at the time of photographing and kinds of the features of the photographing environments are four kinds of an early morning, a morning, an afternoon, and midnight.

The kinds of the features of the time zones at the time of photographing are not limited to the above examples. For example, the kinds of the features of the time zones at the time of photographing may be morning rush hours (from 7:00 to 9:30), evening rush hours (from 17:00 to 19:00), and the other time. The photographing environments are not limited to the time zones at the time of photographing. For example, the photographing environments may be weather (rainy, cloudy, and fine), when photographing is performed outdoors.

The classifying unit 432 supplies the block to any one of the learning units 433-1 to 433-4 corresponding to the feature of the photographing environment into which the block is classified.

The learning units 433-1 to 433-4 correspond to the early morning, the morning, the afternoon, and the midnight. The learning unit 433-1 models the block of the early morning supplied from the classifying unit 432 by the expression 1 and learns the base image of the block unit of the early morning. Specifically, the learning unit 433-1 learns the base image of the block unit of the early morning, using the block of the early morning and the cost function defined in the block unit by any one of the expressions 2 to 4. The learning unit 433-1 supplies the learned base image of the block unit of the early morning to the storage unit 434-1.

Similar to the learning unit 433-1, each of the learning units 433-2 to 433-4 models the block supplied from the classifying unit 432 by the expression 1 and learns the base image of the block unit. The learning unit 433-2 supplies the learned base image of the block unit of the morning to the storage unit 434-2 and the learning unit 433-3 supplies the learned base image of the block unit of the afternoon to the storage unit 434-3. The learning unit 433-4 supplies the learned base image of the block unit of the midnight to the storage unit 434-4.

The storage unit 434-1 stores the base image of the block unit of the early morning that is supplied from the learning unit 433-1 and the storage unit 434-2 stores the base image of the block unit of the morning that is supplied from the learning unit 433-2. The storage unit 434-3 stores the base image of the block unit of the afternoon that is supplied from the learning unit 433-3 and the storage unit 434-4 stores the base image of the block unit of the midnight that is supplied from the learning unit 433-4.

[Explanation of Processing of Learning Apparatus]

Figure 42:
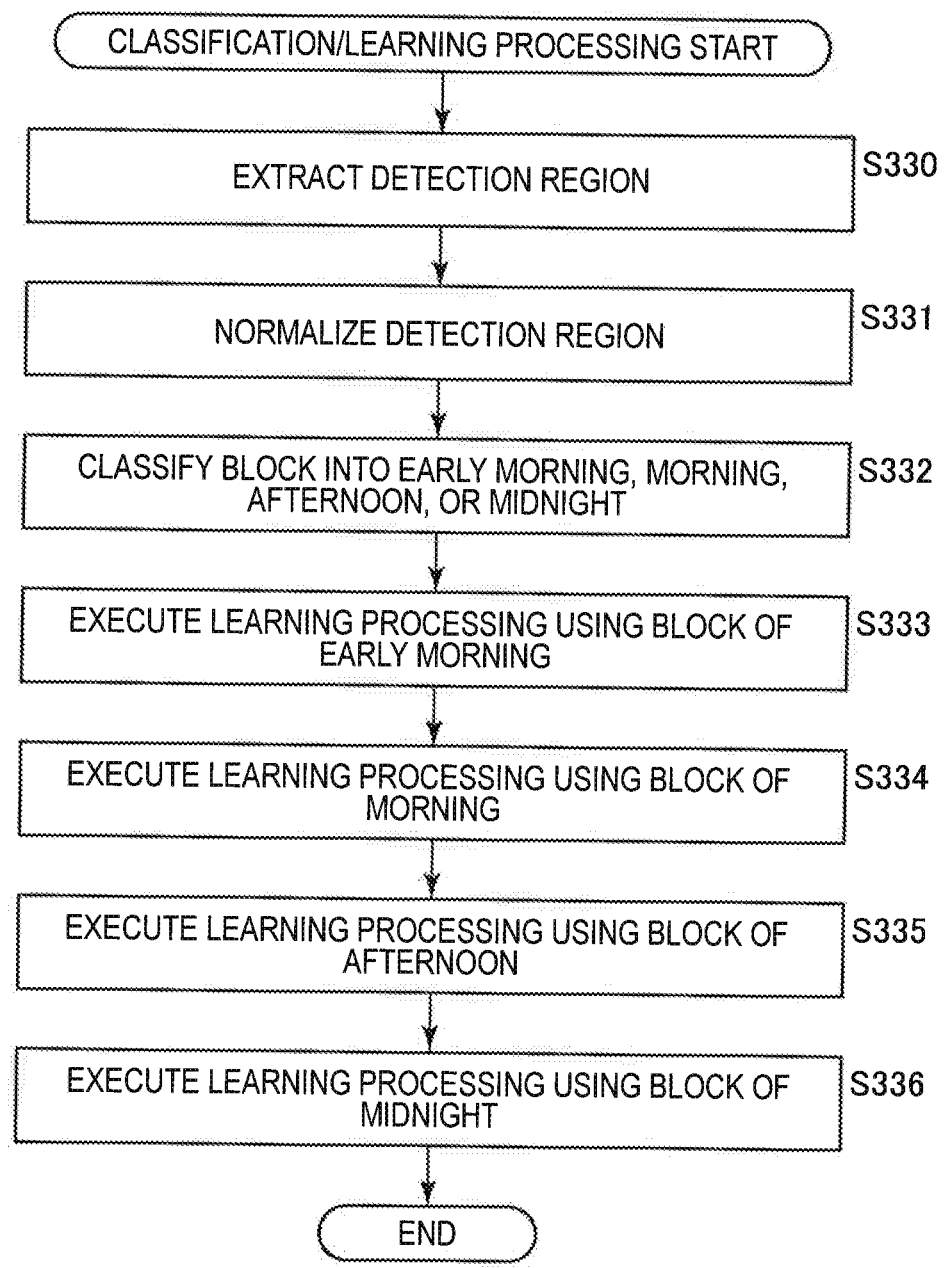
FIG. 42 is a flowchart illustrating classification/learning processing of the learning apparatus of FIG. 41.

FIG. 42 is a flowchart illustrating classification/learning processing of the learning apparatus 430 of FIG. 41. The classification/learning processing is executed off-line when the moving images of the normal brightness images are input as the moving images of all the learning brightness images from the monitoring camera not illustrated in the drawings to the learning apparatus 430.

in step S330, the extracting unit 431 of the learning apparatus 430 extracts a detection region from each frame of the moving images of all the learning brightness images input from the monitoring camera not illustrated in the drawings. In step S331, the extracting unit 431 normalizes the extracted detection region, forms blocks having predetermined sizes, and supplies the blocks to the classifying unit 432.

In step S332, the classifying unit 432 classifies the block supplied from the extracting unit 431 into the early morning, the morning, the afternoon, or the midnight corresponding to the feature of the photographing environment, based on the photographing environment of the moving image of the learning brightness image of the block that is input from the outside. The classifying unit 432 supplies the block to the learning unit 433 corresponding to the feature of the photographing environment into which the block is classified.

In step S333, the learning unit 433-1 executes the learning processing of FIG. 7, using the block of the early morning supplied from the classifying unit 432 and the cost function defined in the block unit by any one of the expressions 2 to 4.

In step S334, the learning unit 433-2 executes the learning processing of FIG. 7, using the block of the morning supplied from the classifying unit 432 and the cost function defined in the block unit by any one of the expressions 2 to 4.

In step S335, the learning unit 433-3 executes the learning processing, using the block of the afternoon supplied from the classifying unit 432 and the cost function defined in the block unit by any one of the expressions 2 to 4.

In step S336, the learning unit 433-4 executes the learning processing of FIG. 7, using the block of the midnight supplied from the classifying unit 432 and the cost function defined in the block unit by any one of the expressions 2 to 4.

As described above, the learning apparatus 430 learns a base image, for each feature of the photographing environment of the moving image of the learning brightness image, such that the moving image of the learning brightness image is represented by a linear operation of base images of which base image coefficients become sparse. Therefore, an accurate base image for each feature of the photographing environments can be learned.

By learning the base image for each feature of the photographing environments, the learning apparatus 430 can decrease a convergence time of the base images, similar the learning apparatus 10. Because the learning apparatus 430 learns the base image for each feature of the photographing environments, the learning apparatus 430 can execute the learning processing in parallel, for each feature of the photographing environments.

[Configuration Example of Abnormality Detecting Apparatus]

Figure 43:
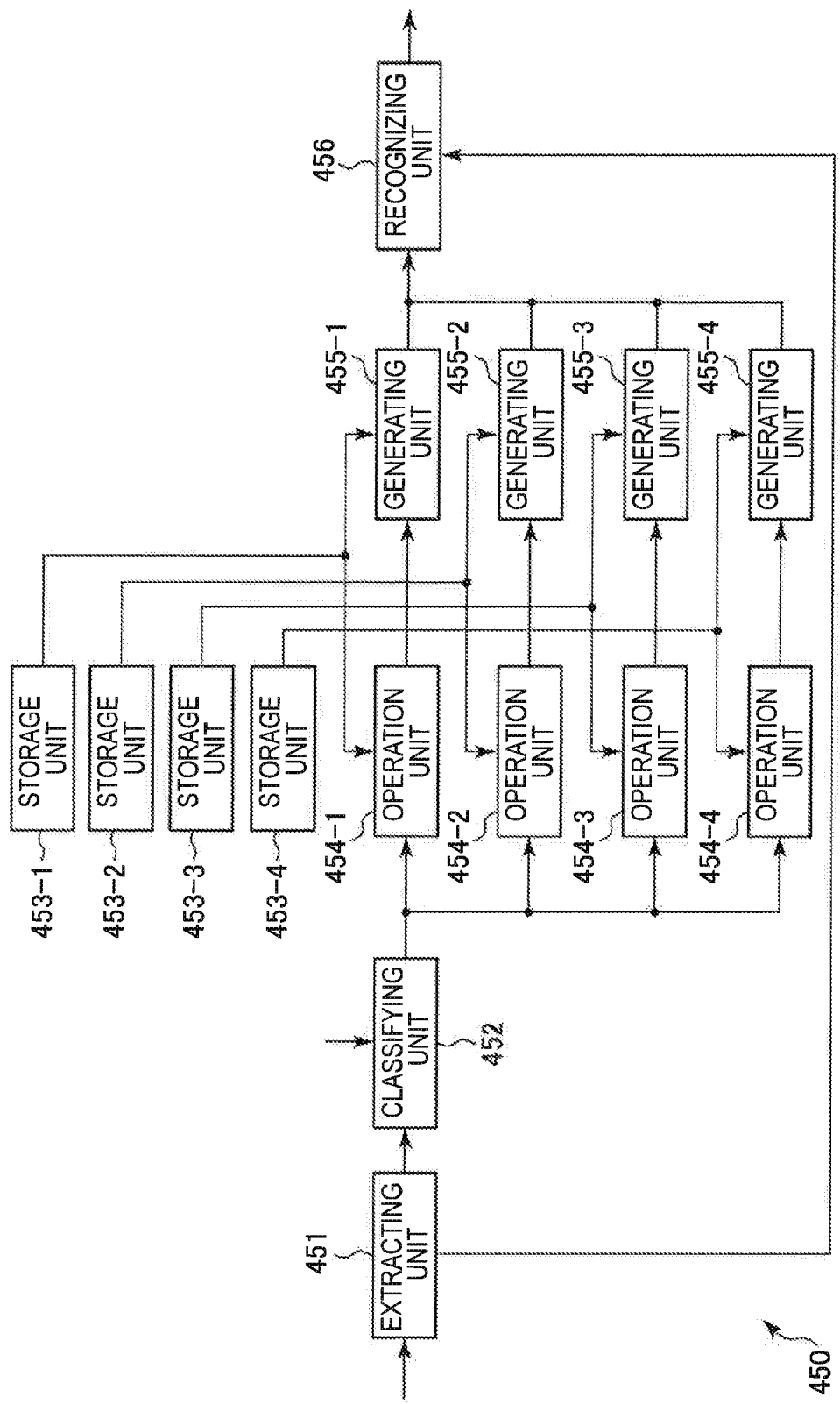
FIG. 43 is a block diagram illustrating a configuration example of an abnormality detecting apparatus that corresponds to an eighth embodiment of the output apparatus to which the present disclosure is applied.

FIG. 43 is a block diagram illustrating a configuration example of an abnormality detecting apparatus that detects abnormality using the base image for each feature of the photographing environments learned by the learning apparatus 430 of FIG. 41 and corresponds to an eighth embodiment of the output apparatus to which the present disclosure is applied.

An abnormality detecting apparatus 450 of FIG. 43 includes an extracting unit 451, a classifying unit 452, storage units 453-1 to 453-4, operation units 454-1 to 454-4, generating units 455-1 to 455-4, and a recognizing unit 456. The abnormality detecting apparatus 450 performs sparse coding for each feature of the photographing environments, with respect to a moving image of a brightness image input as an image of an abnormality detection object from a monitoring camera not illustrated in the drawings, and detects abnormality.

Specifically, the moving image of the brightness image is input as the image of the abnormality detection object from the monitoring camera not illustrated in the drawings to the extracting unit 451 of the abnormality detecting apparatus 450. The extracting unit 451 extracts a detection region from each frame of the image of the abnormality detection object input from the monitoring camera not illustrated in the drawings, similar to the extracting unit 431 of FIG. 41.

The extracting unit 451 normalizes the extracted detection region, forms blocks having predetermined sizes, and supplies the blocks to the classifying unit 452 and the recognizing unit 456, similar to the extracting unit 431.

The time zone at the time of photographing that corresponds to the photographing environment of the image of the abnormality detection object is input from the monitoring camera not illustrated in the drawings to the classifying unit 452. The classifying unit 452 classifies the block supplied from the extracting unit 451 into the early morning, the morning, the afternoon, or the midnight corresponding to the feature of the photographing environment, based on the time zone of the image of the abnormality detection object of the block at the time of photographing. The classifying unit 452 supplies the block to any one of the operation units 454-1 to 454-4 corresponding to the feature of the photographing environment into which the block is classified.

The storage unit 453-1 stores the base image of the block unit of the early morning that is learned by the learning apparatus 430 of FIG. 41 and is stored in the storage unit 434-1. The storage unit 453-2 stores the base image of the block unit of the morning that is stored in the storage unit 434-2 and the storage unit 453-3 stores the base image of the block unit of the afternoon that is stored in the storage unit 434-3. The storage unit 453-4 stores the base image of the block unit of the midnight that is stored in the storage unit 434-4.

The operation unit 454-1 reads the base image of the block unit of the early morning from the storage unit 453-1. The operation unit 454-1 operates the base image coefficient vector of the block unit, for each bock of the early morning supplied from the classifying unit 452, such that the cost function becomes smaller than the predetermined threshold value. The cost function is defined in the block unit by an expression obtained by setting Y of any one of the expressions 2 to 4 to a vector (hereinafter, referred to as a detection image vector) in which pixel values of individual pixels of the image of the abnormality detection object are arranged in a column direction, using the base in matrix of the block unit including the read base image of the block unit. The operation unit 454-1 supplies the operated base image coefficient vector of the block unit to the generating unit 455-1.

Similar to the operation unit 454-1, the operation units 454-2 to 454-4 read the base images of the block units from the storage units 453-2 to 453-4, respectively, and operate the base image coefficient vectors of the block units, for each block supplied from the classifying unit 191. The operation units 454-2 to 454-4 supply the operated base image coefficient vectors of the block units to the generating units 455-2 to 455-4, respectively.

The generating unit 455-1 reads the base mage of the block unit of the early morning from the storage unit 453-1. The generating unit 455-1 generates the moving image of the brightness image of the block unit by the expression 7, for each block, using the base image coefficient vector of the block unit supplied from the operation unit 454-1 and the base image matrix of the block unit including the read base image of the block unit of the early morning. The generating unit 455-1 supplies the moving image of the brightness image of the block unit to the recognizing unit 456.

Similar to the generating unit 455-1, the generating units 455-2 to 455-4 read the base images of the block units from the storage units 453-2 to 453-4, respectively, and generate the moving images of the brightness images of the block units. The generating units 455-2 to 455-4 supply the generated moving images of the brightness images of the block units to the recognizing unit 456.

Hereinafter, the storage units 453-1 to 453-4 are collectively referred to as the storage units 453, when it is not necessary to distinguish the storage units 453-1 to 453-4 in particular. Likewise, the operation units 454-1 to 454-4 are collectively referred to as the operation units 454 and the generating units 455-1 to 455-4 are collectively referred to as the generating units 455.

The recognizing unit 456 calculates a difference of the moving image of the brightness image of the block unit supplied from the generating unit 455 and the block supplied from the extracting unit 451, for each block of each frame. The recognizing unit 456 detects (recognizes) abnormality of the block based on the difference, generates abnormality information showing whether there is abnormality, and outputs the abnormality information.

[Example of Detection Region]

Figure 44:
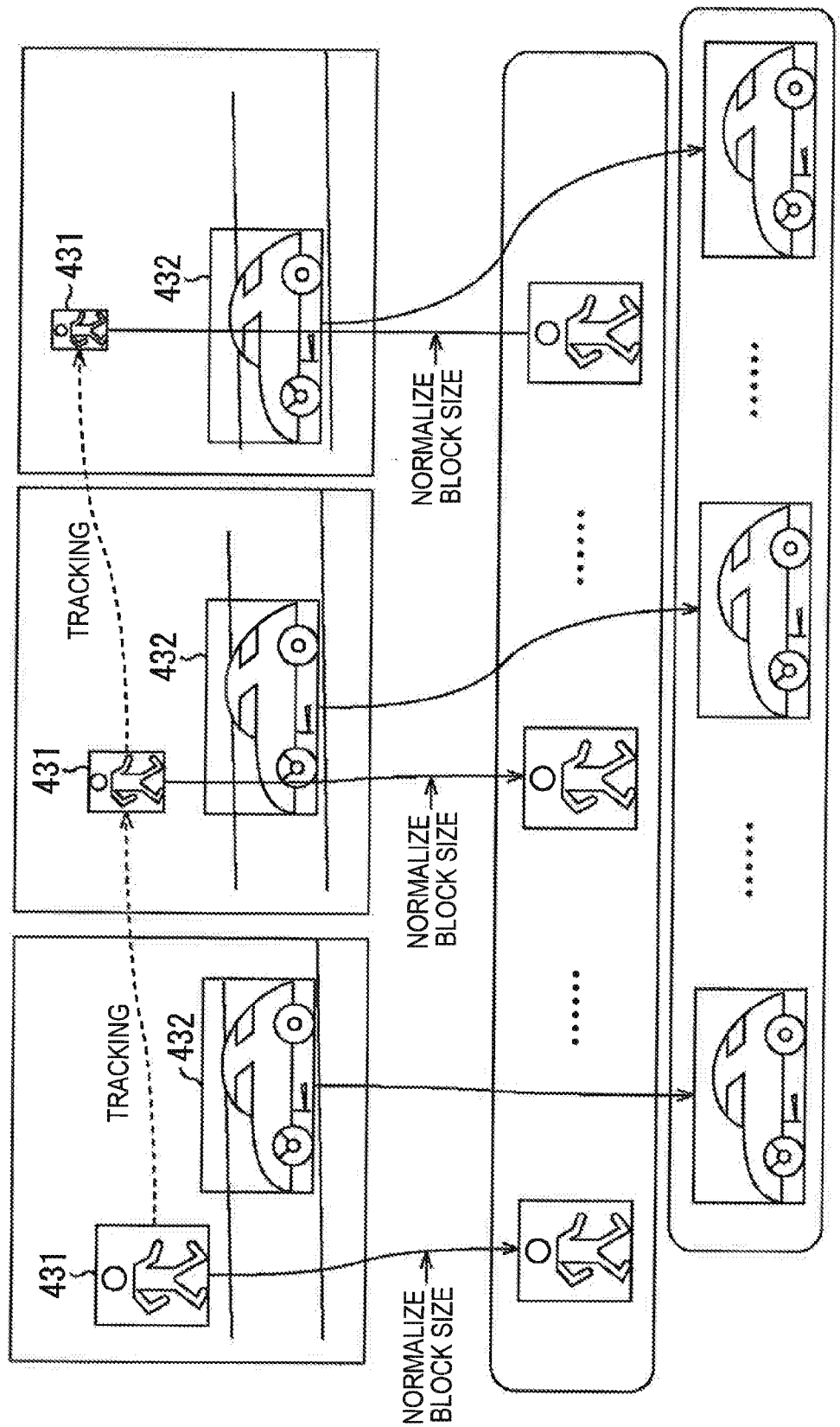
FIG. 44 is a diagram illustrating an example of a detection region that is extracted by an extracting unit of FIG. 43.

FIG. 44 is a diagram illustrating an example of a detection region that is extracted by the extracting unit 451 of FIG. 43.

In the example of FIG. 44, the extracting unit 451 extracts a region of a person as a detection region 471 and extracts a region of a vehicle as a detection region 472, from each frame of an image of an abnormality detection object. As illustrated in FIG. 44, because sizes of the detection regions 471 and 472 of each frame of the image of the abnormality detection object may be different from each other, the detection regions are normalized by blocks having predetermined sizes.

The number of detection regions of each frame that is extracted by the extracting unit 451 may be plural as illustrated in FIG. 44 or may be singular. When the number of detection regions of each frame is plural, a block unit base image coefficient vector is operated for each detection region and abnormality information is generated.

[Explanation of Method of Generating Abnormality Information]

Figure 45:
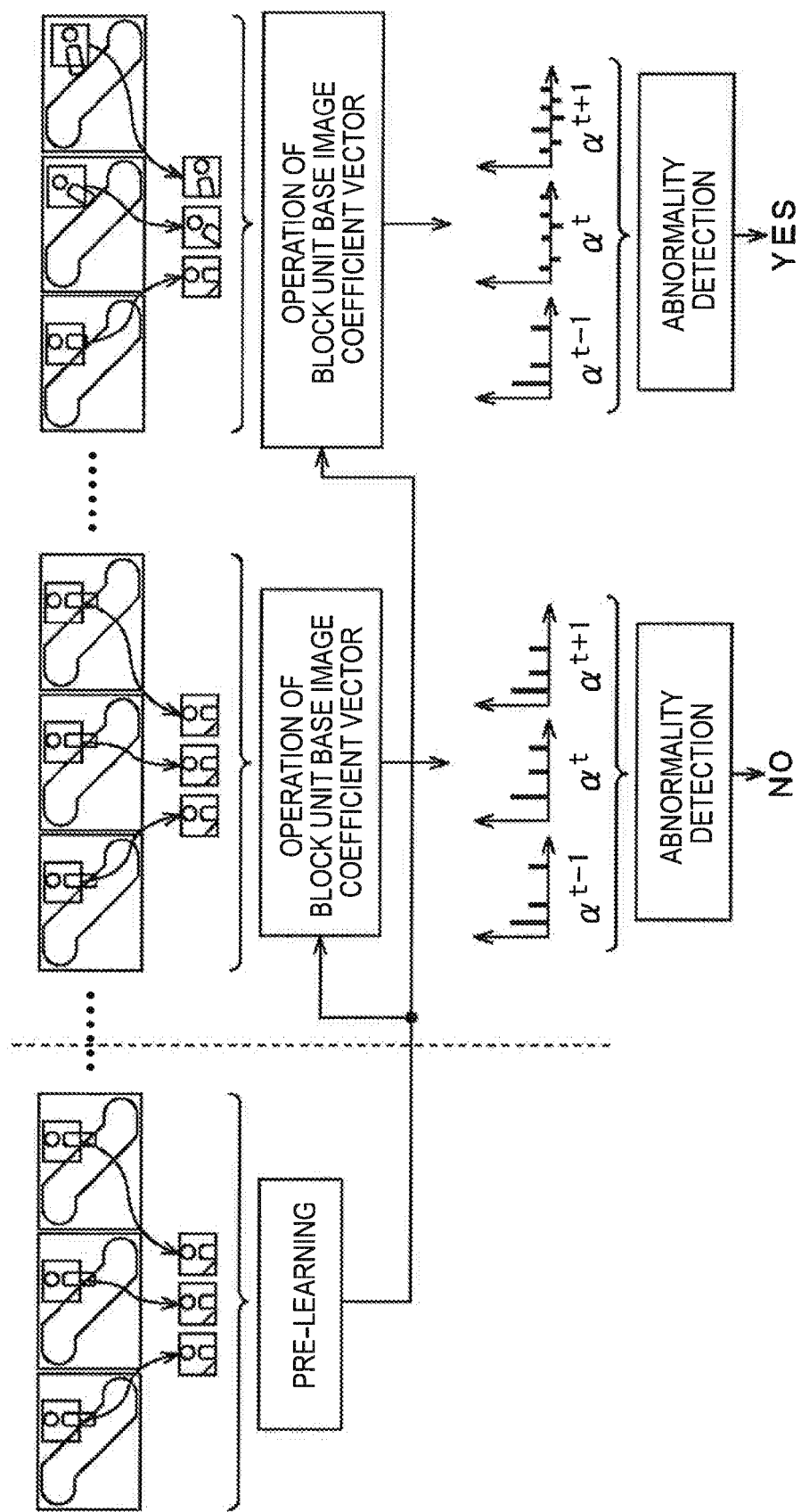
FIG. 45 is a diagram illustrating a method of generating abnormality information by a recognizing unit of FIG. 43.

FIG. 45 is a diagram illustrating a method of generating abnormality information by the recognizing unit 456 of FIG. 43.

As illustrated at the left side of FIG. 45, the learning apparatus 430 of FIG. 41 learns a base image of a block unit for each feature of the photographing environment, using moving images of a large amount of normal brightness images. As illustrated at the center and the right side of FIG. 45, the operation unit 454 of the abnormality detecting apparatus 450 of FIG. 43 operates a block unit base image coefficient vector of each frame repetitively by a predetermined number of times, using the learned base image of the block unit for each feature of the photographing environment and the block of the detection region of the image of the abnormality detection object.

The generating unit 455 generates a moving image of a brightness image of a block unit from the block unit base image coefficient vector of each frame and the base image of the block unit for each feature of the photographing environment. The recognizing unit 456 operates a difference of the generated moving image of the brightness image of the block unit and the block of the detection region of the image of the abnormality detection object, for each block of each frame.

When a sum of differences of the (t−1)-th frame to the (t+1)-th frame from a head is smaller than a threshold value, as illustrated at the center of FIG. 45, the recognizing unit 456 does not detect abnormality with respect to the frames and generates abnormality information showing that there is no abnormality. Meanwhile, when the sum of the differences of the (t−1)-th frame to the (t+1)-th frame from the head is equal to or greater than the threshold value, as illustrated at the right side of FIG. 45, the recognizing unit 456 detects abnormality with respect to the frames and generates abnormality information showing that there is abnormality.

That is, when the image of the abnormality detection object is the same moving image of the brightness image as the moving image of the learning brightness image, that is, the moving image of the normal brightness image, if an operation of the block unit base image coefficient vector is repeated by the predetermined number of times, the block unit base image coefficient vector is sufficiently converged. Therefore, the difference of the moving image of the brightness image of the block unit generated using the block unit base image coefficient vector and the block of the detection region of the image of the abnormality detection object decreases.

Meanwhile, when the brightness image of the abnormality detection object is not the same moving image of the brightness image as the moving image of the learning brightness image, that is, the brightness image is a moving image of an abnormal brightness image, the block unit base image coefficient vector is not sufficiently converged even though the operation of the block unit base image coefficient vector is repeated by the predetermined number of times. Therefore, the difference of the moving image of the brightness image of the block unit generated using the block unit base image coefficient vector and the block of the detection region of the image of the abnormality detection object increases.

As a result, when the difference of the moving image of the brightness image of the block unit generated using the block unit base image coefficient vector and the block of the detection region of the image of the abnormality detection object is smaller than the threshold value, the recognizing unit 456 does not detect abnormality and generates abnormality information showing that there is no abnormality. When the difference is equal to or greater than the threshold value, the recognizing unit 456 detects abnormality and generates abnormality information showing that there is abnormality.

[Explanation of Processing of Abnormality Detecting Apparatus]

Figure 46:
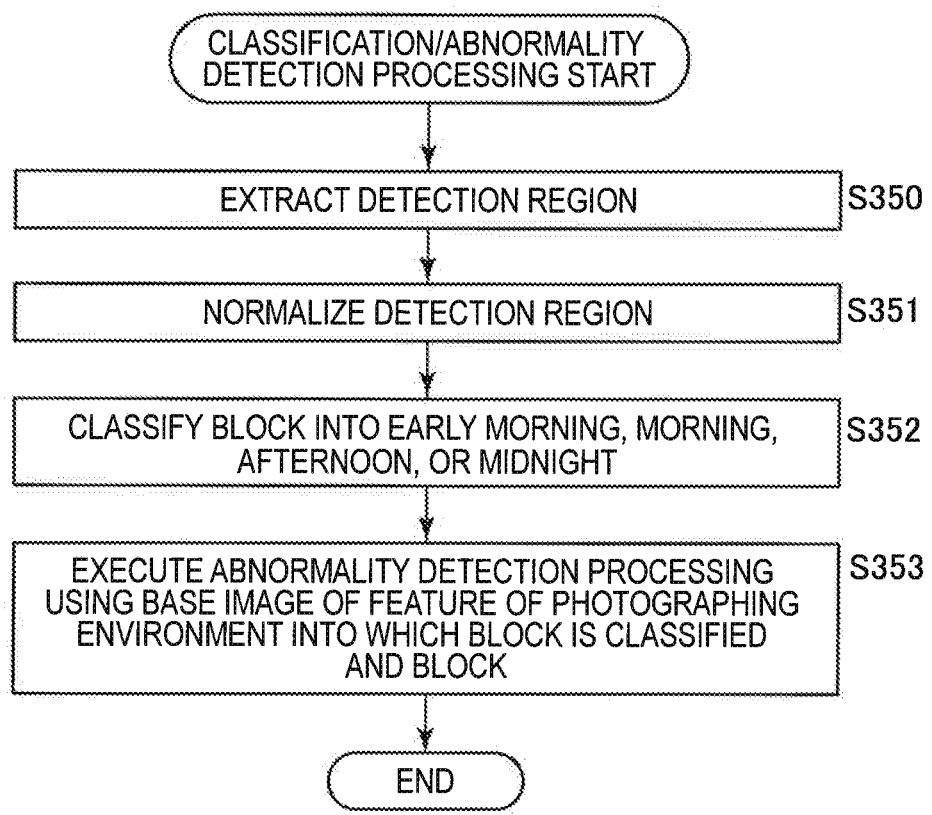
FIG. 46 is a flowchart illustrating classification/abnormality detection processing of the abnormality detecting apparatus of FIG. 43.

FIG. 46 is a flowchart illustrating classification/abnormality detection processing of the abnormality detecting apparatus 450 of FIG. 43. The classification/abnormality detection processing starts when the moving image of the brightness image are input as the image of the abnormality detection object from the monitoring camera not shown.

In step S350 of FIG. 46, the extracting unit 451 of the abnormality detecting apparatus 450 extracts a detection region from each frame of the image of the abnormality detection object input from the monitoring camera not illustrated in the drawings, similar to the extracting unit 431 of FIG. 41.

In step S351, the extracting unit 451 normalizes the extracted detection region, forms blocks having predetermined sizes, and supplies the blocks to the classifying unit 452 and the recognizing unit 456, similar to the extracting unit 431.

In step S352, the classifying unit 452 classifies the block supplied from the extracting unit 451 into the early morning, the morning, the afternoon, or the midnight corresponding to the feature of the photographing environment, based on the time zone of the image of the abnormality detection object of the block at the time of photographing, which is input from the monitoring camera not illustrated in the drawings. The classifying unit 452 supplies the block to the operation unit 454 corresponding to the feature of the photographing environment into which the block is classified.

In step S353, the abnormality detecting apparatus 450 executes the abnormality detection processing using the base image of the feature of the photographing environment into which the block is classified and the block and ends the processing.

Figure 47:
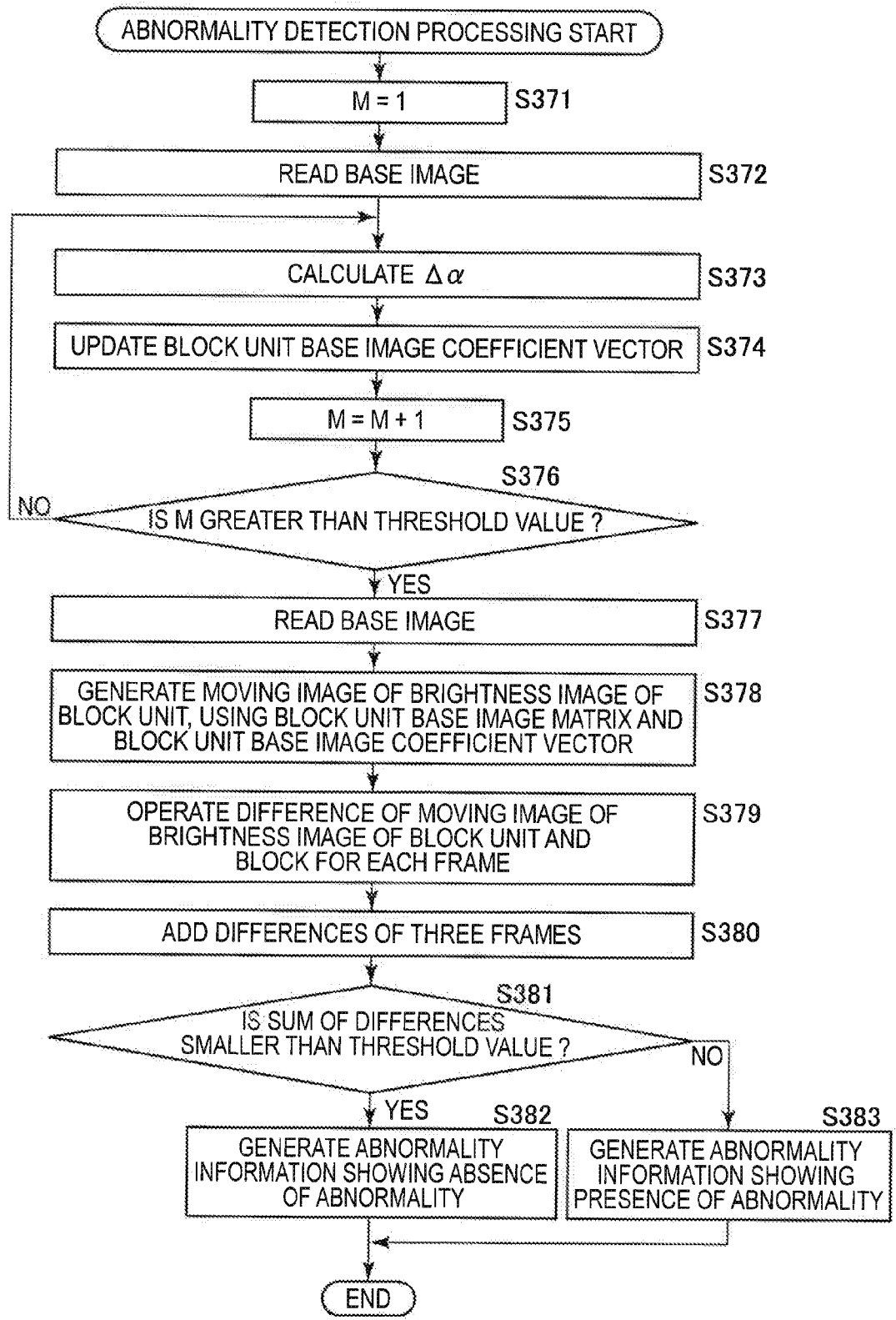
FIG. 47 is a flowchart illustrating abnormality detection processing of the abnormality detecting apparatus of FIG. 43.

FIG. 47 is a flowchart illustrating the abnormality detection processing of the abnormality detecting apparatus 450 of FIG. 41

Processing of steps S371 to S383 of FIG. 47 is executed in the block unit.

Because the processing of steps S371 to S375 is the same as the processing of steps S81 to S85 of FIG. 41, explanation of the processing is omitted. The cost function is defined in the block unit by any one of the expressions obtained by setting Y of the expressions 2 to 4 to the detection image vector.

In step S376, the operation unit 454 determines whether the number of times M of repeating the operation is greater than the predetermined threshold value. When it is determined in step S376 that the number of times M of repeating the operation is equal to or smaller than the predetermined threshold value, the operation unit 454 returns the processing to step S373. The processing of steps S373 to S376 is repeated until the number of times M of repeating the operation becomes greater than the predetermined threshold value.

Meanwhile, when it is determined in step S376 that the number of times M of repeating the operation is greater than the predetermined threshold value, the operation unit 454 supplies the block unit base image coefficient vector updated by immediately previous step S374 to the generating unit 455.

In step S377, the generating unit 455 reads the base image of the block unit from the storage unit 453. In step S378, the generating unit 455 generates the moving image of the brightness image of the block unit by the expression 7, using the block unit base image matrix including the read base image of the block unit and the block unit base image coefficient vector supplied from the operation unit 454. The generating unit 455 supplies the moving image of the brightness image of the block unit to the recognizing unit 456.

In step S379, the recognizing unit 456 operates a difference of the moving image of the brightness image of the block unit supplied from the generating unit 455 and the block supplied from the extracting unit 451, for each frame.

In step S380, the recognizing unit 456 adds the differences of the three frames operated by step S379. In step S381, the recognizing unit 456 determines whether a sum of the differences obtained as the result of the addition by step S380 is smaller than the predetermined threshold value.

When it is determined in step S381 that the sum of the differences is smaller than the predetermined threshold value, in step S382, the recognizing unit 456 does not detect abnormality, generates abnormality information showing that there is no abnormality, outputs the abnormality information, and ends the processing.

Meanwhile, when it is determined in step S381 that the sum of the differences is equal to or greater than the predetermined threshold value, in step S383, the recognizing unit 456 detects abnormality, generates abnormality information showing that there is abnormality, outputs the abnormality information, and ends the processing.

The abnormality detecting apparatus 450 has generated the abnormality information for three frames. However, the abnormality detecting apparatus 450 may generate the abnormality information for each frame. In this case, the abnormality detecting apparatus 450 operates a sum of differences of each frame and frames before and after the frame and generates abnormality information of each frame based on the sum. The number of frames corresponding to added differences is not limited to 3.

As described above, the abnormality detecting apparatus 450 obtains the base image learned by the learning apparatus 430 for each feature of the photographing environment. The abnormality detecting apparatus 450 operates the base image coefficient, based on the image of the abnormality detection object and the base image of the feature of the photographing environment of the image. Therefore, the abnormality detecting apparatus 450 can generate a high-definition moving image of a normal brightness image of a detection region having a restoration effect suitable for the feature of the photographing environment, using the base image and the base image coefficient according to the feature of the photographing environment of the image of the abnormality detection object.

In addition, the abnormality detecting apparatus 450 detects (recognizes) abnormality based on the difference of the generated high-definition moving image of the normal brightness image of the detection region and the detection region of the image of the abnormality detection object. Therefore, the abnormality can be detected with high precision without depending upon the monitoring environment.

In the eighth embodiment, the learning image and the image of the abnormality detection object are the moving images of the brightness images. However, the learning image and the image of the abnormality detection object may be moving images of color images. In this case, learning is performed for each feature of the photographing environment of each color channel and a moving image of a normal color image of the detection region is generated for each color channel. The abnormality information is generated based on a sum of differences of three frames of each color channel. The learning image and the image of the abnormality detection object may be still images.

In the eighth embodiment, the base images can be learned while abnormality information is generated, similar to the first embodiment.

The eighth embodiment is an example of an application of the sparse coding to recognition technology and the sparse coding can be applied to recognition technologies such as object recognition other than the abnormality detection.

Ninth Embodiment

[Explanation of Computer to which Present Disclosure is Applied]

The series of processing described above can be executed by hardware or can be executed by software. In the case in which the series of processing is executed by the software, a program configuring the software is installed in a computer. In this case, examples of the computer include a computer that is embedded in dedicated hardware and a general-purpose computer that can execute various functions by installing various programs.

Figure 48:
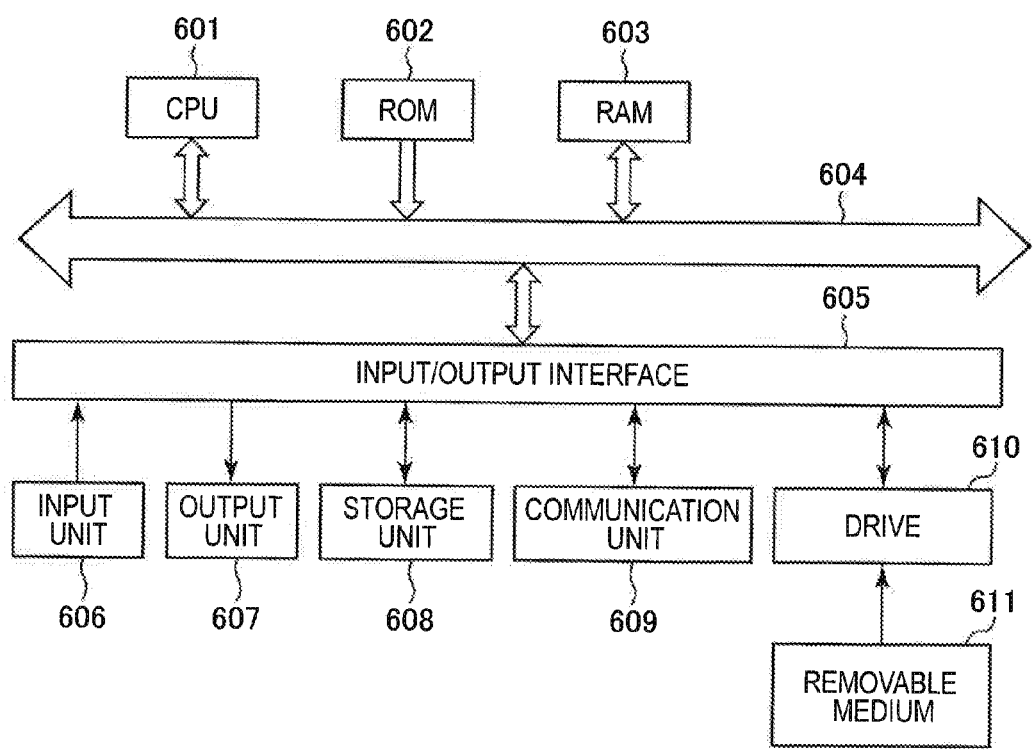
FIG. 48 is a block diagram illustrating a configuration example of hardware of a computer.

FIG. 48 is a block diagram illustrating a configuration example of hardware of the computer that executes the series of processing by the program.

In the computer, a central processing unit (CPU) 601, a read only memory (ROM) 602, and a random access memory (RAM) 603 are connected mutually by a bus 604.

An input/output interface 605 is connected to the bus 604. An input unit 606, an output unit 607, a storage unit 608, a communication unit 609, and a drive 610 are connected to the input/output interface 605.

The input unit 606 is configured using a keyboard, a mouse, and a microphone. The output unit 607 is configured using a display and a speaker. The storage unit 608 is configured using a hard disk or a nonvolatile memory. The communication unit 609 is configured using a network interface. The drive 610 drives a removable medium 611 such as a magnetic disk, an optical disk, a magneto-optical disk, or a semiconductor memory.

In the computer that is configured as described above, the CPU 601 loads a program stored in the storage unit 608 to the RAM 603 through the input/output interface 605 and the bus 604 and executes the program and the series of processing is executed.

The program that is executed by the computer (CPU 601) can be recorded on the removable medium 611 functioning as a package medium and can be provided. The program can be provided through a wired or wireless transmission medium, such as a local area network, the Internet, and digital satellite broadcasting.

In the computer, the program can be installed in the storage unit 608, through the input/output interface 605, by mounting the removable medium 611 to the drive 610. The program can be received by the communication unit 609 through the wired or wireless transmission medium and can be installed in the storage unit 608. The program can be previously installed in the ROM 602 or the storage unit 608.

The program that is executed by the computer may be a program in which processing is executed in time series according to order described in the present disclosure or a program in which processing is executed in parallel or at necessary timing such as when calling is performed.

It should be understood by those skilled in the art that various modifications, combinations, sub-combinations and alterations may occur depending on design requirements and other factors insofar as they are within the scope of the appended claims or the equivalents thereof.

For example, the present disclosure can take a configuration of cloud computing in which one function is distributed to a plurality of apparatuses through a network and is shared between the plurality apparatuses and processing is executed.

Each step in the flowcharts described above can be executed by one apparatus or can be distributed to a plurality of apparatuses and can be executed by the plurality of apparatuses.

When a plurality of processing is included in one step, the plurality of processing included in one step can be executed by one apparatus or can be distributed to a plurality of apparatuses and can be executed by the plurality of apparatuses.

When the learning signal and the sparse coding object signal are the still images, classification may be performed using the two or more features among the feature of the band in the first embodiment, the feature of the scene in the second embodiment, the feature of the depth map in the third embodiment, the feature of the spatial position in the fourth embodiment, the feature of the terminal in the sixth embodiment, and the feature of the photographing environment in the eighth embodiment.

Meanwhile, when the learning signal and the sparse coding object signal are the moving images, the classification may be performed using the two or more features among the feature of the band in the first embodiment, the feature of the scene in the second embodiment, the feature of the depth map in the third embodiment, the feature of the spatial position in the fourth embodiment, the feature of the time change in the fifth embodiment, the feature of the terminal in the sixth embodiment, and the feature of the photographing environment in the eighth embodiment.

When the learning signal and the sparse coding object signal are the audio signals, the classification may be performed using the two or more features among the feature of the scene in the second embodiment, the feature of the terminal in the sixth embodiment, the feature of the band in the seventh embodiment, and the feature of the photographing environment (monitoring environment) in the eighth embodiment.

Additionally, the present technology may also be configured as below.

(1)

A signal processing apparatus including:

a learning unit that learns a plurality of base signals of which coefficients become sparse, for each of features of signals, such that the signals are represented by a linear operation of the plurality of base signals.

(2)

The signal processing apparatus according to (1), wherein the features are features of bands of the signals.

(3)

The signal processing apparatus according to (1) or (2), wherein the features are features of scenes or photographing environments of the signals.

(4)

The signal processing apparatus according to any one of (1) to (3), wherein the features are features of positions of a depth direction of images as the signals.

(5)

The signal processing apparatus according to any one of (1) to (4), wherein the features are features of spatial positions of images as the signals.

(6)

The signal processing apparatus according to any one of (1) to (5), wherein the features are features of time changes of moving images as the signals.

(7)

The signal processing apparatus according to any one of (1) to (6), wherein the features are features of terminals corresponding to the signals.

(8)

A signal processing method performed by a signal processing apparatus, the signal processing method including:

learning a plurality of base signals of which coefficients become sparse, for each of features of signals, such that the signals are represented by a linear operation of the plurality of base signals.

(9)
A program for causing a computer to function as a learning unit that learns a plurality of base signals of which coefficients become sparse, for each of features of signals, such that the signals are represented by a linear operation of the plurality of base signals.

(10)
An output apparatus including:
an operation unit that operates coefficients of predetermined signals, based on a plurality of base signals of which the coefficients become sparse, learned for each of features of signals such that the signals are represented by a linear operation of the plurality of base signals, and the predetermined signals.

(11)
The output apparatus according to (10),
wherein the features are features of bands of the signals.

(12)
The output apparatus according to (10) or (11),
wherein the features are features of scenes or photographing environments of the signals.

(13)
The output apparatus according to any one of (10) to (12),
wherein the features are features of positions of a depth direction of images as the signals.

(14)
The output apparatus according to any one of (10) to (13),
wherein the features are features of spatial positions of images as the signals.

(15)
The output apparatus according to any one of (10) to (14),
wherein the features are features of time changes of moving images as the signals.

(16)
The output apparatus according to any one of (0) to (15),
wherein the features are features of terminals corresponding to the signals.

(17)
The output apparatus according to any one of (10) to (16), further including:
a generating unit that generates signals corresponding to the predetermined signals, using the coefficients operated by the operation unit and the plurality of base signals.

(18)
The output apparatus according to (17), further including:
a recognizing unit that recognizes the predetermined signals, based on differences of the signals generated by the generating unit and the predetermined signals.

(19)
An output method performed by an output apparatus, the output method including:
operating coefficients of predetermined signals, based on a plurality of base signals of which the coefficients become sparse, learned for each of features of signals such that the signals are represented by a linear operation of the plurality of base signals, and the predetermined signals.

(20)
A program for causing a computer to function as an operation unit that operates coefficients of predetermined signals, based on a plurality of base signals of which coefficients become sparse, learned for each of features of signals such that the signals are represented by a linear operation of the plurality of base signals, and the predetermined signals.

The present disclosure contains subject matter related to that disclosed in Japanese Priority Patent Application JP 2012-208321 filed in the Japan Patent Office on Sep. 21, 2012, the entire content of which is hereby incorporated by reference.

What is claimed is:
1. A signal processing apparatus comprising:
circuitry configured to
learn a plurality of base image signals of which coefficients become sparse, for each of a plurality of features of each of the plurality of base image signals, such that the learned plurality of base image signals are represented by a linear operation of the plurality of base image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.
2. The signal processing apparatus according to claim 1, wherein the one or more frequency bands of the one or more learning blocks comprise one or more frequency bands selected from a group consisting of high frequency, intermediate frequency, and low frequency.
3. The signal processing apparatus according to claim 1, wherein the features are features of scenes or photographing environments of the signals.
4. The signal processing apparatus according to claim 1, wherein the features are features of spatial positions of images as the signals.
5. The signal processing apparatus according to claim 1, wherein the features are features of time changes of moving images as the signals.
6. The signal processing apparatus according to claim 1, wherein the features are features of terminals corresponding to the signals.
7. A signal processing method executed via a processor of a signal processing apparatus, the signal processing method comprising:
learning a plurality of base image signals of which coefficients become sparse, for each one of a plurality of features of image signals, such that the image signals are represented by a linear operation of the plurality of base image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.
8. A non-transitory computer-readable storage medium having embodied thereon a program, which when executed by a computer causes the computer to execute a method, the method comprising:
learning a plurality of base image signals of which coefficients become sparse, for each one of a plurality of features of image signals, such that the image signals are represented by a linear operation of the plurality of base image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.

9. An output apparatus comprising:
circuitry configured to
operate coefficients of predetermined image signals, based on a plurality of base image signals of which the coefficients become sparse, learned for each one of a plurality of features of image signals such that the image signals are represented by a linear operation of the plurality of base image signals, and the predetermined image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.

10. The output apparatus according to claim 9,
wherein the one or more frequency bands of the one or more learning blocks comprise one or more frequency bands selected from a group consisting of high frequency, intermediate frequency, and low frequency.

11. The output apparatus according to claim 9,
wherein the features are features of scenes or photographing environments of the signals.

12. The output apparatus according to claim 9,
wherein the features are features of spatial positions of images as the signals.

13. The output apparatus according to claim 9,
wherein the features are features of time changes of moving images as the signals.

14. The output apparatus according to claim 9,
wherein the features are features of terminals corresponding to the signals.

15. The output apparatus according to claim 9, wherein the circuitry is further configured to
generate image signals corresponding to the predetermined image signals, using the coefficients operated by the operation unit and the plurality of base image signals.

16. The output apparatus according to claim 15, wherein the circuitry is further configured to
recognize the predetermined image signals, based on differences of the generated image signals and the predetermined image signals.

17. An output method executed via a processor of an output apparatus, the output method comprising:
operating coefficients of predetermined image signals, based on a plurality of base image signals of which learned coefficients become sparse, wherein the coefficients are learned for each one of a plurality of features of image signals such that the image signals are represented by a linear operation of the plurality of base image signals, and the predetermined image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.

18. A non-transitory computer-readable storage medium having embodied thereon a program which when executed by a computer causes the computer to execute a method, the method comprising:
operating coefficients of predetermined image signals, based on a plurality of base image signals of which coefficients become sparse, wherein the coefficients of each one of the plurality of base image signals are learned for each one of a plurality of features of image signals such that the image signals are represented by a linear operation of the plurality of base image signals, and the predetermined image signals,
wherein the plurality of features comprise a combination of one or more frequency bands indicating resolution of one or more learning blocks, each block of the one or more learning blocks comprising one or more of the plurality of base image signals, and depth direction position of one or more objects within the plurality of base image signals.

19. The signal processing apparatus according to claim 1, wherein the depth direction position of the one or more objects indicates whether a depth value of the one or more objects is below a first threshold depth value or above a second threshold depth value, wherein the second threshold depth value is greater than the first threshold depth value.

20. The signal processing apparatus according to claim 9, wherein the depth direction position of the one or more objects indicates whether a depth value of the one or more objects is below a first threshold depth value or above a second threshold depth value, wherein the second threshold depth value is greater than the first threshold depth value.

* * * * *